United States Patent
Mills et al.

(10) Patent No.: US 12,391,478 B2
(45) Date of Patent: Aug. 19, 2025

(54) SYSTEM FOR IDENTIFYING, TRACKING, CONTROLLING, AND/OR OPTIMIZING STACKED SHIPPING ASSETS IN AN INVENTORY MANAGEMENT FACILITY AND RELATED METHODS

(71) Applicant: All Terminal Services, LLC, Westmont, IL (US)

(72) Inventors: Mark D. Mills, Land O Lakes, FL (US); Christopher Alexander, Tarpon Springs, FL (US); Artem Igorevich Davtyan, New Port Richey, FL (US); Charles-Alexandre Kodjo Diop, Chicago, IL (US); Adonis Alfredo Fernandez Reyes, Tampa, FL (US); Matthew Michael McDermott, Weeki Wachee, FL (US); Jorge A. Perez Rincon, Tampa, FL (US); Jeffery Thompson, Jr., St. Petersburg, FL (US)

(73) Assignee: All Terminal Services, LLC, Westmont, IL (US)

( * ) Notice: Subject to any disclaimer, the term of this patent is extended or adjusted under 35 U.S.C. 154(b) by 0 days.

(21) Appl. No.: 19/061,932

(22) Filed: Feb. 24, 2025

(65) Prior Publication Data
US 2025/0187834 A1 Jun. 12, 2025

Related U.S. Application Data

(63) Continuation-in-part of application No. 18/060,162, filed on Nov. 30, 2022, which is a
(Continued)

(51) Int. Cl.
*G06F 7/00* (2006.01)
*B65G 1/137* (2006.01)
(Continued)

(52) U.S. Cl.
CPC ......... *B65G 1/1371* (2013.01); *G05B 13/027* (2013.01); *G06Q 10/087* (2013.01);
(Continued)

(58) Field of Classification Search
CPC ................ B65G 1/1371; B65G 1/1373; B65G 2203/0216; B65G 2203/041;
(Continued)

(56) References Cited

U.S. PATENT DOCUMENTS 6,637,703 B2   10/2003  Matheson et al.
11,958,529 B2 *  4/2024  Mandlekar ............. G06N 3/088
(Continued)

FOREIGN PATENT DOCUMENTS

WO   WO-2019060767 A1 *  3/2019 ........... G06Q 10/087

OTHER PUBLICATIONS

International Search Report and Written Opinion issued in PCT/US2025/017089, mailed Apr. 30, 2025.

*Primary Examiner* — Yolanda R Cumbess
(74) *Attorney, Agent, or Firm* — Arnall Golden Gregory LLP

(57) ABSTRACT

A control system is provided for inventory management facility with a plurality of containers. The control system includes a server, and a container handler operable within the inventory management facility. The container handler tractor comprises onboard sensors configured to generate sensor data of at least one container of the plurality of containers, a geolocation device configured to generate a geolocation value for the at least one container, a wireless transceiver, and a controller coupled to the onboard sensors, the geolocation device, and the wireless transceiver. The controller is configured to transmit the sensor data and the geolocation value for the at least one container to the server. The server is in communication with the container handler
(Continued)

and is configured to generate a database associated with the sensor data, the database comprising, for each container, a container logo image and the geolocation value. The geolocation value includes a latitude value, a longitude value, and an altitude value.

30 Claims, 42 Drawing Sheets

Related U.S. Application Data continuation-in-part of application No. 16/951,015, filed on Nov. 18, 2020, now Pat. No. 12,020,148.

(60) Provisional application No. 63/557,470, filed on Feb. 23, 2024, provisional application No. 63/557,472, filed on Feb. 23, 2024, provisional application No. 63/284,071, filed on Nov. 30, 2021, provisional application No. 62/936,715, filed on Nov. 18, 2019.

(51) Int. Cl.
*G05B 13/02* (2006.01)
*G06Q 10/087* (2023.01)

(52) U.S. Cl.
CPC .... *B65G 1/1373* (2013.01); *B65G 2203/0216* (2013.01); *B65G 2203/041* (2013.01); *B65G 2209/04* (2013.01)

(58) Field of Classification Search
CPC .. B65G 2209/04; B65G 1/00; B65G 2203/00; B65G 2209/00; G05B 13/027; G05B 13/0265; G06Q 10/087; G06Q 10/08
USPC .................................. 700/213–216; 701/400
See application file for complete search history.

(56) References Cited

U.S. PATENT DOCUMENTS

| | | |
|---|---|---|
| 2012/0051643 A1 | 3/2012 | Ha et al. |
| 2015/0331931 A1* | 11/2015 | Burke ................... G06Q 10/08 707/738 |
| 2016/0104098 A1 | 4/2016 | Matula et al. |
| 2018/0215545 A1* | 8/2018 | High ................... G05D 1/0261 |
| 2018/0374039 A1 | 12/2018 | Walden et al. |
| 2020/0193507 A1 | 6/2020 | Glaser et al. |
| 2020/0320231 A1 | 10/2020 | Santarone et al. |

\* cited by examiner

SYSTEM FOR IDENTIFYING, TRACKING, CONTROLLING, AND/OR OPTIMIZING STACKED SHIPPING ASSETS IN AN INVENTORY MANAGEMENT FACILITY AND RELATED METHODS

RELATED APPLICATIONS

This application is a continuation-in-part of co-pending U.S. application Ser. No. 18/060,162 filed Nov. 30, 2022, which claims priority to U.S. Provisional Application No. 63/284,071 filed Nov. 30, 2021, and which is a continuation-in-part of U.S. application Ser. No. 16/951,015 filed Nov. 18, 2020, now U.S. Pat. No. 12,020,148, which claims priority to U.S. Provisional Application No. 62/936,715 filed Nov. 18, 2019, and this application claims priority to U.S. Provisional Application No. 63/557,472 filed Feb. 23, 2024, and U.S. Provisional Application No. 63/557,470 filed Feb. 23, 2024, the entire subject matter of these applications are incorporated herein by reference in their entirety.

FIELD OF THE INVENTION

The present disclosure relates to the field of supply chain logistics, and more particularly, to a system for monitoring assets within an inventory management facility and related methods of monitoring assets within an inventory management facility, and more particularly, to a system for identifying, tracking, controlling, and optimizing stacked assets, such as containers and more particularly stacked containers, in an inventory management facility.

BACKGROUND OF THE INVENTION

Supply chain logistics is a major international industry. Indeed, ninety percent of world trade is shipped.

Historically, the shipping industry moved freight in odd sized wooden crates. Of course, this lead to inefficiencies in filling cargo holds of trains and ships. This led to the development of the standardized shipping container, as disclosed in U.S. Pat. No. 2,853,968 to McLean. The standardized shipping container became ubiquitous in the shipping industry, and led to the growth of intermodal shipping, i.e., shipping the same container over different modes of transport (e.g., train (railcar container), truck, and watercraft) without reloading.

An important aspect of a railway transit system is the railway yard, which includes a complex set of railroad tracks for loading and unloading cargo (e.g., shipping containers) from trains. Because of number of tracks and trains within the railway yard, it can be onerous to keep track of containers as they are switched between one train and another, or simply offloaded for motor vehicle (i.e. semi-truck) transport. Similarly, a container terminal includes a complex set of loaded and unloaded containers for shipping cargo (e.g., shipping containers) from trains, ships, and/or over-the-road vehicles.

For example, during transportation, freight may be switched between one or more modes of transport to another, for example, using an asset such as an intermodal container, chassis, and/or semi-trailer moved (e.g., pulled) by a ground vehicle. During transportation, these assets, such as containers, chassis, and trailers, may be stored in, and/or moved between, one or more inventory management facilities or within one or more parts or regions thereof. For example, an inventory management facility can include one or more of a yard, terminal, warehouse, an order fulfillment facility, distribution center, container yard, logistics park, intermodal storage facility, etc., which supports storage and transportation of freight via one or more different modes of transportation. In an example, an inventory management facility may be arranged in lots, each with multiple rows of assets, such as containers, chassis, and/or trailers, each row including several slots or parking spaces, and each slot able to accommodate one or more assets, such as one or more containers (e.g., individual or stacked), chassis, trailers, or one or more other assets.

Conventional systems for an inventory management facility, such as a yard, railway yard, terminal, warehouse, distribution center, container yard, logistics park, etc., may utilize one or more vehicles to move assets from a first location to a second location within the inventory management facility or between one or more inventory management facilities.

Because of the number of containers and stacks of containers within an inventory management facility, such as a container terminal, it can be onerous to keep track of containers and their locations within an inventory management facility, and more particularly, within stacks of containers within an inventory management facility, as the stacks are moved from one location to another, such as to provide access to other containers, or to efficiently access a container from the stacks at a scheduled date and time.

SUMMARY OF THE INVENTION

The present invention recognizes that in container terminals, an accurate inventory, including the location and ID of the inventory, is an important requirement for building efficiencies, increasing productivity and velocity within an inventory management facility, such as a yard or distribution facility. The traditional approach to update and track inventory movement is to deploy "Yard Checkers" to drive through the facility and record the location and ID of the inventory. This approach increases exposure to the risk of accidents as the Yard Checker is recording data while in a moving vehicle. This manual process is slow, costly and inventory becomes stale minutes after the data is input. Accurate inventory may be required to develop an effective load plan, improve the driver experience, and provide meaningful data for a Transport Management System (TMS) and a Terminal Operating System (TOS). The present invention recognizes that, the problems with conventional approaches of updating and tracking inventory become exacerbated when the inventory includes assets such as containers, and more particularly, one or more stacks of one or more containers.

An exemplary embodiment is directed to a control system for an inventory management facility, the control system comprising one or more containers in the inventory management facility, one or more servers, and one or more container handlers operable within the inventory management facility and configured to engage at least one of the one or more containers, wherein the one or more container handlers includes one or more sensors on the one or more container handlers and configured to generate sensor data of at least one of one or more containers, wherein the one or more sensors comprises an image sensor configured to generate container image data, one or more geolocation devices on the one or more container handlers and configured to generate one or more geolocation values for one or more of the one or more container handlers or the one or more containers or a combination thereof, one or more wireless transceivers on the one or more container handlers, and one or more controllers on the one or more container handlers, the one or more controllers coupled to the one or more sensors, the one or more geolocation devices, and the one or more wireless transceivers, the one or more controllers configured to transmit the sensor data and the geolocation value for the one or more of the one or more container handlers and the one or more containers to the one or more servers, wherein the one or more servers includes one or more processors and one or more non-transitory computer-readable storage mediums storing instructions comprising one or more algorithms that when executed by the one or more processors cause the one or more processors to perform steps to generate a database associated with the sensor data, the database comprising, for the one or more containers, image data and geolocation data, perform machine learning on the image data including executing at least one of a first machine learning model comprising a neural network trained to predict a location of text sequences in the image data, or a second machine learning model comprising a neural network for scanning the text sequences and predicting a sequence of missing characters, or a combination thereof, and perform optical character recognition (OCR) on the image data.

In an example, the geolocation value includes a latitude value, a longitude value, and an altitude value.

In an example, the container image data comprises container video data, and wherein the one or more servers is configured to weight detected objects in the inventory management facility based upon a number of frames including the detected objects.

In an example, the server is configured to identify the one or more containers based upon the container image data.

In an example, the server is configured to track one or more of a location or a movement, or a combination thereof, of the one or more containers within the inventory management facility.

In an example, a container handler of the one or more container handlers comprises one of a side loader, a reach loader, a reach stacker, a Rubber Tired Gantry Cranes (RTG), or a crane loader.

In an example, the one or more servers are in communication with the one or more container handlers and are configured to transmit one or more operational values to a container handler of the one or more container handlers to position a container of the one or more containers at a predetermined location within the inventory management facility.

In an example, the neural network trained to predict a location of text sequences in the container image data can include a convolutional neural network (CNN) or another suitable type of neural network. In an example, the neural network for scanning the text sequences and predicting a sequence of missing characters can include a recurrent neural network (RNN) or another suitable type of neural network. The exemplary embodiments are not limited to any particular type of neural networks and can include any suitable neural network, or combination of neural networks.

Another exemplary embodiment is directed to a server in a control system for an inventory management facility, the control system comprising one or more containers in the inventory management facility, and one or more container handlers operable within the inventory management facility and configured to engage at least one of the one or more containers, wherein the one or more container handlers includes one or more sensors on the one or more container handlers and configured to generate sensor data of at least one of one or more containers, wherein the one or more sensors comprises an image sensor configured to generate container image data, one or more geolocation devices on the one or more container handlers and configured to generate one or more geolocation values for one or more of the one or more container handlers or the one or more containers or a combination thereof, one or more wireless transceivers on the one or more container handlers, and one or more controllers on the one or more container handlers, the one or more controllers coupled to the one or more sensors, the one or more geolocation devices, and the one or more wireless transceivers, the one or more controllers configured to transmit the sensor data and the geolocation value for the one or more of the one or more container handlers and the one or more containers to the server, the server comprising one or more processors and one or more non-transitory computer-readable storage mediums storing instructions comprising one or more algorithms that when executed by the one or more processors cause the one or more processors to perform steps to generate a database associated with the sensor data, the database comprising, for the one or more containers, image data and geolocation data, perform machine learning on the image data including executing at least one of a first machine learning model comprising a neural network trained to predict a location of text sequences in the image data, or a second machine learning model comprising a neural network for scanning the text sequences and predicting a sequence of missing characters, or a combination thereof, and perform optical character recognition (OCR) on the image data.

Yet another exemplary embodiment is directed to a method of operating a server in a control system for an inventory management facility, the control system comprising one or more containers in the inventory management facility, and one or more container handlers operable within the inventory management facility and configured to engage at least one of the one or more containers, wherein the one or more container handlers includes one or more sensors on the one or more container handlers and configured to generate sensor data of at least one of one or more containers, wherein the one or more sensors comprises an image sensor configured to generate container image data, one or more geolocation devices on the one or more container handlers and configured to generate one or more geolocation values for one or more of the one or more container handlers or the one or more containers or a combination thereof, one or more wireless transceivers on the one or more container handlers, and one or more controllers on the one or more container handlers, the one or more controllers coupled to the one or more sensors, the one or more geolocation devices, and the one or more wireless transceivers, the one or more controllers configured to transmit the sensor data and the geolocation value for the one or more of the one or more container handlers and the one or more containers to the server, the method comprising operating the server in communication with the one or more container handlers to receive the sensor data and the geolocation value for the one or more container handlers from the one or more container handlers, generating a database associated with the sensor data, the database comprising, for the one or more containers, image data and geolocation data, performing machine learning on the image data including executing at least one of a first machine learning model comprising a neural network trained to predict a location of text sequences in the image data, or a second machine learning model comprising a neural network for scanning the text sequences and predicting a sequence of missing characters, or a combination thereof, and performing optical character recognition (OCR) on the image data.

Another exemplary embodiment is directed to a control system for optimizing a location of one or more containers in one or more stacks of an inventory management facility, the control system comprising one or more containers in the inventory management facility, one or more servers, and one or more container handlers operable within the inventory management facility and configured to engage at least one of the one or more containers, wherein the one or more container handlers includes one or more sensors on the one or more container handlers and configured to generate sensor data of at least one of one or more containers, wherein the one or more sensors comprises an image sensor configured to generate container image data, one or more geolocation devices on the one or more container handlers and configured to generate one or more geolocation values for one or more of the one or more container handlers or the one or more containers or a combination thereof, one or more wireless transceivers on the one or more container handlers, and one or more controllers on the one or more container handlers, the one or more controllers coupled to the one or more sensors, the one or more geolocation devices, and the one or more wireless transceivers, the one or more controllers configured to transmit the sensor data and the geolocation value for the one or more of the one or more container handlers and the one or more containers to the one or more servers, wherein the one or more servers includes one or more processors and one or more non-transitory computer-readable storage mediums storing instructions comprising one or more algorithms that when executed by the one or more processors cause the one or more processors to perform steps to generate a database associated with the sensor data, the database comprising, for the one or more containers, image data and geolocation data, perform machine learning on the image data including executing at least one of a first machine learning model comprising a neural network trained to predict a location of text sequences in the image data, or a second machine learning model comprising a neural network for scanning the text sequences and predicting a sequence of missing characters, or a combination thereof, perform optical character recognition (OCR) on the image data, and optimize a location of a container of the one or more containers in the one or more stacks of the inventory management facility based on the database.

In an example, the step of optimizing the location of the container of the one or more containers in the one or more stacks of the inventory management facility includes performing machine learning on the database including executing one or more machine learning models comprising one or more neural networks trained to predict an optimal location of the container of the one or more containers in the one or more stacks of the inventory management facility based on one or more predetermined metrics and/or factors.

In an example, the one or more servers are in communication with the one or more container handlers and are configured to transmit one or more operational values to a container handler of the one or more container handlers to position a container of the one or more containers at the optimal location in the one or more stacks of the inventory management facility.

In another example, the one or more servers are configured to transmit one or more operational values to the one or more container handlers to re-position the one or more containers at one or more second optimal locations in the one or more stacks of the inventory management facility based on one or more other predetermined metrics and/or factors.

Advantageously, the control system may provide a more accurate approach to inventory and location of containers in an inventory management facility such as a container terminal. The control system may identify, locate, and track inventory located in the inventory management facility. With the control system, inventory and a location of the inventory can be updated (e.g., automatically updated, and more particularly automatically updated, for example, based on a predetermined event, or trigger event) in real time by each container handler as it executes work orders. The control system may help users make smarter, faster decisions that can boost the entire operation's efficiency and profitability. The control system removes the uncertainty obscured by the lack of visibility, allowing operations teams to view their facility zoomed in or out. Predictive analytics, real-time data, internet-connected machinery, and automation may help companies become proactive to focus on growth strategies. Furthermore, the control system may be readily retrofitted onto existing systems with minor modifications to container handlers.

The exemplary embodiments can provide a stack management system and method that solves the longstanding challenges of tracking and intelligently placing containers in an inventory management facility such as a container terminal to minimize reshuffling and unproductive moves.

The exemplary systems and methods can minimize or avoid time-consuming manual processes, poor yard visibility, searching for containers (e.g., in the inventory management facility, and more particularly, in stacks of containers in the inventory management facility), duplicating work or unproductive moves, digging out containers while drivers are waiting (e.g., moving one or more other containers in one or more stacks of containers to access a particular container), and/or excess emissions, among other things.

The exemplary systems can be simply and easily mounted on an existing container handler, lift, crane equipment, or the like. The exemplary systems and methods enabling tracking and inventorying (e.g., automatic tracking and/or automatic inventorying, for example, based on a predetermined event, or trigger event) and determining precise location data of stacked containers within an inventory management facility (e.g., container terminal), thereby providing unmatched visibility for stacked containers and providing site staff with an accurate, efficient way to locate, intelligently reshuffle, and/or rebuild stacks.

The exemplary systems and methods can utilize high-resolution imagery, data-inferencing capabilities, and artificial intelligence (AI) to identify, classify, and locate stacked containers in real time. As equipment enters, leaves, or shifts within a facility, the exemplary systems and methods can send updates to the cloud and any receiving system (such as TMS/YMS), providing accurate location information for each container in the stack.

The exemplary systems and methods ensure that one or more containers, and more particularly, every container in a stack is visible (e.g., identified and/or tracked), thereby streamlining operations and enhancing overall efficiency of the operation of a container terminal and mitigating disruptions before they happen. That is, the image data and location data of each container is known and tracked, and in some examples, accessible to operators, drivers, and/or customers.

The exemplary systems and methods can provide real-time positioning of one or more containers in one or more stacks. For example, exemplary systems and methods can enable the use of existing equipment to provide real-time, low-cost, and precisely accurate positioning data even within stacks. This capability revolutionizes inventory management by eliminating guesswork and minimizing the risk of errors.

The exemplary systems and methods can provide (e.g., continuously update and provide) current, up to date data (e.g., never-stale data).

The exemplary systems and methods can be configured to continuously update data (e.g., automatically and continuously update data) by sending location data to the cloud in real time, minimizing unproductive equipment moves and ensuring operators and/or customers have the most up-to-date information.

The exemplary systems and methods can provide AI-powered optimization of stacks. The exemplary systems and methods can utilize artificial intelligence engines to groom (e.g., continuously groom) stacks based on one or more predetermined metrics and/or factors such as, for example, one or more of current bookings and future appointments. The exemplary systems and methods can enable operators to place containers in a predetermined position (e.g., preferred or optimal position), thereby improving or maximizing efficiency and minimizing or avoiding costly delays. For example, in an instance in which a driver misses or cancels an appointment, the exemplary systems and methods can utilize one or more AI engines to re-optimize the stack and update a lift operator's work orders. In this way, the present invention can improve or maximize efficiency and minimize or avoiding costly delays associated with, for example, accessing one or more containers.

The exemplary systems and methods can provide smart scheduling. For example, a dispatcher and/or driver can signal intent (e.g., drop off/pick up) from their Terms of Service (TOS), Yard Management Systems (YMS), or natively in the exemplary control system. In an example, the exemplary systems and methods can utilize one or more AI engines to update work orders on in-cab tablets to fulfill current bookings and optimize stacks, for example, for future appointments, such as a predetermined numbers of days out.

In some examples, the exemplary systems and methods can provide alerts (e.g., customizable alerts) to notify teams when a more efficient method (e.g., most efficient method) of building stacks requires a facility layout change (i.e., high winds, peak, customer-preferred stacks). For example, the exemplary systems and methods can utilize one or more AI engines to re-optimize the stack and update a lift operator's work orders to reduce or minimize risks associated with one or more of high winds or other weather related events or forecasts. In an example, the system and method can include a Weather Analysis Engine to forecast and/or detect weather events such as high winds or other weather related events or forecasts.

The exemplary systems and methods can provide one or more customers with access (e.g., real-time access) to view assets/inventory (e.g., containers, and more particularly container image data and container geolocation data) within a container terminal utilizing the customer's Terms of Service (TOS), Yard Management Systems (YMS), or natively in the exemplary control system.

The exemplary systems and methods can be coupled with other control systems for an inventory management facility such as a container terminal, as described herein, such that customers can access data and be provided a unified view and real-time snapshot of containers in a facility, for example, from entry to exit and every move in between. The exemplary systems and methods can work together to give operators a real-time snapshot of an inventory management facility and, in some examples, utilize AI Engines to crunch the data to optimize movements of one or more assets within the inventory management facility using efficiency algorithms. In an example, the system can task an operator of a container handler (e.g., lift operator) within a predetermined distance to (e.g., in close proximity to, closest to, etc.) a container or stack of containers for one or more moves (e.g., for each move), thereby improving efficiency, reducing costs, etc.

The exemplary systems and methods can use simple, high-impact metrics and/or other predetermined metrics and/or factors to optimize stacks that often go untracked by operating teams and can provide or reveal vital insights about operations of an inventory management facility, such as dwell time, average throughput of stacks, and/or timeliness of drivers, among other things. The exemplary systems and methods can automatically optimize and adjust to streamline work.

Customers can use an interface of the exemplary system or integrate the data into their TOS or YMS. In some examples, individual clients can be granted access (e.g., selectively granted access) to view their inventory within an inventory management facility.

The exemplary systems and methods are not limited to any particular type of inventory management facility can include one or more of a yard, terminal, warehouse, an order fulfillment facility, distribution center, container yard, logistics park, intermodal storage facility, etc., which supports storage and transportation of freight via one or more different modes of transportation. In some examples, an inventory management facility may be arranged in lots, each with multiple rows of assets, such as containers, chassis, and/or trailers, each row including several slots or parking spaces, and each slot able to accommodate one or more assets, such as one or more containers (e.g., individual or stacked), chassis, trailers, or one or more other assets.

For purposes of this disclosure, the term "container handler" means terminal or yard equipment commonly known as container handlers, including all wheeled yard equipment, vehicles, machines, wheel loaders, side loaders, reach loaders, reach stackers, and/or Rubber Tired Gantry Cranes (RTG) that are designed and used for the primary purpose of moving containers (i.e., non-wheeled shipping containers) or freight between points within a terminal or yard (including, but not limited to, intermodal yards, distribution center yards, ports, etc.) of a single facility or between the terminals or yards of more than one facility. The present invention is not limited to any particular type of container handler. Other container handlers are contemplated within the spirit and scope of the invention, such as a lift, crane equipment, or the like. In some examples, one or more container handlers can include, for example, an empty container handler and/or a loaded container handler. Each container handler may be operated by an onboard driver, may be remote controlled by the driver, or may be fully/partially autonomous. It should be appreciated that the control system may comprise a single container handler in some applications, or a plurality of container handlers in other applications.

As will be appreciated, each of the container handlers can be configured to securely engage and move, place, stack, and/or unstack containers within the container terminal. Each container handler can be configured to carry at least one container to move the container within the container terminal and to raise or lower (i.e., change an elevation of) the container to position the container within the container terminal. The container handlers can be configured to lift the container from a position on another vehicle, from a position on the ground, or from a position on top of another container in a stack. The container handlers can be configured to transport the container from one location to another in the container terminal. The container handlers can be configured to lift the container to set the container on another vehicle, on the ground, or on top of another container in a stack. The container handlers can be capable of lifting empty or loaded containers on a stack ranging from one container in height to, for example, five, six, or seven containers in height, or other heights, for example, depending on the size, weight, type of container.

Those of skill in the art would appreciate that various suitable machine learning models may be utilized in the exemplary embodiments and the one or more neural networks described herein are not limited to any particular type of neural network and can include one or more neural networks, such as transformer neural networks, artificial neural networks (ANNs), simulated neural networks (SNNs), feedforward neural networks, and/or other deep learning models, technology, and/or toolkits for analyzing and/or processing one or more of collected image data (e.g., video image data, frames of video image data, etc.), audio data (e.g., captured audio recordings of spoken words), textual data (e.g., sequential text), etc. and/or one or more datasets including such data. For example, the exemplary embodiments may utilize DeepStream technology to improve or maximize a speed of processing high frame rate images, video, etc.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings.

DETAILED DESCRIPTION OF THE EXEMPLARY EMBODIMENTS OF THE INVENTION

Figure 1:
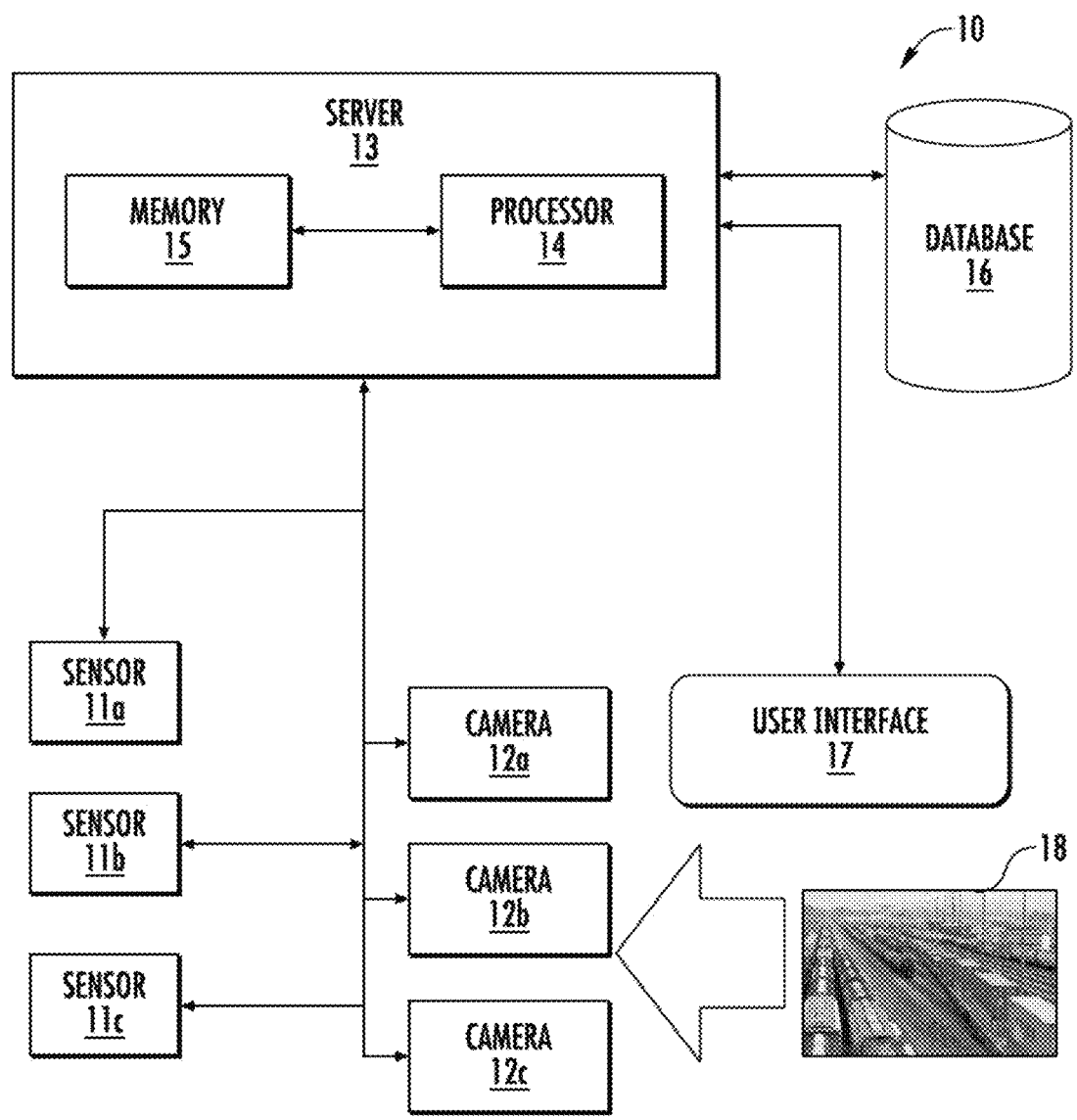
FIG. 1 is a schematic diagram of a tracking system, according to a first example embodiment of the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals and base 1000 reference numerals are used to indicate similar elements in alternative embodiments.

Referring initially to FIG. 1, a tracking system 10 according to the present disclosure is now described. The tracking system 10 is for monitoring and tracking a plurality of containers (railcar container) within a railway yard 18. As will be appreciated, as containers transit in and out of the railway yard 18, it is critical to monitor the status and location of the containers to verify their proper routing. Moreover, there is a desire to monitor the movement of the containers to verify that safety protocols are being followed.

The tracking system 10 illustratively comprises a plurality of sensors 11a-11c configured to generate sensor data. The plurality of sensors 11a-11c may comprise one or more of pressure sensors positioned on tracks, and motion sensors positioned on or adjacent to the tracks. The tracking system 10 illustratively includes a plurality of cameras 12a-12c configured to generate image data, and a server 13 in communication with the plurality of sensors and the plurality of cameras. The plurality of cameras 12a-12c may comprise one or more different types of cameras, for example, pan tilt zoom (PTZ) cameras, fixed cameras, and night vision cameras (i.e. infrared cameras).

The server 13 illustratively includes a processor 14 and memory 15 cooperating therewith. The server 13 may comprise a device local to the railway yard 18. In particular, the server 13 may be coupled to the plurality of sensors 11a-11c and the plurality of cameras 12a-12c over a local area network (LAN), for example, a wired LAN or a wireless local area network (WLAN). In these embodiments, the server 13 would also be coupled to the Internet to provide remote access.

In some embodiments, the server 13 may be provided within a cloud infrastructure, such as Amazon Web Services, Microsoft Azure, and the Google Cloud Platform. In these embodiments, the server 13 is coupled to the plurality of sensors 11a-11c and the plurality of cameras 12a-12c over the LAN and the Internet.

The processor 14 and memory 15 are configured to generate a database 16 associated with the plurality of containers based upon the sensor data and the image data. The database 16 may include a plurality of entries respectively associated with the plurality of containers. Each entry comprises a container type value, a container logo image, and a vehicle classification value. Of course, this list is merely exemplary, and the entry can include other data values, such as point of origin and destination. In essence, the server 13 is configured to perform data fusion operations on the sensor data and the image data to provide a snapshot of the containers in the railway yard 18.

The processor 14 and memory 15 are configured to store the database 16, and provide a user interface 17 to access the database. The user interface 17 may comprise a web interface accessible over the Internet.

Another aspect is directed to a method for operating a tracking system 10 for a plurality of containers within a railway yard 18. The method includes operating a plurality of sensors 11a-11c to generate sensor data, operating a plurality of cameras 12a-12c to generate image data, and operating a server 13 in communication with the plurality of sensors and the plurality of cameras. The method comprises operating the server 13 to generate a database 16 associated with the plurality of containers based upon the sensor data and the image data. The database 16 includes a plurality of entries respectively associated with the plurality of containers. Each entry comprises a container type value, a container logo image, and a vehicle classification value. The method comprises operating the server 13 to store the database 16, and provide a user interface 17 to access the database.

Figure 2:
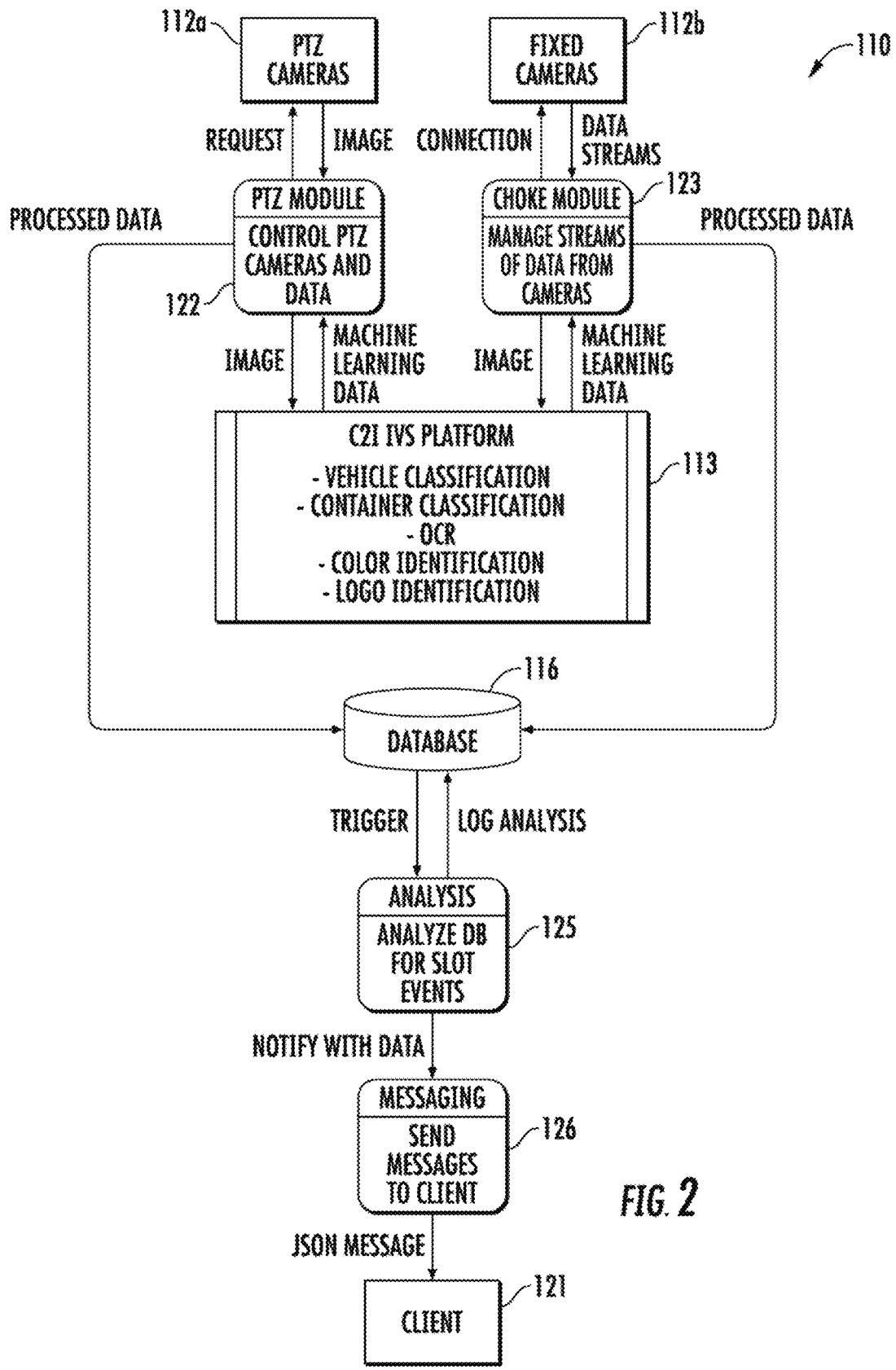
FIG. 2 is a schematic diagram of railcar data flow in the tracking system of FIG. 1.
Figure 3:
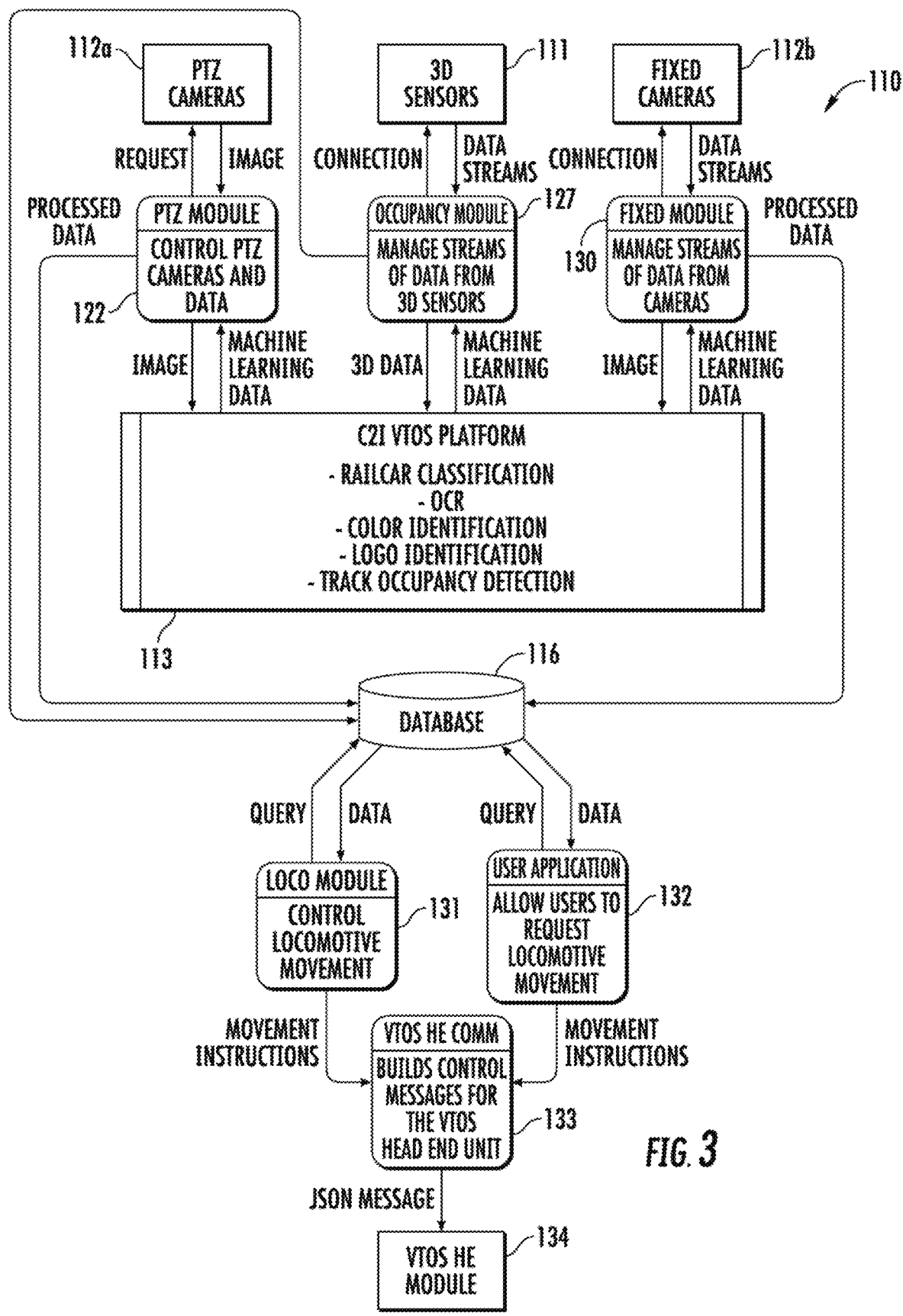
FIG. 3 is a schematic diagram of rail automation flow in the tracking system of FIG. 1.
Figure 4:
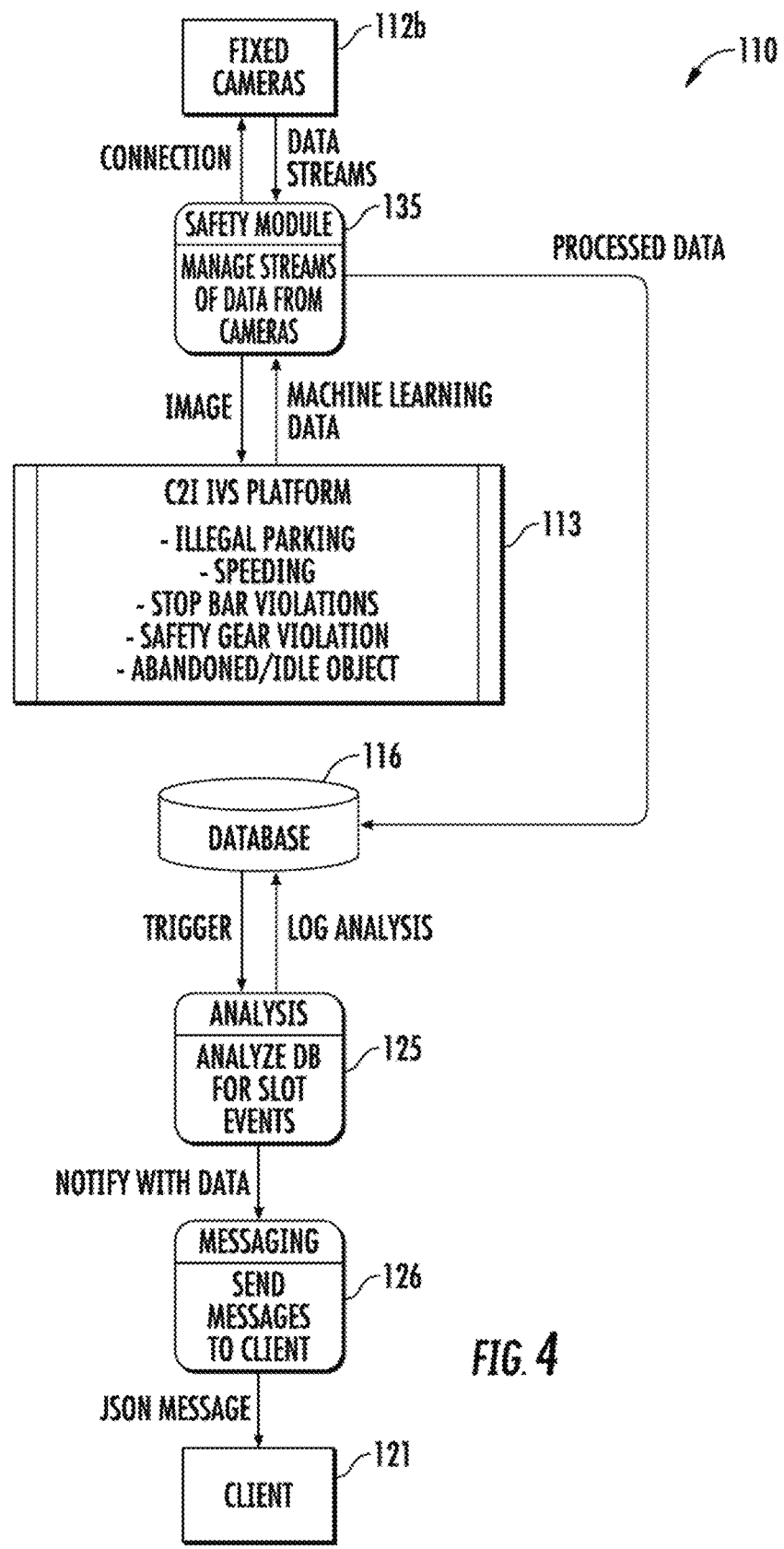
FIG. 4 is a schematic diagram of safety flow in the tracking system of FIG. 1.
Figure 5A:
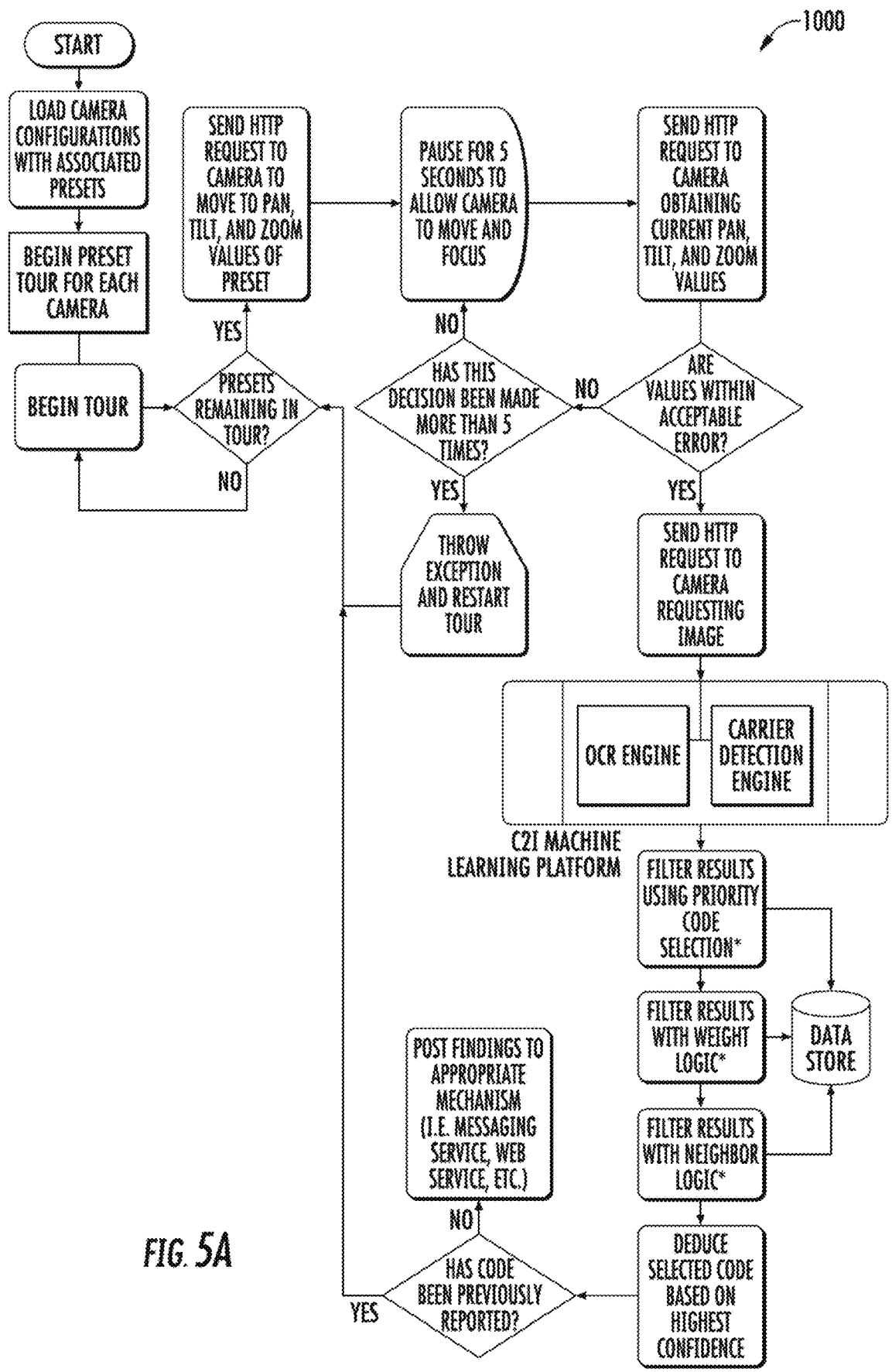
FIGS. 5A-5D are flowcharts of rail service flow in the tracking system of FIG. 1.
Figure 5B:
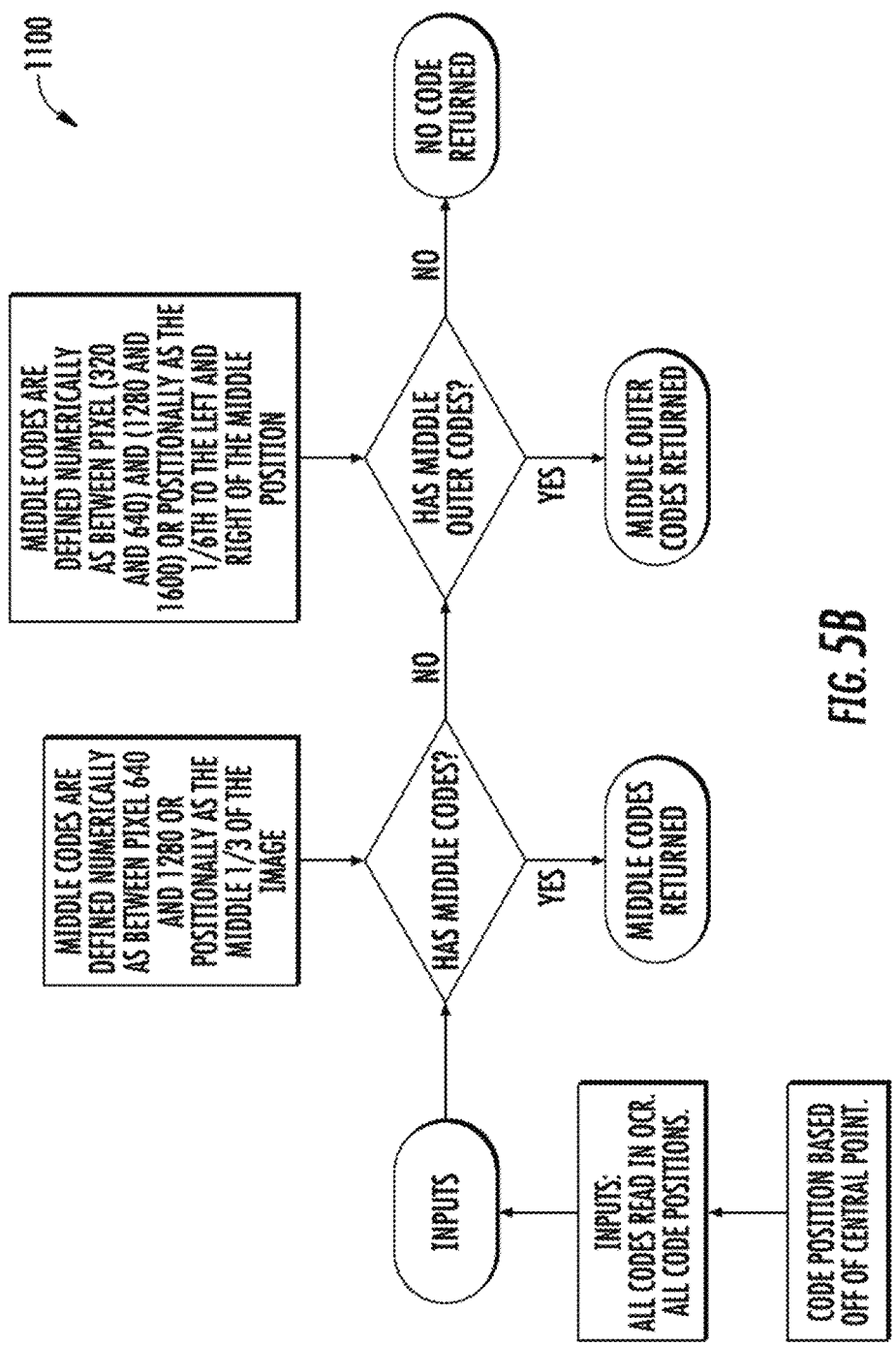
Figure 5C:
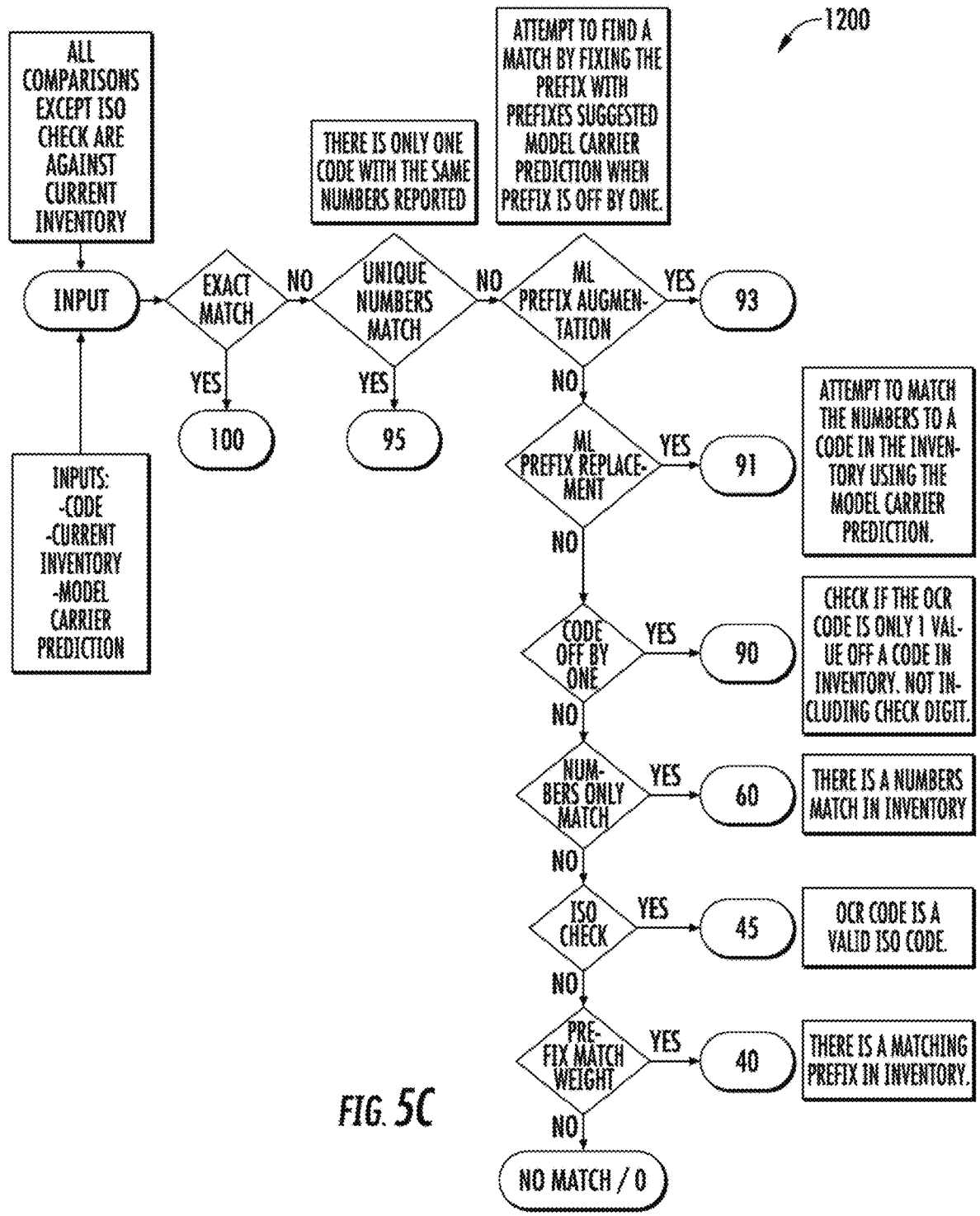
Figure 5D:
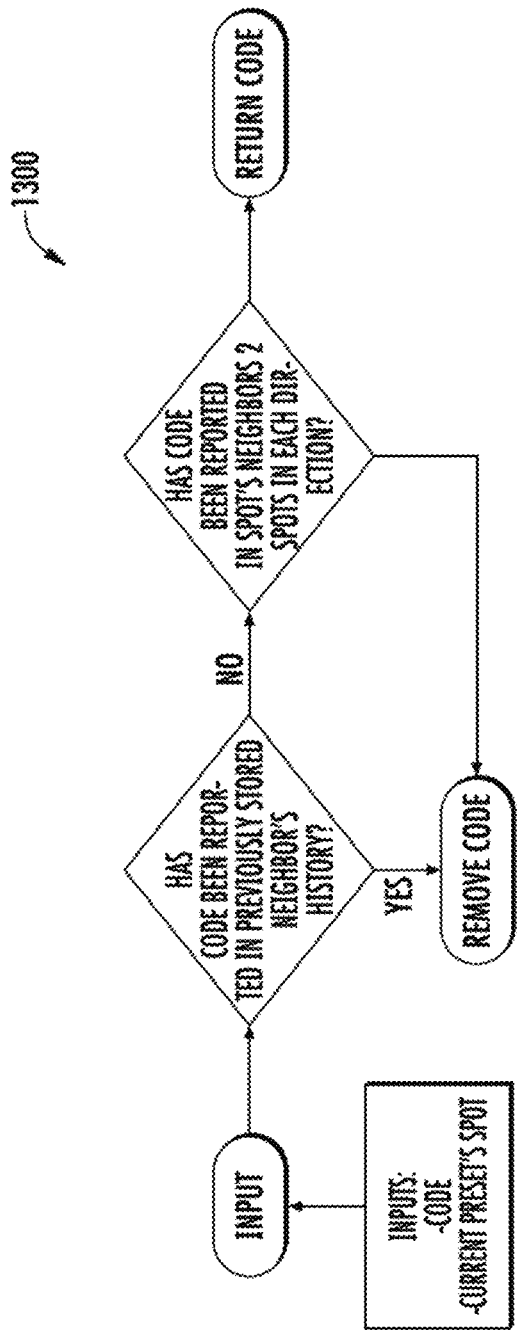

Referring now additionally to FIGS. 2-4, another embodiment of the tracking system 110 is now described. In this embodiment of the tracking system 110, those elements already discussed above with respect to FIG. 1 are incremented by 100 and most require no further discussion herein.

Referring to FIG. 2, the container data flow process of the tracking system 110 is described. Here, the tracking system 110 illustratively includes a plurality of PTZ cameras 112a and a plurality of fixed cameras 112b configured to monitor the plurality of containers within the railway yard 18. In particular, the plurality of fixed cameras 112b may be situated to monitor rails with the railway yard at strategic locations. The plurality of PTZ cameras 112a may be used to more flexibly monitor the rest of the railway yard.

The tracking system 110 illustratively includes a PTZ module 122 coupled between the plurality of PTZ cameras 112a and the server 113. The PTZ module 122 is configured to control the plurality of PTZ cameras 112a and route data flow therefrom. The tracking system 110 illustratively includes a choke module 123 coupled between the plurality of fixed cameras 112b and the server 113 and configured to manage the dataflow therebetween.

The tracking system 110 illustratively includes an analysis module 125 coupled to the database 116, a messaging module 126 coupled to the analysis module, and a client 121 in communication with the messaging module. The analysis module 125 is configured to analyze data within the database 116 for slot events. The messaging module 126 is configured to generate messages based upon the output of the analysis module 125 and send appropriate messages to the client 121.

In this embodiment, the server 113 comprises a C2I Intermodal Vision System (IVS) platform. In particular, the server 113 is configured to classify each container with a vehicle type, and a container type. The server 113 is also configured to process the image data from the pluralities of PTZ and fixed cameras 112a, 112b with optical character recognition (OCR) processing to generate text strings, determine a color of each container, and generate image data associated with a logo carried by the container. For a respective container, using the text string, the logo image data, and the determined color, the server 114 is able to track and identify the respective container within the railway yard 18.

Referring to FIG. 3, the rail automation flow of the tracking system 110 is described. In this flow, the tracking system 110 illustratively includes a plurality of three dimensional (3D) sensors 111 (i.e. a sensor that provides 3D data regarding a sensed object), and an occupancy module 127 coupled between the plurality of 3D sensors and the server 113. The occupancy module 127 is configured to manage the dataflow between the server 113 and the plurality of 3D sensors 111 and determine whether assigned tracks are currently occupied by containers.

The tracking system 110 illustratively includes a fixed module 130 coupled between the plurality of fixed cameras 112b and the server 113 and configured to manage the dataflow therebetween. The tracking system 110 illustratively includes a locomotive module 131 coupled to the database 116 and a user application module 132 also coupled to the database. The locomotive module 131 is configured to control movement of locomotives in the railway yard 18. The user application module 132 is configured to process user requests for locomotive movement.

The tracking system 110 illustratively comprises a communications module 133 coupled to both the locomotive module 131 and the user application module 132. Also, the tracking system 110 illustratively comprises a visual track occupancy system head end (VTOS-HE) module 134 coupled to the communications module 133 configured to receive messages from the communications module. For example, the messages may comprise a JavaScript Object Notation (JSON) format message. Of course, other message formats can be used. The server 113 is configured to determine railcar classification and track occupancy detection within the railway yard 18.

Referring to FIG. 4, the safety flow process of the tracking system 110 is described. Here, the tracking system 110 illustratively includes a safety module 135 coupled between the plurality of fixed cameras 112b and the server 113. The server 113 is configured to monitor for illegal parking and speeding in the railway yard 18, monitor for stop bar violations in the railway yard, monitor for safety gear violations in the railway yard, and monitor for abandoned/idled objects in the railway yard.

It should be appreciated that the server 113 may be situated in the cloud infrastructure for some embodiments. In these cloud embodiments, the controller modules (i.e. the PTZ module 122, the choke module 123, the occupancy module 127, the fixed module 130, the locomotive module 131, the communications module 133, and the safety module 135) for data flows would be local to the railway yard 18.

Referring now additionally to FIGS. 5A-5D, flowcharts 1000, 1100, 1200, 1300 illustrate rail service flow in an exemplary embodiment of the tracking system 110. In particular, flowchart 1000 shows control of the plurality of cameras 12a-12c, and how they are panned within the railway yard 18. Also, the flowchart 1000 shows how images are sorted for OCR processing. Flowchart 1100 shows images are processed in sectional fashion, prioritizing the middle portion of the image. Flowcharts 1200, 1300 show how the tracking system 110 parses and identifies vehicle classification values.

Figure 6:
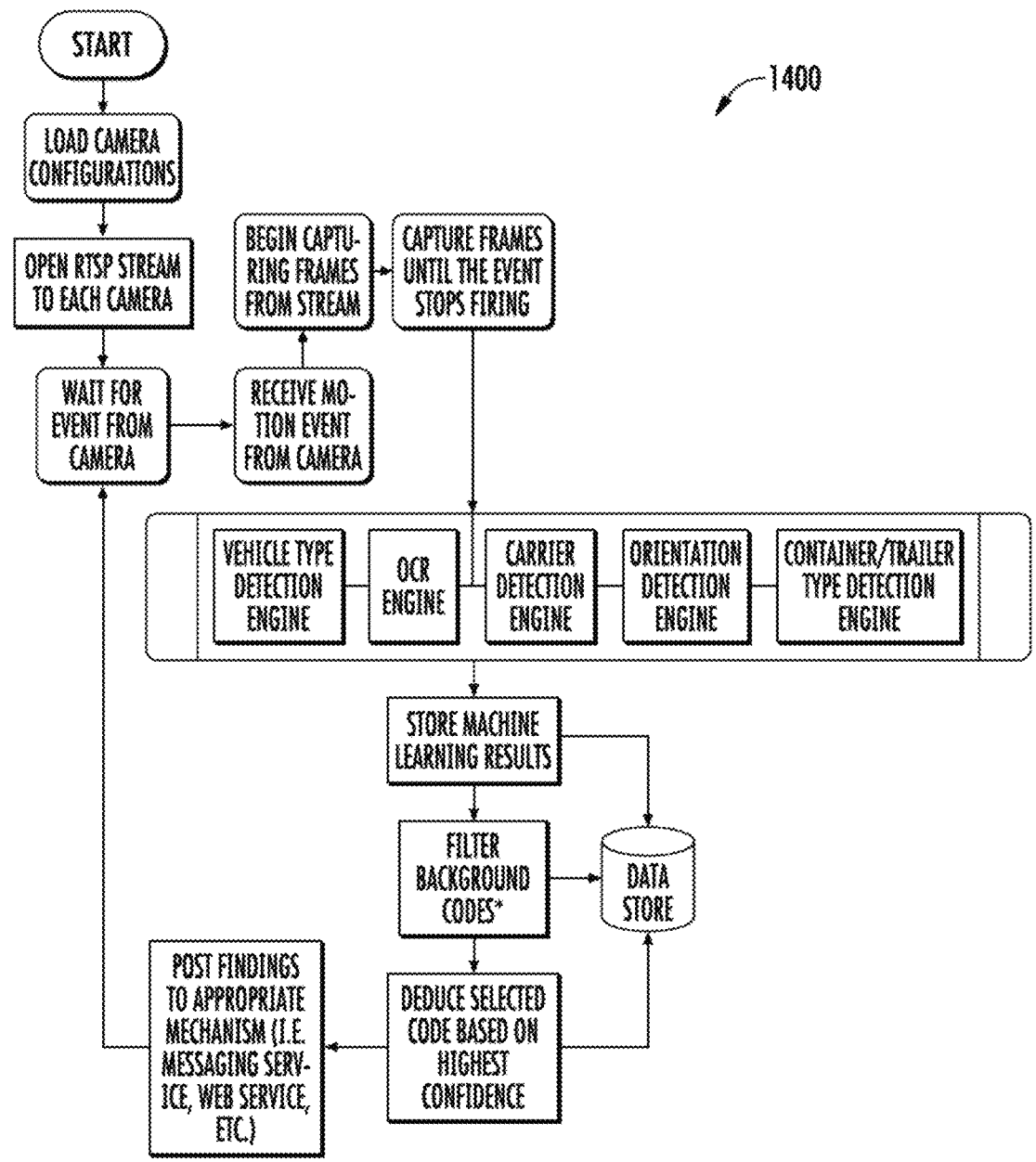
FIG. 6 is a flowchart of choke flow in the tracking system of FIG. 1.

Referring now additionally to FIG. 6, a flowchart 1400 illustrates the choke flow in an exemplary embodiment of the tracking system 110. In particular, the tracking system 110 times streams from the plurality of cameras 12a-12c based upon the detection of events at the cameras.

Figure 7:
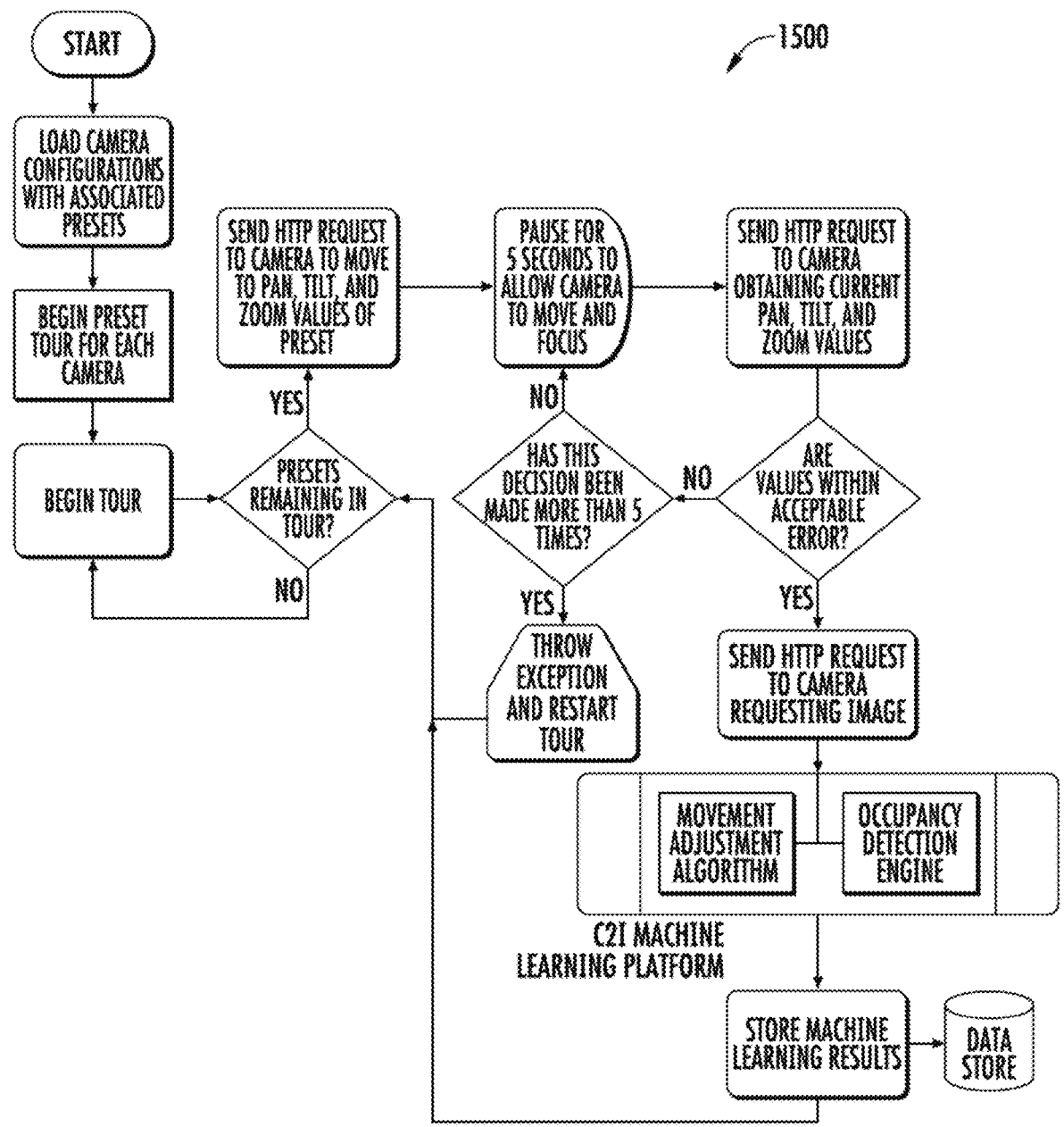
FIG. 7 is a flowchart of occupancy flow in the tracking system of FIG. 1.

Referring now additionally to FIG. 7, a flowchart 1500 illustrates occupancy flow in an exemplary embodiment of the tracking system 110. Again, the flowchart 1500 shows control of the plurality of cameras 12a-12c, and how they are panned within the railway yard 18. The images are fed into the occupancy detection algorithm, which comprises a machine learning component.

Figure 8:
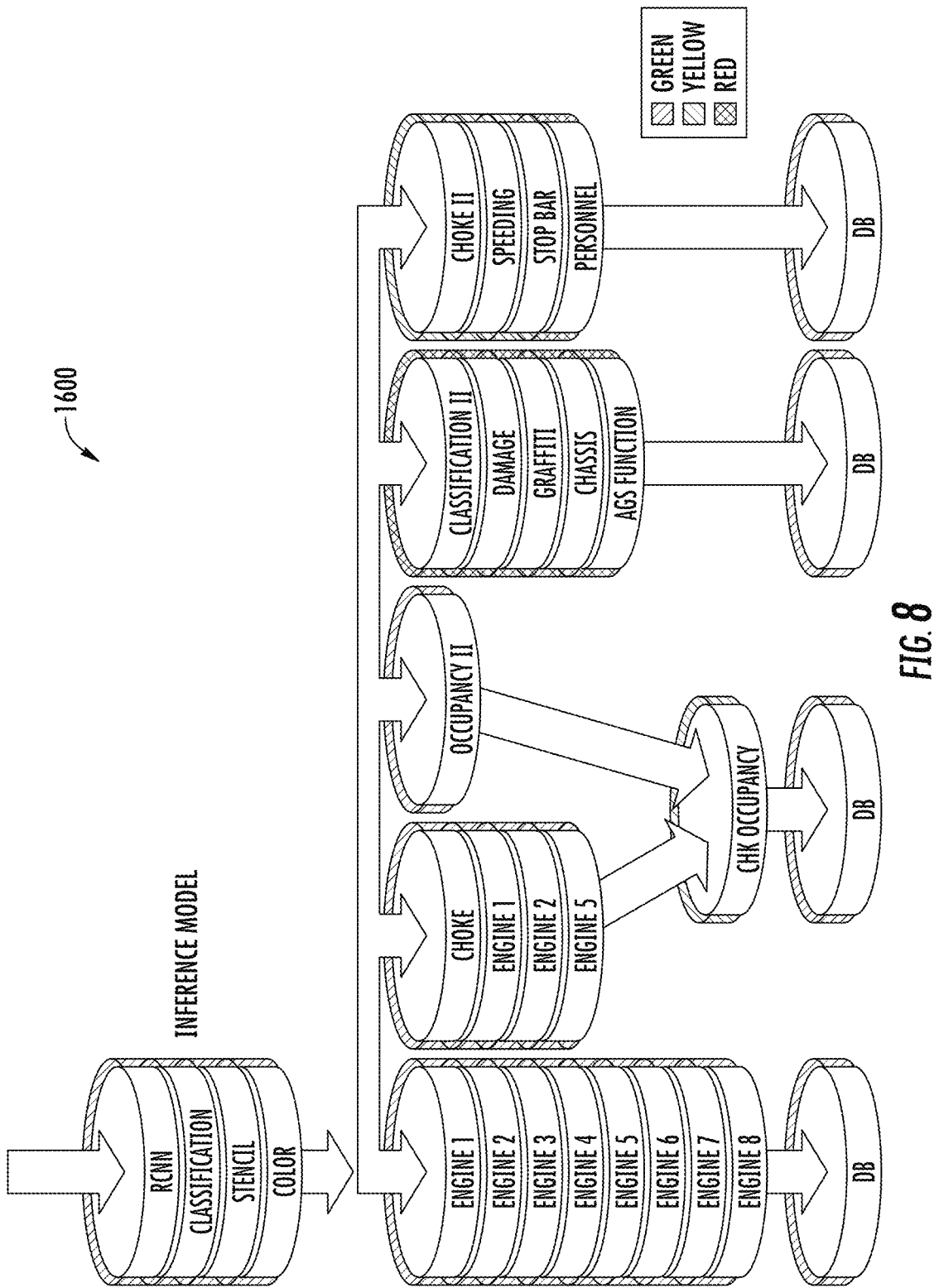
FIG. 8 is a schematic diagram of the first example embodiment of the tracking system.

Referring now additionally to FIG. 8, a diagram 1600 illustrates computational engines of an example embodiment of the tracking system 110. In this embodiment, the computation engines illustratively comprise an interference model outputting downstream in a plurality of columns. The plurality of columns comprises a choke occupancy column, and a classification column.

Figure 13:
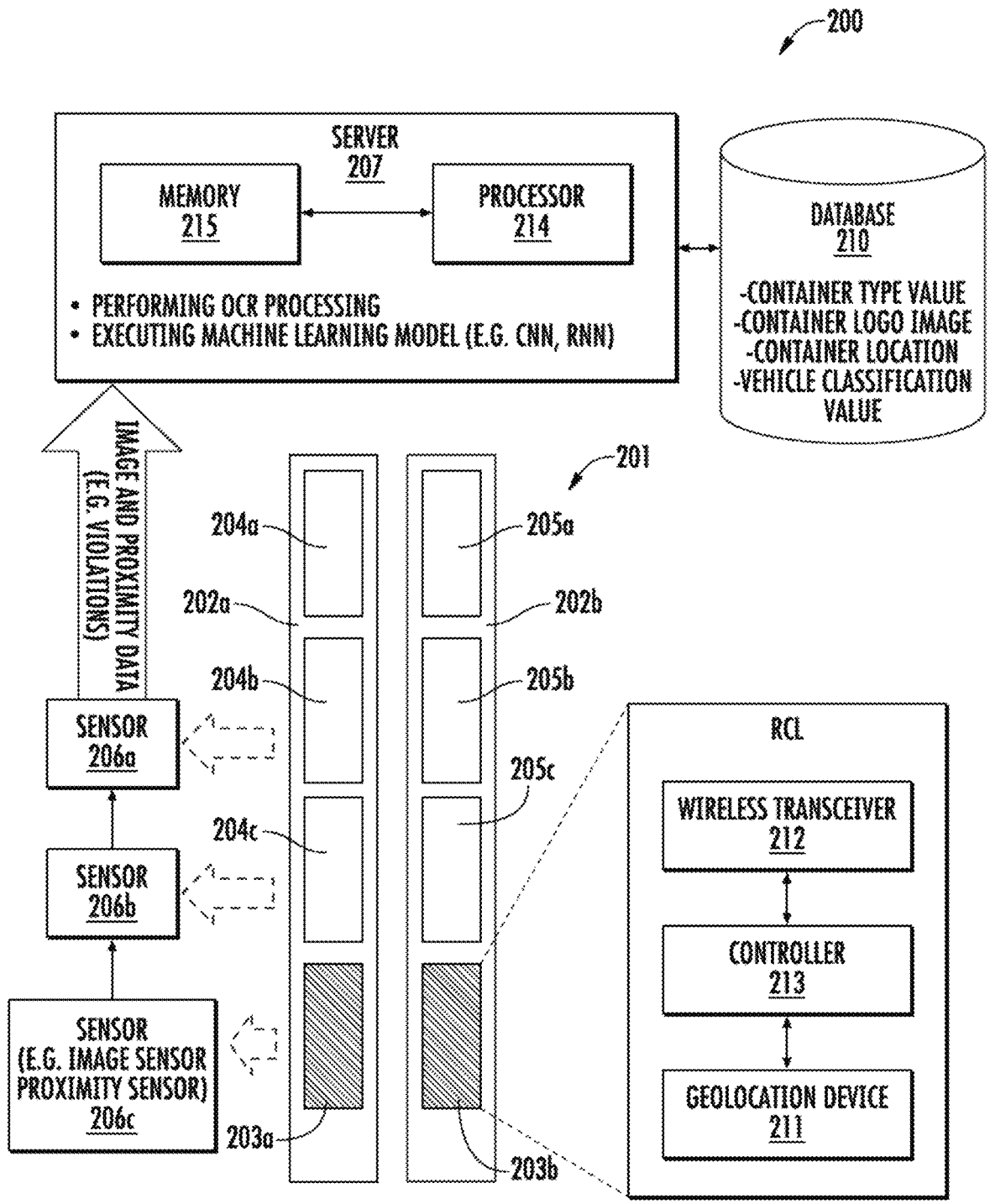
FIG. 13 is a schematic diagram of a control system, according to a second example embodiment of the present disclosure.

Referring now to FIG. 13, a control system 200 according to the present invention is now described. The control system 200 is for a railway yard 201 with a plurality of railroad tracks 202a-202b. As will be appreciated, one or more of the features described above in the tracking system 10, 110 may be incorporated into the control system 200.

The control system 200 illustratively includes a plurality of RCLs 203a-203b and sets of railcars 204a-204c (e.g., a container, a railcar container, boxcar, a cargobeamer car, a coil car, a combine car, a flatcar, such as a container flatcar, a schnable car, a gondola car, a Presflo and Prestwin car, a bulk cement wagon car, a roll-block car, slate wagon car, stock car, a tank car, a tank wagon car or tanker, a milk car, a "Whale Belly" car, a transporter wagon car, and a well car), 205a-205c respectively associated therewith on the plurality of railroad tracks 202a-202b. As will be appreciated, each RCL 203a-203b is capable of pushing or pulling a respective set of railcars 204a-204c, 205a-205c on the plurality of railroad tracks 202a-202b.

Each RCL 203a-203b illustratively comprises a geolocation device 211 (e.g., global positioning service (GPS) receiver) configured to generate a geolocation value for a respective RCL, a wireless transceiver 212 configured to enable remote control, and a controller 213 coupled to the wireless transceiver and the geolocation device. For example, the wireless transceiver 212 may comprise a cellular transceiver, or a WLAN transceiver (e.g., WiFi, WiMAX).

In some embodiments, each RCL 203a-203b comprises a plurality of onboard image sensors coupled to the controller 213b and generating a corresponding plurality of video streams. The controller 213 is configured to transmit the plurality of video streams to a remote control.

The control system 200 illustratively includes a plurality of railyard sensors 206a-206c configured to generate railyard sensor data of the plurality of railroad tracks 202a-202b. In some embodiments, the plurality of railyard sensors 206a-206c may comprise an image sensor configured to generate railyard image data. In other embodiments, the plurality of railyard sensors 206a-206c may comprise additionally or alternatively a proximity sensor (e.g., range finder sensor, pressure sensor) configured to detect a presence of plurality of RCLs 203a-203b.

The control system 200 also includes a server 207 in communication with the plurality of RCLs 203a-203b and the plurality of railyard sensors 206a-206c. The server 207 is configured to generate a database 210 associated with the sets of railcars 204a-204c, 205a-205c based upon the railyard sensor data. The database 210 comprises, for each railcar 204a-204c, 205a-205c, a railcar type value, a railcar logo image, and a vehicle classification value.

The server 207 comprises a processor 214, and a memory 215 coupled thereto. In some embodiments, the server 207 comprises a stand-alone computing device or cluster thereof located remote to the railway yard 201 or on-site for latency reasons. In some embodiments, the server 207 may comprise assigned resources in a cloud computing platform, such as Microsoft Azure, Amazon Web Services, or Google Cloud Platform.

The server 207 is configured to generate selectively control the plurality of RCLs 203a-203b to position the sets of railcars 204a-204c, 205a-205c within the plurality of railroad tracks 202a-202b based upon the railyard sensor data. As will be appreciated, each RCL 203a-203b communicates with the server 207 via the wireless transceiver 212. The controller 213 is configured to transmit a plurality of operational values for the respective RCL 203a-203b to the server 207 to provide snapshot of the current status. For example, the plurality of operational values comprises the geolocation value for the respective RCL 203a-203b, but may include a speed value for the respective RCL, a bearing of the respective RCL, a condition of the respective RCL and associated sets of railcars 204a-204c, 205a-205c, and a weather condition of the railway yard 201.

Also, the server 207 is configured to monitor the plurality of RCLs 203a-203b for railyard traffic violations. In particular, the railyard traffic violations may comprise illegal parking and speeding in the railway yard 201, stop bar violations in the railway yard, safety gear violations in the railway yard, and abandoned/idled objects in the railway yard. Moreover, in some embodiments, the server 207 is configured to monitor the behavior of personnel within the railway yard 201. For example, the server 207 is configured to monitor personnel for safety rule compliance.

The server 207 is configured to identify each railcar 204a-204c, 205a-205c based upon the railyard image data. The server 207 is configured to perform OCR on the railyard image data. The server 207 is configured to perform machine learning on the railyard image data. In particular, the server 207 may be configured to execute a first machine learning model comprising a CNN trained to predict a location of text sequences in the railyard image data. The server 207 is configured to execute a second machine learning model comprising a RNN for scanning the text sequences and predicting a sequence of missing characters.

Yet another aspect is directed to a method for operating a control system 200 for a railway yard 201 with a plurality of railroad tracks 202a-202b. The control system 200 includes a plurality of RCLs 203a-203b and sets of railcars 204a-204c, 205a-205c respectively associated therewith on the plurality of railroad tracks 202a-202b, and a plurality of railyard sensors 206a-206c configured to generate railyard sensor data of the plurality of railroad tracks. The method comprises operating a server 207 in communication with the plurality of RCLs 203a-203b and the plurality of railyard sensors 206a-206c to generate a database 210 associated with the sets of railcars 204a-204c, 205a-205c based upon the railyard sensor data, the database comprising, for each railcar, a railcar type value, a railcar logo image, and a vehicle classification value. The method includes operating the server 207 to selectively control the plurality of RCLs 203a-203b to position the sets of railcars 204a-204c, 205a-205c within the plurality of railroad tracks 202a-202b based upon the railyard sensor data.

One of the most expensive challenges for train companies is maintaining and operating a railroad classification yard. The function of the railroad classification yard is to sort incoming trains in order to build outgoing trains. Within the yard there are rail cars and locomotives; the rail cars provide storage for the cargo to be shipped and the locomotive moves the train from point A to point B. Locomotives are also used to move rail cars within the railroad classification yard. Each of the controlled locomotives are commonly referred to as an RCL. Each RCL in the railroad classification yard typically contains a control module that controls the train's movement either in a forward direction or a backward direction.

The control module also controls the speed at which the train will move. The control system 200 uses VTOS-HE and provides railyard automation (RYA). The VTOS-HE is placed in an RCL and transmits instructions to the control module within the RCL regarding the direction and speed of the RCL. VTOS-HE can receive information from a remote location outside of the RCL and without the intervention of a human operator.

VTOS-HE is compatible with the VTOS system, which monitors the position, direction, and speed of individual rail cars, locomotives, and other debris or objects throughout the rail yard. VTOS-HE continuously utilizes the VTOS system to generate instructions to then be transmitted to its corresponding control module in the RCL. In addition, the VTOS-HE device can be mounted in an existing head end mounting bracket and meets all railroad standards for vibration and environmental regulations.

Furthermore, VTOS-HE will incorporate real time self-checking of all major components and subsystems. It will also have a positive indication of a failure and redundancies will be built into the system to protect against any accidents or catastrophic events.

The VTOS-HE system will incorporate a GPS so that the end user can pinpoint the location of the RCL within the classification yard. This control system 200 is intended to reduce injuries, fatalities, and costs associated with a railroad classification yard. In turn this control system 200 will provide a safer and less costly alternative to the typical approaches.

This control system 200 provides GPS coordinates and wirelessly connects automatically with a VTOS across a railroad classification yard. The railroad classification yard has a multitude of tracks upon which the individual locomotives move throughout the yard. This system will determine and report the speed and direction of a particular locomotive or remote control locomotive (RCL).

With this system it is designed so that locomotive in the classification yard of a railyard are operated remotely without the need for a human being present in the RCL. The VTOS system will use a pole with a light tree that is positioned in the classification yard. The light tree is used with the VTOS system. Additionally a pole with a camera is positioned in the yard to provide images of the yard including any locomotives and will able to document real time movement of individual locomotives in the yard. When the system is fully implemented multiple cameras may be used in the yard as well as multiple light trees.

With this system, control of the RCL is governed by commands from the VTOS-HE system and not by a human operator. Although the potential for human operation of the locomotive may exist, VTOS-HE can override the operator if the instructions are not followed.

VTOS-HE is intended to work in tandem with VTOS 1 when a locomotive is in the yard, approaching the yard, or departing from the yard. Once a locomotive is in either of the three locations VTOS-HE is automatically implemented and will immediately begin wirelessly receiving information from the VTOS system. The VTOS-HE unit is placed in the RCL to transmit information between the VTOS system and the other components of the VTOS-HE system. The information from VTOS will then be computed by VTOS-HE and then an instruction is quickly provided to the control module, provided by the RCL/RCO system. The control module actually controls the function of the locomotive.

Once the control module receives an instruction from VTOS-HE, it then carries out the instruction. For example, VTOS-HE may transmit an instruction to the control module or backhaul to slow down the locomotive 20 to 1 mph. The control module will then slow the locomotive to 1 mph.

In order to give the operator a visual reference a camera is incorporated into the VTOS system in order to provide visual images of the individual RCLs in the classification yard. This camera will operate in all lighting conditions and may include the capability to capture thermal imaging. However, an option is provided that allows an individual to manually override the instruction provided by VTOS-HE and submit his or her own instructions to the backhaul. This individual may be in the train or in a remote location. If an individual overrides VTOS-HE and inputs his or her own instructions or controls the locomotive manually, VTOS-HE will monitor and record how the train is controlled and the speed of the train.

Each locomotive in the yard containing a VTOS-HE system can transmit through VTOS the location of the locomotive it is installed into other VTOS head end units installed in other RCLs in the rail classification yard. The head end units then use that information along with the information provided by VTOS to generate and submit instructions to the corresponding control module in the RCL.

VTOS-HE will also collect mechanical information from the RCL/RCO system and transmit that information through VTOS. This is important for efficiency. If a locomotive has a mechanical malfunction, VTOS-HE will wirelessly transmit such information through VTOS. In turn the correct repairs can be performed quickly. Furthermore, the VTOS-HE can share this information through the VTOS network to other RCLs in the yard. Once informed, the VTOS-HE on other RCLs can instruct the control module accordingly so that a potential collision is avoided.

In addition to VTOS-HE receiving and transmitting information wirelessly, it will also incorporate real time self-checking of all major components and subsystems. It will also have positive indication of a failure and redundancies will be built into the system to protect against any accidents or catastrophic events.

The VTOS-HE system will be able to communicate with the RCL/RCO system via a serial data or TCP/IP communication protocol remotely and determine which track the RCL locomotive is occupying. In order to maximize the security of the system, the information that is transmitted in the VTOS-HE system may be encrypted. Additionally access to the system may be password protected. With this application multiple backhauls and multiple relays may be used to transmit information throughout the yard.

In the following, a discussion of exemplary features that may be included in the tracking system 10, 110 and control system 200 now follows. The purpose of this document is to describe the utilities and capabilities of the IVS and its subservices.

Machine Learning Models 2.1. Stencil Recognition with OCR

The Stencil recognition engine provides OCR to the system. This engine uses two machine learning models in conjunction. The first model is a neural network trained to predict the locations of text sequences in the image, for example, a region-based neural network trained to predict the locations of text sequences in the image, or in an example, a region-based convolutional neural network (R-CNN) trained to predict the locations of text sequences in the image. The cropped text from each of these outputs is then given to a specialized neural network, for example a recurrent neural network (RNN) or other suitable neural network, which scans the text and predicts the sequence of characters it sees. This engine handles both horizontally— and vertically-oriented text, enabling it to predict on the text patterns commonly used on intermodal carriers.

2.2. Brand Recognition

The Brand Recognition Engine recognizes the shipper brand of a railcar or trailer. For example, JBHUNT, YRC, FedEx, UPS, etc.

2.3. Asset Type Recognition Engine

The purpose of the Asset Type Recognition Engine is to classify the type of asset. For example, "railcar/railcar container", "container", "trailer", "Chassis", "pickup truck", "bobtail", "hostler", "pedestrian", "worker" etc. In addition to the type of asset, the model also returns a bounding box surrounding the asset in the image.

2.4. Color Engine

The Color engine utilizes and reuses the R-CNN engine's localization to infer the color of the railcar or trailer's face. This engine can use both computer vision and machine learning to achieve this.

Using computer vision, the engine may return the most dominant colors in the cropped image as numeric coordinates in any given color space (e.g., RGB, HSV, YUV, LAB, etc.). Using machine learning, the engine may utilize a CNN trained to predict the dominant color of the image in human-readable form (e.g., "Red", "Blue", "White", etc.).

2.5. PTZ Slot Classification Engine

The PTZ Slot Classification Engine is given an image snapshot from the PTZ camera. The image is then fed to an R-CNN model trained to detect the location and traits of the faces of railcars and trailers. The model also can determine the front and rear ends of the railcars and trailers.

This model aids the system in localizing the contents of the parking spot and classifies the carrier (identified by their logos, if any) and type of asset (See § 2.3). The classifications and especially the locations output by the R-CNN model are able to be used in other parts of the system to filter and/or validate the output predictions from other adjacent engines.

2.6. Unique Visual Characteristics Engine

Detect additional anomalies that may be used to further identify a particular asset, for example, rust or damage, graffiti, etc.

2.7. Weather Analysis Engine

The main purpose of the Weather Analysis Engine is to visually detect weather events that harm the systems operation, for example, heavy rain or fog.

2.8. Travel Direction Engine

The Travel Direction Engine determines the direction that an object is traveling with respect to the camera in an image or series of images.

PTZ Service 3.1. Service Overview

PTZ uses pan-tilt-zoom cameras as a way to survey the yard. Images from these cameras are fed through various engines to be reported to the database.

3.2. Service Operation

PTZ cameras are mounted throughout the yard. Pre-set locations are used to isolate spots to report codes. Each preset is meant to correlate to a specific location in the yard. The cameras cycle through their pre-set locations to continuously cycle through the yard's spots, taking a picture at each pre-set location. These pictures are sent to the PTZ Classification Module and OCR engine. After being processed by these engines, the OCR engine's code results are then weighted through the weighting system engines. The weighting engine system results can be filtered through various means. Codes not filtered are reported to the database, corresponding to the current pre-set location. Current filtration systems include: Classification R-CNN filter: codes read that are not the fronts of railcars are removed from the possible results from the spot in select locations. Priority code selection: codes read that are not central to the image are removed from the possible results. Neighbors Logic: remove codes that have been reported nearby to reduce repetition of codes.

3.3. PTZ Classification Module

The PTZ Classification module uses the PTZ Carrier Classification Engine, Color Engine, and unique visual characteristics engine to provide additional detail of the contents of a slot observed by PTZ, for example, "White JBHUNT with Rusted Top", "Blue Trailer", "Brown Stacked Chassis" ctc.

3.4. Stencil Recognition with OCR (See § 2.1).

3.5. Weighting

System for assigning confidence (weight) to OCR read codes of railcar stencils.

Weight—Value representing the likelihood of a correct code match.

OCR—Engine that takes images of characters and produces text representative of what the engine reads.

Prefix—The first four values of a railcar code/stencil.

3.5.3. Inputs:

OCR code-A code read by the OCR engine, from images provided by a camera. Current Inventory-A list of railcar codes in the yard obtained from the Database. Model Carrier Prediction-A prediction from a machine learning model that is designed to predict carriers. The model carrier prediction is then mapped to common carrier prefixes which are used in the stencil engine system.

Weighting will be composed of eight steps (Engines 1-8). Each step will attempt to provide a weight for an OCR generated code. If a step is successful, the weight, matched code and accompanying reasons list is returned, at which points the remaining steps will not occur. If it is not successful it continues onto the next step. In most cases, the OCR code is compared against the current inventory. Weighting/confidence values are variable to customer needs. Names are provided as a shorthand for the operations the engine performs. If no engine is successful in performing a match, a weight of zero is assigned, with the failure reasons of each engine attached. 3.5.5. Engine 1: Exact match.

In this step, the OCR code is shortened to the first ten characters (or length of current inventory). It is then compared against a list of codes in current inventory. If the code matches exactly with any code in the inventory, this step is successful. The input is shortened, as the current inventory codes are stored as ten digit codes. On success: Returns a list of reasons that contains only an exact match confirmation. Returns the exact matching string. On failure: Reasons list adds an exact match failure description.

3.5.6. Engine 2: Unique Numbers Match.

In this step, the OCR code's numbers, except the check digit are compared against the numbers in the current inventory. If there is only one match then this step is successful. On success: Returns a list of reasons that contains an exact match failure and a unique numbers match success description. Returns the unique matching string. On failure: List adds a unique numbers match failure description.

3.5.7. Engine 3: ML Prefix Augmentation

If the model carrier prediction is not empty, then the carrier prediction is correlated to a list of known carrier prefixes. If the shortened OCR code (the code without check digit), matches in nine out of ten of its values to a code in the current inventory, the carrier prefix list is used to substitute the OCR code's original prefix. Only prefixes within one character difference are attempted. If this creates an exact match in the inventory this step is successful. On success: returns a list of reasons that contains an exact match failure a unique numbers match failure and an ML Prefix Augmentation success description. Returns the matching string after augmentation. On failure, list adds an ML Prefix Augmentation failure description.

3.5.8. Engine 4: ML Prefix Replacement

If the model carrier prediction is not empty, then the carrier prediction is correlated to a list of known carrier prefixes. The carrier prefix list is used to substitute the OCR code's original prefix. Only prefixes within one character difference are attempted. If this creates an exact match in the inventory this step is successful. On success: returns a list of reasons that contains an exact match failure, a unique numbers match failure, an ML Prefix Augmentation failure description, and an ML Prefix Replacement success. Returns the matching string after Replacement. On failure: List adds an ML Prefix Replacement failure description.

Engine 5: Code Off by One.

If the shortened OCR code (the code without check digit), or the full ISO code matches in all but one of its characters to a code in the current inventory, this step is successful. On success, returns a list of reasons that contains failure reasons for above steps and a code off by one match success. Returns the matching string. On failure, list adds a code off by one match failure description.

Engine 6: Numbers Only Match.

If the OCR code's numbers (excluding the check digit) are an exact match in the inventory, this step is successful. On success, returns a list of reasons that contain failure reasons for above steps and a numbers only match success. Returns the full OCR code read without any modifications. On failure, list adds a numbers only match failure description.

3.5.11. Engine 7: ISO Check

If the code is compliant with ISO 6346, this step is successful. On success, returns a list of reasons that contain failure reasons for above steps and an ISO check success.

Returns the full OCR code read without any modifications. On failure, list adds an ISO Check failure description.

3.5.12. Engine 8: Prefix Match

If the prefix of the OCR code matches any prefix in the inventory, this step is successful. On success, returns a list of reasons that contain failure reasons for above steps and an ISO check success. Returns the full OCR code read without any modifications. On failure, list returns all failure reasons encountered.

3.5.13. Stencil Engine Examples:

Each example case is followed by the engine that successfully handles the case. Code Read represents a stencil code read through OCR. All examples use this sample current inventory of the following codes: ABCD123456; QWER123457; WASD123457; and SWRU234567.

Example Case 1: Engine 1

Code Read: ABCD123456

Match Condition: Exact string found in inventory.

Code Returned: ABCD123456

Explanation: The exact string exists in the inventory. Meeting criteria for Engine 1.

Example Case 2: Engine 2

Code Read: WASD123456

Match Condition: Unique Numbers Match.

Code Returned: ABCD123456

Explanation: There is only one code in the current inventory with the numbers 123456.

Meeting criteria for Engine 2.

Example Case 3: Engine 3

Code Read: KWER123457

Machine Learning Prediction: railcar prefixes: QWER, DDCD.

Match Condition: ML Prefix Augmentation.

Code Returned: QWER123457

Explanation: There is a code that is one value off of our prediction. After replacing with prefix QWER there is a match.

QWER123457 is the only one in range to try replacement. Meeting criteria for Engine 3.

Example Case 4: Engine 4

Code Read: KPER123457
Machine Learning Prediction: railcar prefixes: QWER, DDCD.
Match Condition: ML Prefix Replacement.
Code Returned: QWER123457
Explanation: There is no code that is one value off of our prediction. After replacing with prefix QWER there is a match.
QWER123457 and DDCD123457 are both attempted to be matched against inventory.
Meeting criteria for Engine 4.

Example Case 5: Engine 5

Code Read: KWER123457
Machine Learning Prediction: railcar prefixes: NONE
Match Condition: Code Off by One.
Code Returned QWER123457
Explanation: There is a code that is one value off of our prediction. There are no railcar prefixes to attempt to match with. The code is off by one from QWER123457. Meeting criteria for Engine 5.

Example Case 6: Engine 5

Code Read: KWER123457
Machine Learning Prediction: railcar prefixes: ABCD, WART
Match Condition: Code Off by One.
Code Returned: QWER123457
Explanation: There is a code that is one value off of our prediction. There are no matches after attempting prefix replacement. The code is off by one from QWER123457. Meeting criteria for Engine 5.

Example Case 7: Engine 5

Code Read: SWRU234568
Machine Learning Prediction: railcar prefixes: NONE
Match Condition: Code Off by One.
Code Returned: SWRU234567
Explanation: There is a code that is one value off of our prediction. There are no railcar prefixes to attempt to match with. The code is off by one from SWRU234567. Meeting criteria for Engine 5.

Example Case 8: Engine 6

Code Read: TYUI123457
Machine Learning Prediction: railcar prefixes: NONE
Match Condition: Numbers only match.
Code Returned: TYUI123457
Explanation: There is one match that has exactly the same numeral values. No railcar prefixes to attempt a match with.
Sending read code. Meeting criteria for Engine 6.

Example Case 9: Engine 7

Code Read: CSQU3054383
Machine Learning Prediction: railcar prefixes: NONE
Match Condition: ISO Valid.
Code Returned: CSQU3054383
Explanation: The code read is an ISO valid code. Meeting criteria for Engine 7.

Example Case 10: Engine 8

Code Read: WASD3054383
Machine Learning Prediction: railcar prefixes: NONE
Match Condition: Prefix in inventory.
Code Returned: WASD3054383
Explanation: The code matches a prefix in current inventory.
Meeting criteria for Engine 8.

Example Case 11: None

Code Read: WWW3054383
Machine Learning Prediction: railcar prefixes: NONE
Match Condition: NONE
Code Returned: NONE
Explanation: The code has not met any weighting conditions. Meets no engine criteria.

Choke Service 4.1. Service Overview

The Choke Service takes advantage of cameras set up at several "choke points" throughout the yard. Choke cameras are set up at entrances and exits to rows, and are sometimes also setup at various positions within a given row. The main idea of choke is to detect assets entering and leaving a particular section of the yard in order to gain further awareness of the movements and locations of assets. Choke cameras capture images of assets as they drive by and analyze the images to better understand the asset. Overall, the idea is for choke to understand, as deeply as possible, each asset that drives by.

4.2. Service Operation 4.2.1. Choke Camera

Wait for an object to enter the field of view. Capture a sequence of raw images while the object is in view. The sequence should start approximately at the time the object enters the view, and end at approximately the time the object leaves the view. Encode and save the sequence to filesystem storage. Send image sequence and relevant object detection information to the "choke consumer" for further analysis.

4.2.2. Choke Consumer

Wait for a sequence of images from the choke consumer. Send the image sequence to the Choke Classification Engine (See § 4.3) to detect relevant information regarding the assets in the image sequence. Stencil recognition with OCR: the sequence of images is sent to the OCR engine which returns all text strings found in the sequence of images as well as the bounding box of the detected text in image coordinates. (See § 2.5).

Background Asset Detection: many of the scenes viewed by the choke cameras contain stationary assets that should be ignored by choke. These are referred to "background assets". Currently, background assets are detected based on the position of the OCR bounding box. However, additional methods including machine learning can be used as well.

Weighting: Strings return from OCR are sent to "weighting" the primary purpose of weighting is to match (potentially incomplete or slightly erroneous) OCR results to actual "current inventory" assets. (See § 3.5).

Direction analysis: currently a variety of methods are used to determine the direction the vehicle is traveling with respect to the camera. Object detection information from the camera is used to infer the direction of travel. If known, the previous location of the asset is also used to infer direction.

For the travel direction engine. (Sec § 2.7). Publish all information gathered about the asset to our internal database and send a "Choke-Point" message to the customer via a restful API.

4.3. Choke Classification Engine

In this stage, a combination of models are used to form a more detailed description of the asset. The Asset Type Recognition Engine in combination with the Color Engine, Brand Recognition, and the Unique Visual Characteristics Engine create a detailed qualitative description of the asset. For example, "Gray FedEx railcar, no rust or damage, carried by a Black Bobtail", "Red Trailer with No Logo, carried by a Yellow Hostler", "White JBHUNT with a Rusted Top carried by a Blue Bobtail" etc.

4.4. Weighting

Engine 1: (See § 3.6.5).
Engine 2: (See § 3.6.6).
Engine 5: (Sec § 3.6.9).

Occupancy Service

Identifies the occupancy status of each spot in the intermodal yard. Occupancy R-CNN is robust in adverse weather and light conditions.

5.2. Service Operation

PTZ camera programmatically moves from one preset to another to cover different sections of the yard. PTZ camera snaps the Image for each preset. It also retrieves predefined box coordinates for that preset from the database which are sent to the occupancy module. The occupancy module is a trained R-CNN on specific images meant for determining if the spot is occupied. This module detects every railcar in the image and extracts coordinate positions of each railcar in a rectangular shape. Predicted boxes along with retrieved preset boxes are sent to mapping module.

Mapping module maps the predicted box to the known box to find the correct spot id of each detected railcar. Spots with mapped railcar box is labelled as occupied otherwise unoccupied.

5.3. Preparing Presets

Presets are taken in an optimized way to ensure minimum overlapping of spots exist between two consecutive presets. In case, multiple cameras from different poles can potentially cover the same region, pole with better coverage is given preference. Once preset is decided, every spot within preset was labeled with a spot id and a rectangular box covering the spot. Finally, this is repeated for each preset in different light and weather conditions to ensure robustness in varied weather conditions.

5.4. Object Detection Algorithm

R-CNN machine learning algorithm is trained to detect the railcars from images. Given an input image, it detects all the relevant object with their location in the image. The R-CNN algorithm is trained over thousands of training images with the goal of detecting railcars in input image with their locations.

5.5. Mapping Algorithm

Mapping algorithm consists of two sub-algorithms, drift-fix and rules to assign spots with occupancy decision (occupied/unoccupied). The drift-fix algorithm aligns the predicted boxes against the preset boxes by performing grid search. Search deemed successful when average Intersection over Union (IOU) of given image is greater than a pre-defined threshold value. Once drift is fixed, various rules are written to determine which spots are occupied. These rules are primarily based on the distance between predicted and ground truth box, and their IOUs. Spots that pass through occupancy logic are either labelled as occupied or unoccupied.

Choke-Occupancy Service

The choke occupancy service combines the functionality of the choke service and the occupancy service to monitor areas that the PTZ service cannot.

6.2. Service Operation

6.2.1. Tracking Camera Engine

The tracking camera engine monitors the region monitored by Choke Occupancy from a high level view. The purpose of the Tracking Camera Engine is to monitor vehicle traffic in the region to provide additional context to choke occupancy, such as the visual description (e.g., White JBHUNT carried by a Black Bobtail) as well as behavior and position information. An example output may be "Black UPS carried by a Black Bobtail drove straight through the region and did not park", "White JBHUNT carried by a Blue Bobtail pulled over but did not park", "Yellow Hostler picked up a Blue Amazon Trailer and left the Region". Additionally, GPS data of the vehicle path is provided to further assist the Choke Occupancy Association Engine. All of the information from the Tracking Camera Engine supplements the choke and occupancy information to form a more complete picture of the events that take place in the region.

Operation: the tracking camera uses a static view to track and describe vehicles as they move through the region. Events are reported to the database to help choke occupancy narrow down potential matches between choke events and occupancy events. In some cases multiple cameras are required to monitor one Region, so the Tracking Camera Service is also prepared to synthesize data from multiple adjacent cameras, for example, a tracking data from one camera can be combined with tracking data from another camera to form a complete description of the objects path.

6.2.2. Choke Occupancy Association Engine

Each region is monitored by a choke region occupancy monitor that corresponds to a segment of the yard. A region monitor periodically associates choke events (passing assets) to occupancy changes using the following the steps. First, the database is queried for the choke events and occupancy changes for the current region. The database is queried for all tracking camera service events around the time of the choke and occupancy events. The next step is to disregard choke results that are younger than a determined minimum age, which are those that are unlikely to have already parked based on the time elapsed between the occupancy change and the choke event, as well as the distance from the choke camera to the spot.

The next step is to evaluate the compatibility of each choke result with each occupancy change using a combination of features including the color, brand, and additional characteristics of the railcar determined from choke and tracking. The time of the occupancy change and choke result are also considered, as well as the distance from the choke camera and the occupancy change. Tracking information is also considered, such as the path taken by the vehicle and whether or not the vehicle stopped, parked, or left the region. These considerations are used to create the best (lowest overall match cost) between the choked assets and known occupancy changes and reported to the database. Some choke occupancy regions do not have complete occupancy coverage. The following regions use a separate set of steps to associate choke events to the region. Query the database for the choke events for the current region. The next step is to disregard choke results that are younger than a determined minimum age. The remaining choke results are considered parked in the region and are assigned to every spot in the region.

Automatic Gate Service (AGS)

Identify characteristics of an incoming asset from the gate and associate the characteristics to that asset before adding it into inventory and allowing the asset to pass into the yard. Static cameras are set up at the entry gate to focus on areas of interest for incoming assets. Chassis Camera: lower portion of the asset where chassis codes are normally found. Truck Camera: front portion of the side of the asset where the truck is normally found. Railcar Camera: back portion of the side of the asset where the railcar/trailer is normally found. Top Camera: top of the asset to inspect the top of the railcar. Rear Camera: rear of the asset where the door to the railcar/trailer are normally located. Driver Camera: focused where a truck driver would normally found. As an asset approaches the entry gate, it is forced to stop in view of the camera system.

Image from Chassis camera is classified by the following engines: Assert Type Recognition (See § 2.3); Stencil Recognition with OCR (See § 2.1); Image from the Truck Camera is classified by the following engines; Assert Type Recognition (See § 2.3); Stencil Recognition with OCR (See § 2.1).

Image from the railcar Camera is classified by the following engines: Assert Type Recognition (See § 2.3); Stencil Recognition with OCR (See § 2.1); Color (See § 2.4); Brand Recognition (See § 2.2); and Unique Visual Characteristics (See § 2.6).

Image from the Top Camera is classified by the following engines: Stencil Recognition with OCR (See § 2.1); and Unique Visual Characteristics (See § 2.6). Image from the Rear Camera is classified by the following engines: Stencil Recognition with OCR (See § 2.1); Brand Recognition (See § 2.2); and Unique Visual Characteristics (See § 2.6).

Image from the Driver Camera is simply stored in image data store. These characteristics are associated to the incoming asset and the asset is added to the current yard inventory. The AGS system determines where the asset should be parked and informs the driver of where to park. The asset is then allowed to pass into the yard in order to park where instructed.

Security and Safety Service

The security and safety service identifies instances of employees and other individuals performing actions that are deemed harmful to the intermodal operation.

8.2.1. Speeding

Position the camera so that the field of view contains a large enough portion of the area of interest. Determine the two speeding alarm zones. These alarm zones are positioned at opposite sides of the field of view. Stream video frames from the camera while determining and tracking objects in the scene using object detection and tracking algorithms. Monitor object detections and alarm zones to determine speeding violations.

A speeding violation is determined by the following criteria: the object detection has entered both alarm zones; the difference between the before alarm zone time and the after alarm zone time for the object detection is within the specified threshold; and the time threshold is determined by the position of the camera and the speed limit in the monitored area.

8.2.2. Stop Bar

Position the camera so that the stop bar line is located at the opposite end of where the monitored vehicles enter the field of view. Determine the before and after stop bar alarm zones. The before alarm zone is positioned at the vehicle entrance point in the field of view. The after stop bar alarm zone is positioned between the stop bar and the end of the field of view. Stream video frames from the camera while determining and tracking objects in the scene using object detection and tracking algorithms. Monitor object detections and alarm zones to determine stop bar violations. A stop bar violation is determined by the following criteria: the object detection has entered both alarm zones; the object detection entered the before alarm zone prior to the after alarm zone ensuring correct direction; the difference between the before alarm zone time and the after alarm zone time for the object detection is within the specified threshold; and the time threshold is determined by the position of the camera and the speed at which the detection should pass between both alarms.

Database

The design of the database is crucial for all the modules due to the fact that it works as a repository for the configuration, information being generated by the applications and logs as well. A proper design requires for the database for the server to get response times less than a second for any of the request of the multiple modules.

Figure 9A:
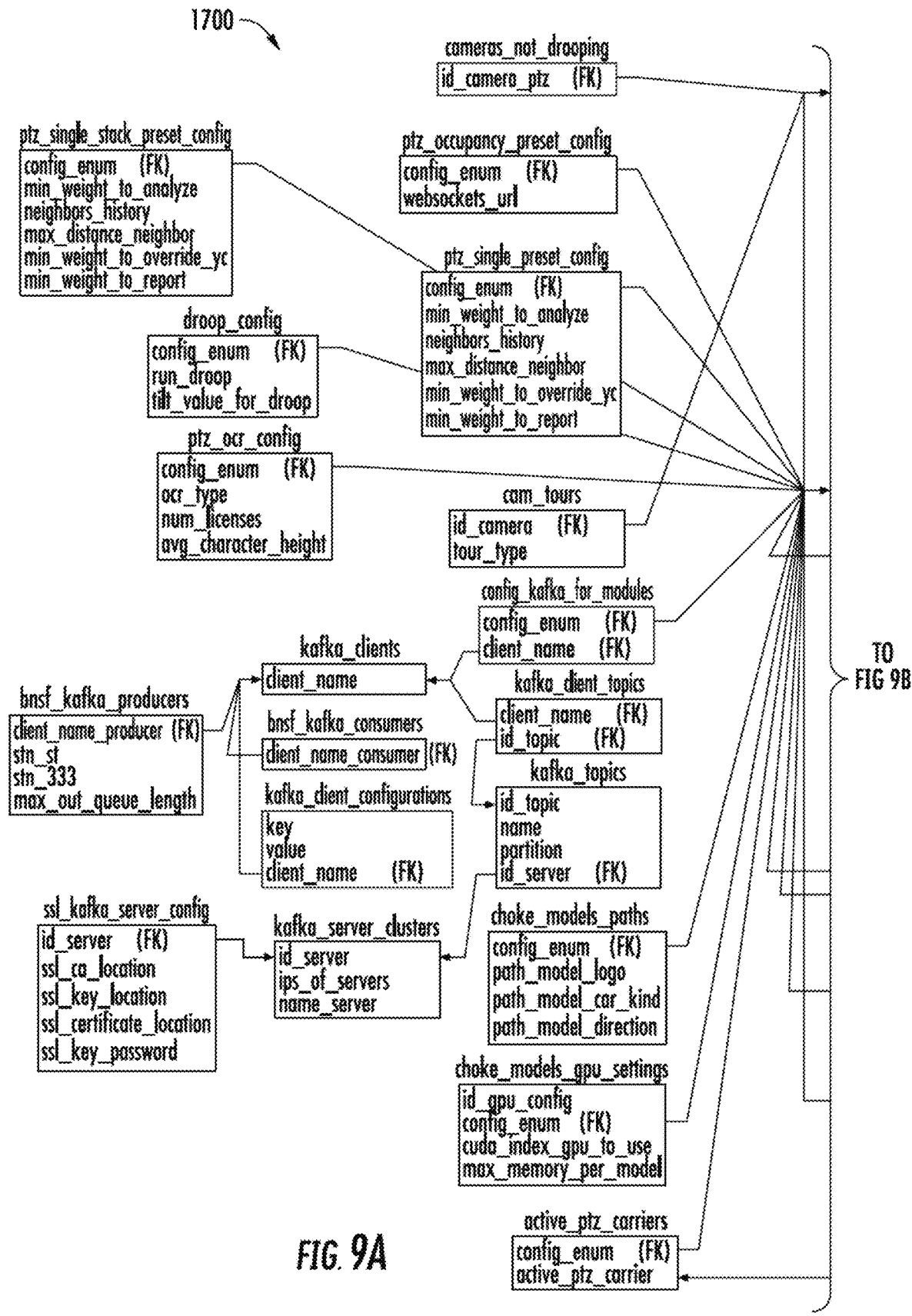
FIGS. 9A-9B, 10A-10C, & 11-12 are diagrams showing operating of the first example embodiment of the tracking system.
Figure 9B:
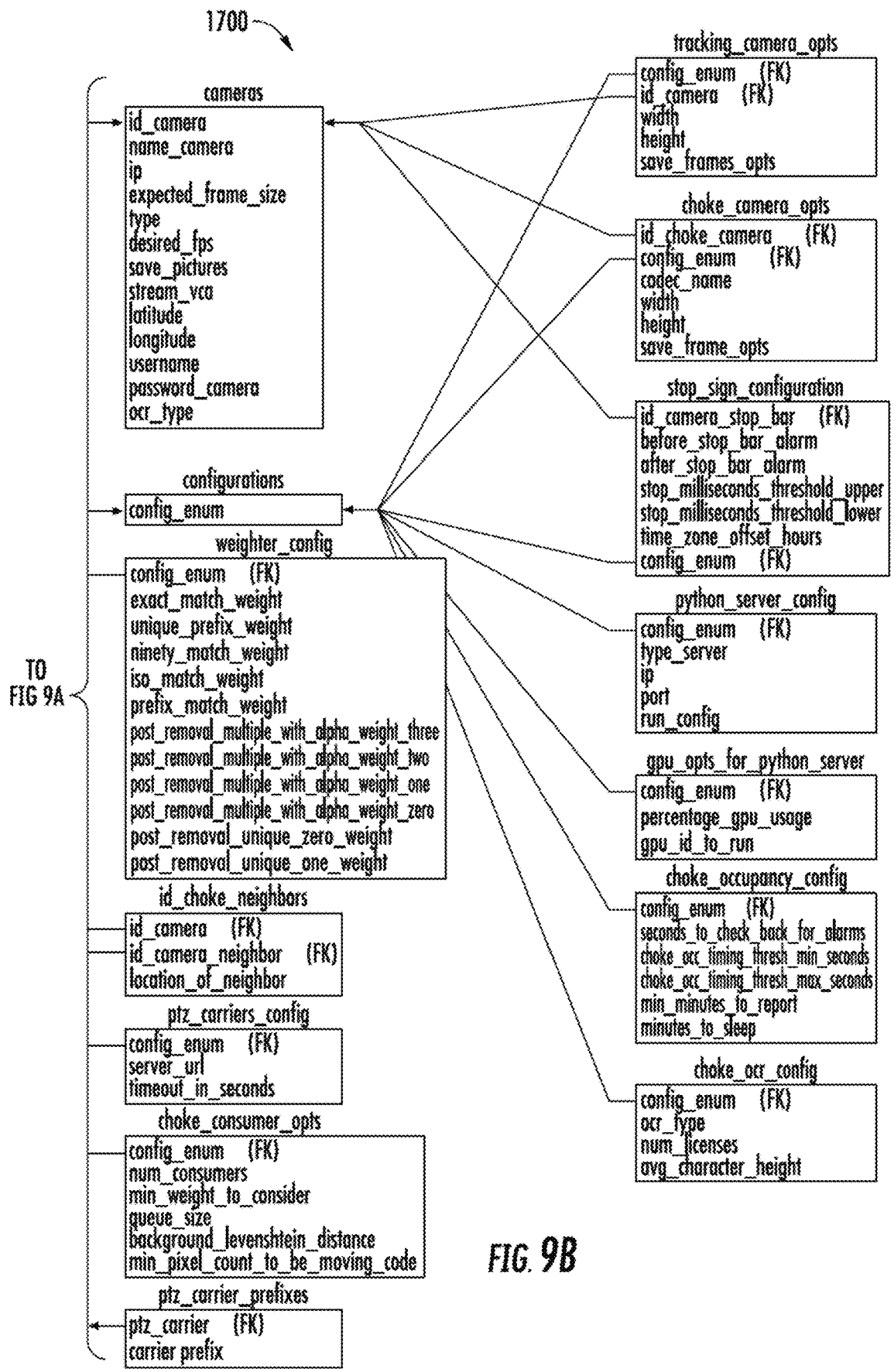
Figure 10A:
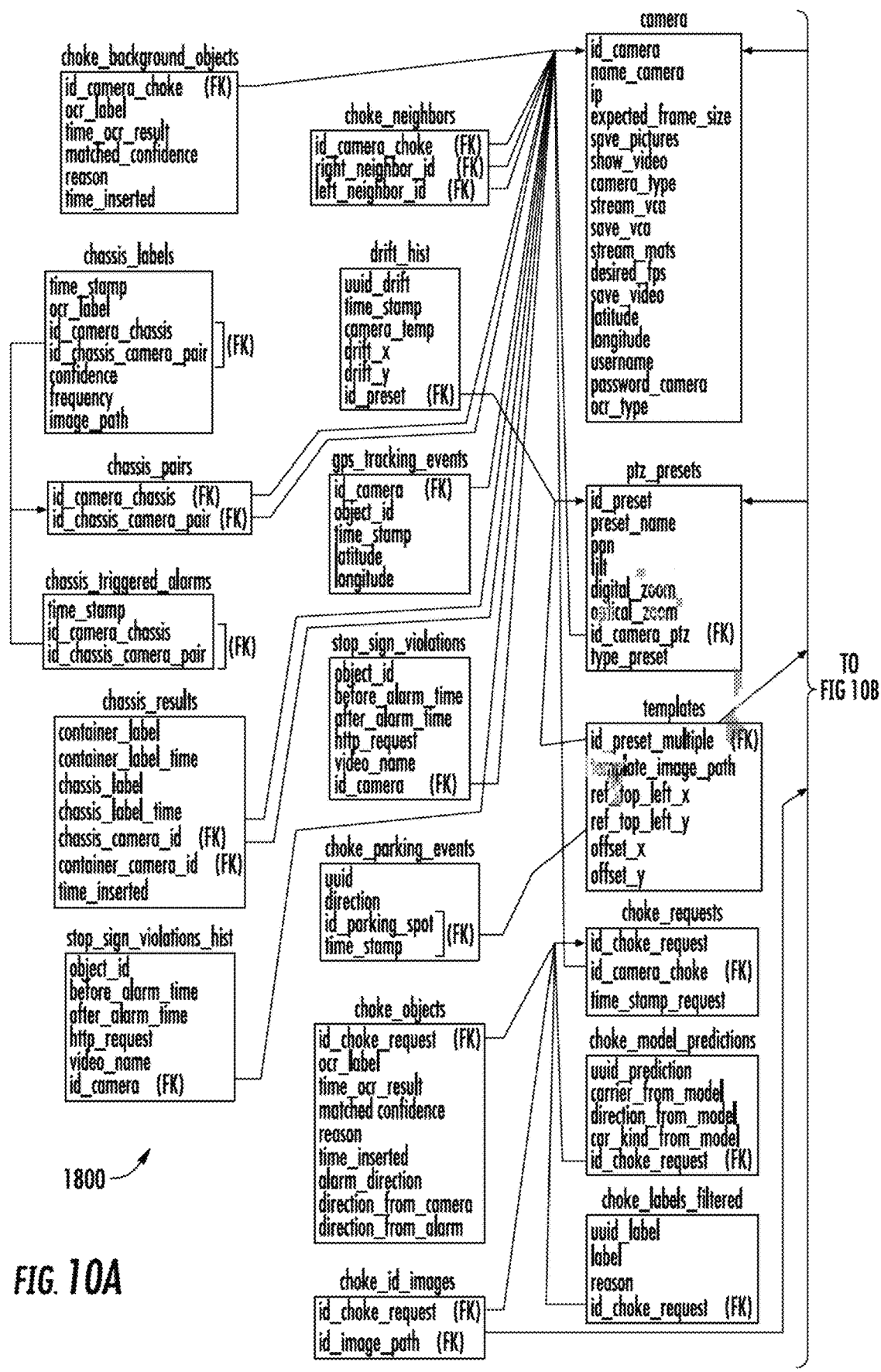
Figure 10B:
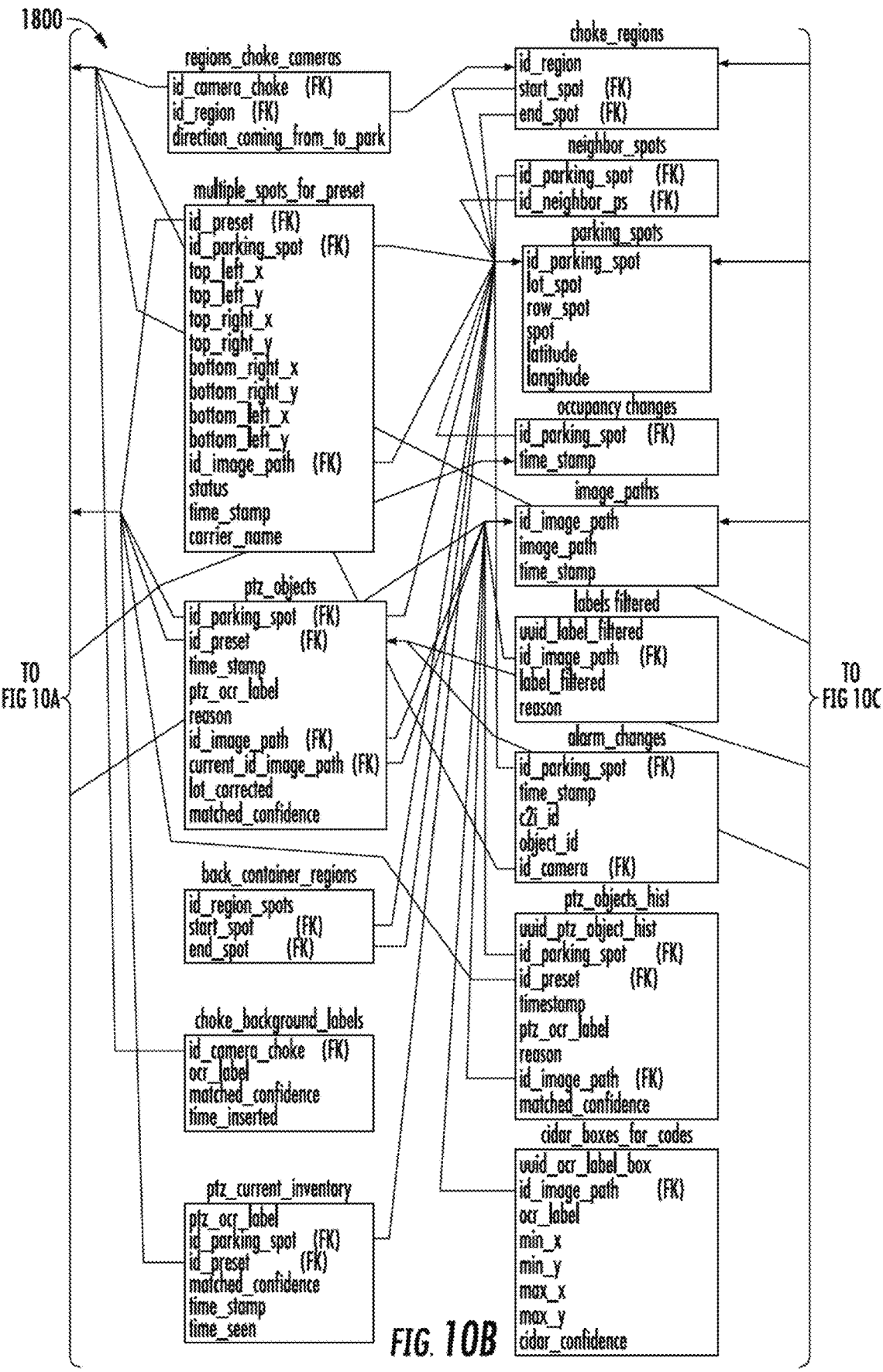
Figure 10C:
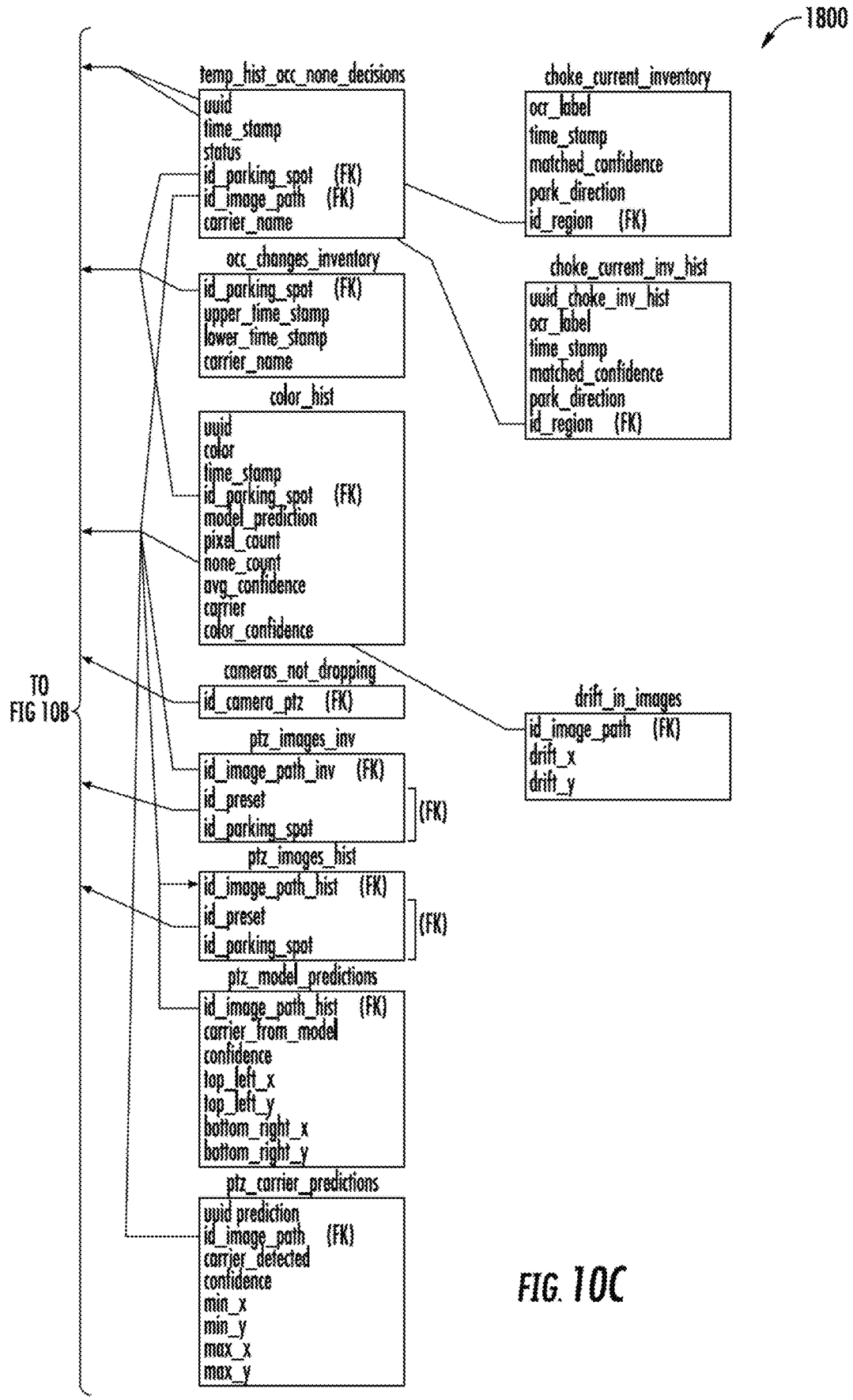
Figure 11:
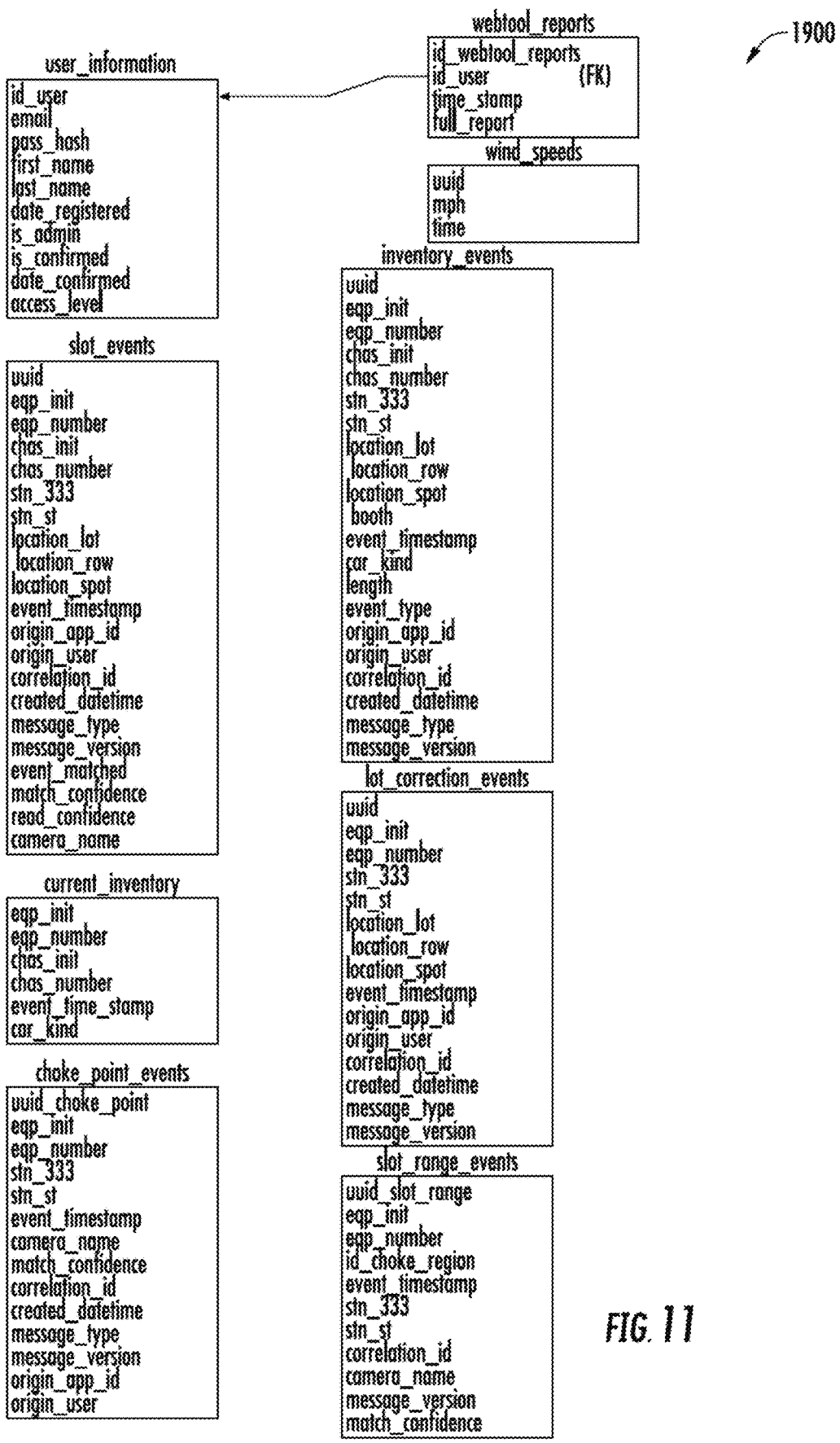

The following is the schema diagrams for the different modules in the database: Configuration schema diagram 1700 in FIGS. 9A-9B; Module's information schema diagram 1800 in FIG. 10A-10C; logs diagram 1900 in FIG. 11. It should be appreciated that these schemas may change over time.

Figure 12:
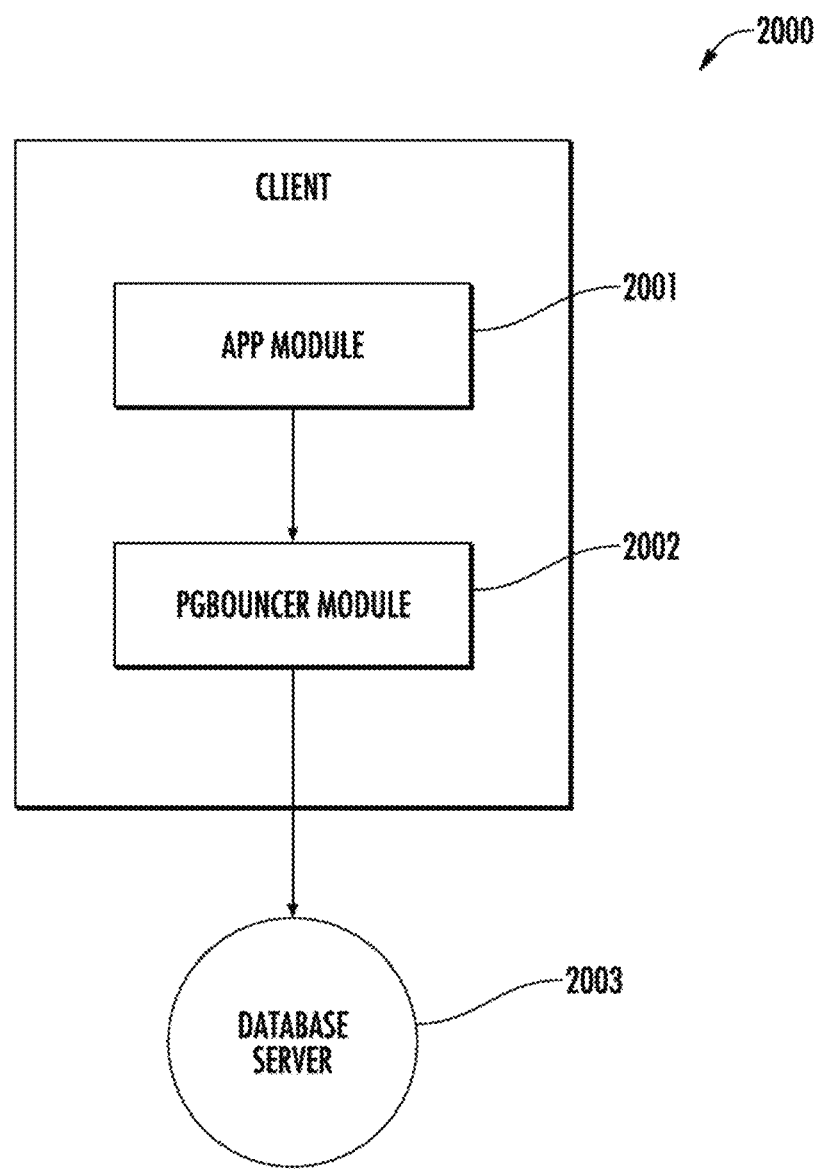

Infrastructure: in order to achieve the requirements for the database service, a layout like the following is put in place for any module: The client 2000 represents the system in which our application run: (FIG. 12). In this case, this are multiple virtual environments. The app module 2001 represents each individual module from where the information is being produced and consumed. The PgBouncer module 2002 is a proxy that routes the connections of the app module 2001 to and from the database server 2003. The proxy manages the multiple connections in a faster and smarter way adding an extra layer of security due to the fact that the database is hidden from the app side. The database represents the virtual environment where the database service is running handling the connections being produced by the proxy PgBouncer module 2002.

In an inventory management facility such as a container terminal, yard, or distribution facility, an accurate inventory is the baseline requirement for building efficiencies, increasing productivity and velocity within an inventory management facility. The traditional approach to update and track inventory movement is to deploy "Yard Checkers" to drive through the facility and record the location and ID of the inventory. This approach increases exposure to the risk of accidents as the Yard Checker is recording data while in a moving vehicle. This manual process is slow, costly and inventory becomes stale minutes after the data is input. Accurate inventory may be required to develop an effective load plan, improve the driver experience, and provide meaningful data for a Transport Management System (TMS) and a Terminal Operating System (TOS).

Figure 14:
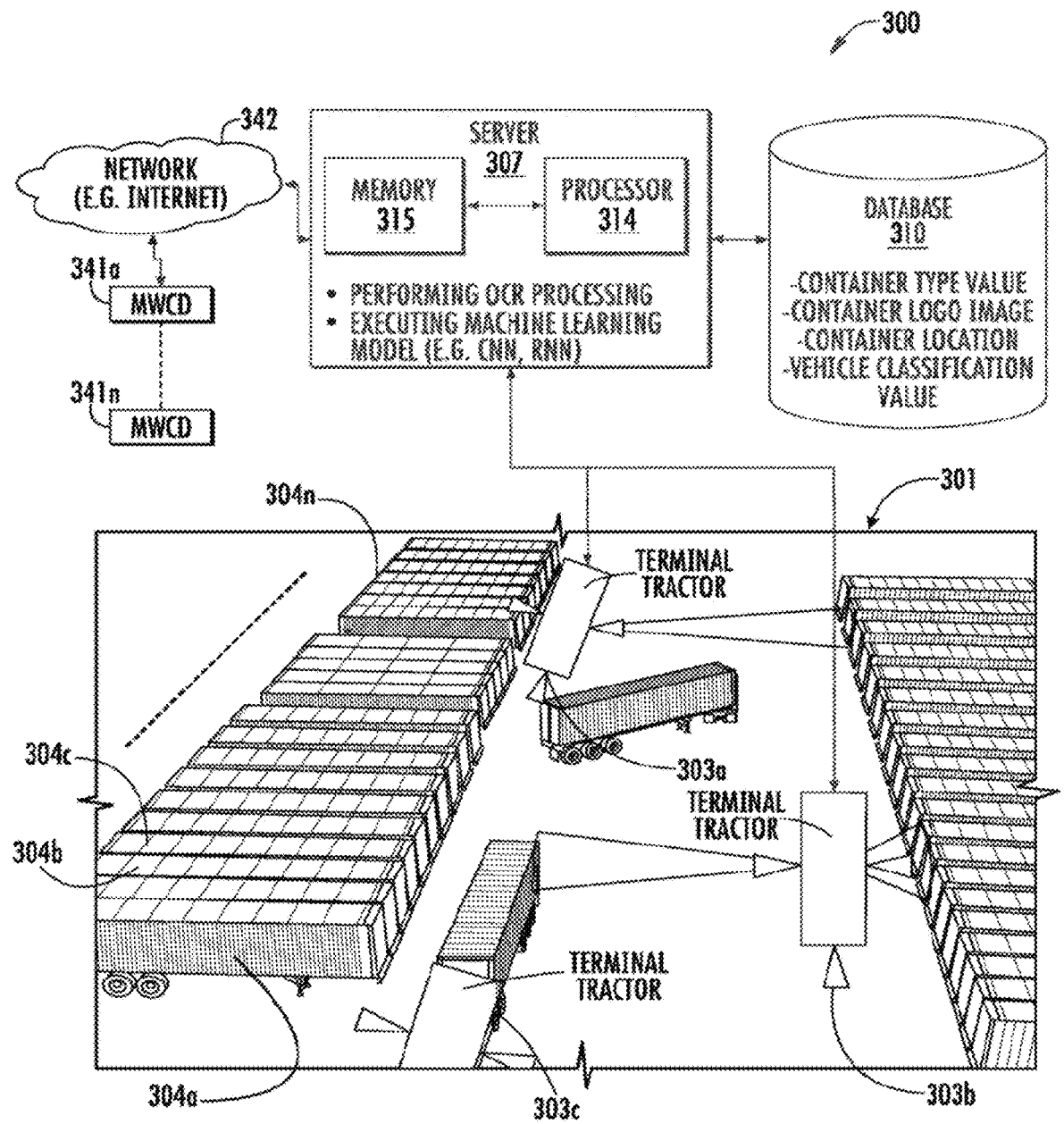
FIG. 14 is a schematic diagram of a control system, according to a third example embodiment of the present disclosure.
Figure 15:
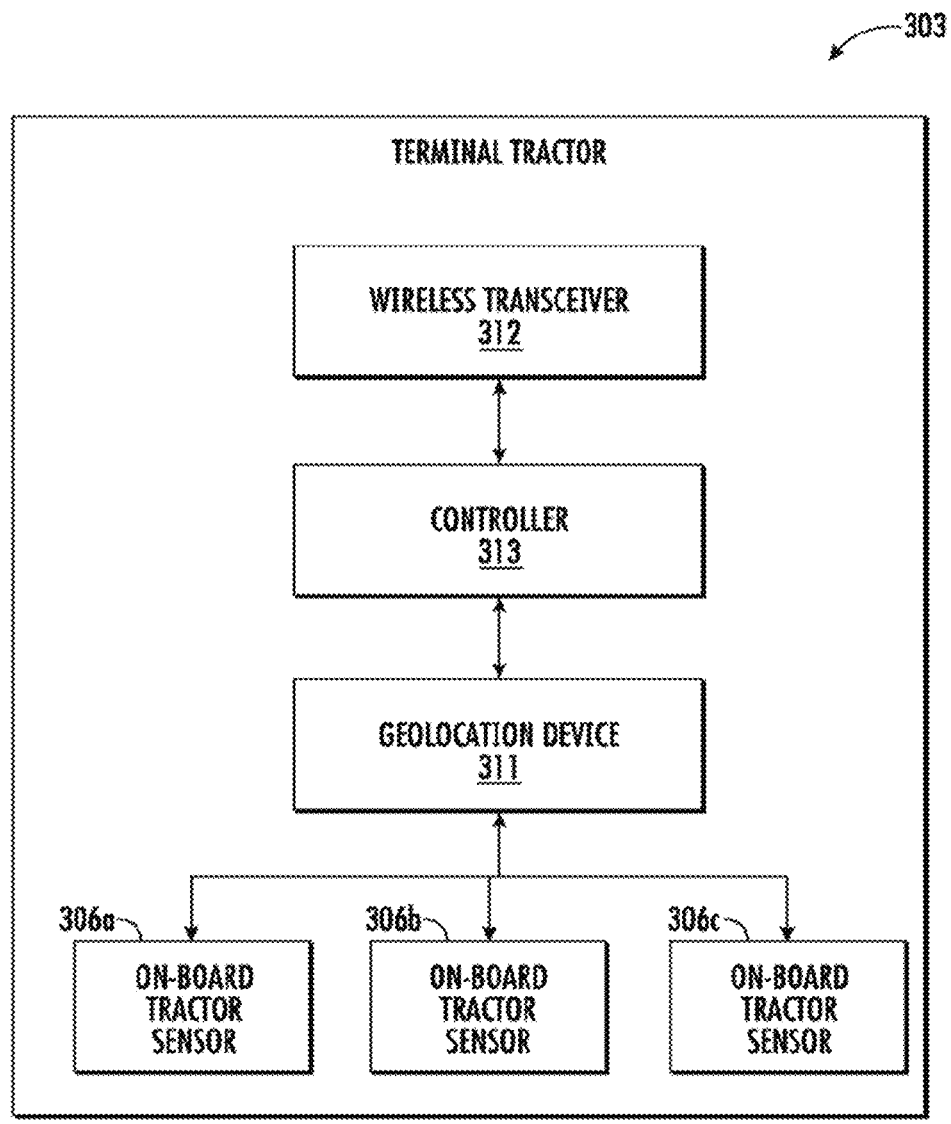
FIG. 15 is a schematic diagram of a terminal tractor in the control system of FIG. 14.

Referring now to FIGS. 14-15, another embodiment of the control system 300 is now described. It should be appreciated that one or more features of the above described control system 200 for the railway yard 201 may be incorporated into the control system 300. In this embodiment of the control system 300, those elements already discussed above with respect to FIG. 13 are incremented by 100.

This control system 300 is for an inventory management facility, such as a container terminal 301, with a plurality of containers 304a-304n therein. The control system 300 comprises a server 307 having a processor 314, and a memory 315 coupled thereto. In some embodiments, the server 307 comprises a stand-alone computing device or a cluster thereof located remote to the container terminal 301 or on-site to reduce latency and bandwidth consumption. In some embodiments, the server 307 may comprise assigned resources in a cloud computing platform, such as Microsoft Azure, Amazon Web Services, or Google Cloud Platform, for example.

The control system 300 illustratively comprises a plurality of terminal tractors 303a-303c operable within the container terminal 301. As will be appreciated, each of the plurality of terminal tractors 303a-303c may carry one or more containers within the container terminal 301 or transport them outside the container terminal. Also, each terminal tractor 303a-303c may be operated by an onboard driver, may be remote controlled by the driver, or may be fully/partially autonomous.

In the illustrated embodiment, the plurality of terminal tractors 303a-303c numbers three for illustrative clarity. It should be appreciated that the control system 300 may comprise a single terminal tractor in some applications, or a larger number in other applications.

As perhaps best seen in FIG. 15, the terminal tractor 303a-303c comprises a plurality of onboard tractor sensors 306a-306c configured to generate sensor data of at least some of the plurality of containers 304a-304n, a geolocation device 311 (e.g., GPS receiver) configured to generate a geolocation value for the terminal tractor, a wireless transceiver 312, and a controller 313 coupled to the plurality of onboard tractor sensors, the geolocation device, and the wireless transceiver. For example, the wireless transceiver 312 may comprise a cellular transceiver, or a WLAN transceiver (e.g., WiFi, WiMAX).

During operation, the terminal tractor 303a-303c traverses the container terminal 301 (i.e., moving, loading, and unloading containers) and within line of sight of some or potentially all of the containers 304a-304n (i.e. drives by and is visually exposed thereto). When the containers 304a-304n are scanned, the controller 313 is configured to generate image sensor data for the containers 304a-304n along with associated geolocation data tagged therewith.

The controller 313 is configured to transmit the sensor data and the geolocation value (while generating the sensor data) for the terminal tractor 303a-303c to the server 307. The server 307 is in communication with the terminal tractor 303a-303c and is configured to generate a database 310 associated with the sensor data. The database 310 may comprise, for each container 304a-304n, a container type value, a container logo image, and a vehicle classification value.

In short, the database 310 comprises an inventory of the plurality of containers 304a-304n in the container terminal 301. Helpfully, this inventory is updated in real time based upon the data feed from the plurality of terminal tractors 303a-303c.

In some embodiments, the plurality of onboard tractor sensors 306a-306c may comprise an image sensor configured to generate container image data. In the illustrated example embodiment, the plurality of onboard tractor sensors 306a-306c is directed to rearward, left, and right. In other embodiments, an additional onboard tractor sensor may be directed frontward to provide 360° coverage. Of course, in some embodiments where cost and bandwidth are limited, the terminal tractor 303a-303c may have less onboard tractor sensors.

For example, each onboard tractor sensors 306a-306c may comprise a high resolution video sensor (e.g., 4k video sensor). In an advantageous embodiment, one or more of the plurality of onboard tractor sensors 306a-306c may comprise a FLEXIDOME IP starlight 8000i (as available from Robert Bosch LLC). This 2 megapixel performance line camera offers high performance and high dynamic range with 1080p resolution to provide crisp and highly detailed images even in extreme low-light situations. The capture frequency may comprise 60 frames per second, for example, which provides for optimum performance in fast action scenes that makes sure no critical data is lost and video is captured with excellent detail. In another exemplary application, one or more of the plurality of onboard tractor sensors 306a-306c may comprise a FLEXIDOME IP panoramic 7000 megapixel (as available from Robert Bosch LLC), which is a discreet, aesthetic, low-profile camera for indoor/outdoor use. The 12 megapixel sensor operating at 30 frames per second provides full panoramic surveillance with complete area coverage, fine details and high speeds. The camera offers full situational awareness and simultaneous PTZ views in high resolution.

In some embodiments, the plurality of onboard tractor sensors 306a-306c may comprise a proximity sensor configured to detect a presence of plurality of containers 304a-304n. The proximity sensor may comprise a range finder sensor providing a linear distance to the detected object. The controller 313 is configured to bundle this range data along with the container image data and the geolocation data. The server 307 may use this data to extrapolate an estimated geolocation for each detected container.

Also, the plurality of onboard tractor sensors 306a-306c may comprise a plurality of image sensors configured to generate a plurality of container image data streams. The server 307 may be configured to merge the plurality of container image data streams.

The container image data may comprise container video data, and the server 307 may be configured to weight detected objects in the container terminal 301 based upon a number of frames including the detected objects. The server 307 may be configured to identify each container 304a-304n based upon the container image data. The server 307 may be configured to perform OCR on the container image data. The server 307 may be configured to perform machine learning on the container image data. The server 307 may be configured to execute a first machine learning model comprising a neural network trained to predict a location of text sequences in the container image data. The server 307 may be configured to execute a second machine learning model comprising a neural network for scanning the text sequences and predicting a sequence of missing characters. In some embodiments, the server 307 may use DeepStream technology or other technology to provide the maximum speed of processing high frame rate images.

In the illustrated embodiment, the control system 300 comprises a plurality of mobile wireless communications devices 341a-341n (e.g., cell phones, tablet computing devices) in communication with the server 307 via a network 342 (e.g., the Internet or a local secure network). The server 307 is configured to provide the plurality of mobile wireless communications devices 341a-341n with access to the inventory stored within the database 310.

In some embodiments, the control system 300 comprises additional sensors on fixed locations. In some applications, the additional sensors may be deployed at exit/entry points for the container terminal 301. Also, the additional sensors may be deployed on Rubber Tired Gantry Cranes (RTG) to capture containers being loaded into and out of the container terminal 301, for example, from docked container ships.

Yet another aspect is directed to a method of operating a server 307 in a control system 300 for a container terminal 301 with a plurality of containers 304a-304n therein. The control system 300 comprises a terminal tractor 303a-303c operable within the container terminal 301 and comprising a plurality of onboard tractor sensors 306a-306c configured to generate sensor data of at least some of the plurality of containers 304a-304n, a geolocation device 311 configured to generate a geolocation value for the terminal tractor 303a-303c, a wireless transceiver 312, and a controller 313 coupled to the plurality of onboard tractor sensors, the geolocation device, and the wireless transceiver. The method comprises operating the server 307 in communication with the terminal tractor 303a-303c to receive the sensor data and the geolocation value for the terminal tractor from the terminal tractor, and generate a database 310 associated with the sensor data, the database comprising, for each container 304a, a container type value, a container logo image, and a vehicle classification value.

Advantageously, the control system 300 may provide a more accurate approach to inventory at the container terminal 301. The control system 300 may discover, identify, classify and locate inventory located in the container terminal 301, such as a rail yard or distribution center. Moreover, the control system 300 may be combined with the control system 200 for the railway yard to provide the platform to move automation to the RCLs 203a-203b. Operational information, such as asset class, container or trailer, supplier and supplier ID, seal status, road ability metrics and/or other factors, are a few of the data points the control system 300 will analyze and update to the database 310.

In the control system 300, by moving the yard check function to the terminal tractor 303a-303c, inventory updates are continuous and inherently safer. Manual inventory checks may require that employees walk or drive and stop within production environments. While training and protocols may dictate, workers drive the yard and stop to record details. Many ignore safety violations-distracted driving, rolling rather than stopping, and driving and typing. Further, personnel may be impatient due to facility congestion and lengthy waits at the gates. Their driving patterns can be more aggressive and endanger distracted employees. The control system 300 may alleviate this issue by removing manual inventory checks on entry. In combination with the control system 200, fully automated management of the plurality of containers 304a-304n is possible.

With the control system 300, inventory is updated by each terminal tractor 303a-303c as it executes work orders. Work order verification is done in the spot not at trackside or at the warehouse door. Inventory is sent via the control system 300 to the clients TOS or TMS. Units that are not officially integrated or ramped are discovered naturally. Lot/Row/Spot designations are supplemented with geolocation, which also eliminates blind spots and inaccurate inventory in locations designated for overflow parking. In short, the server 307 builds a map of the container terminal 301 supplemented with geolocation data.

The control system 300 may help users make smarter, faster decisions that can boost the entire operation's efficiency and profitability. In typical approaches, operations teams are often buried in operational details and processes. The control system 300 removes the uncertainty obscured by the lack of visibility, allowing operations teams to view their facility zoomed in or out. Predictive analytics, real-time data, internet-connected machinery, and automation may help companies become proactive to focus on growth strategies.

Furthermore, the control system 300 may be readily retrofitted onto existing systems with minor modifications to the terminal tractors 303a-303c. The control system 300 also can operate without L/R/S designations (i.e. parking lot striping).

Figure 16:
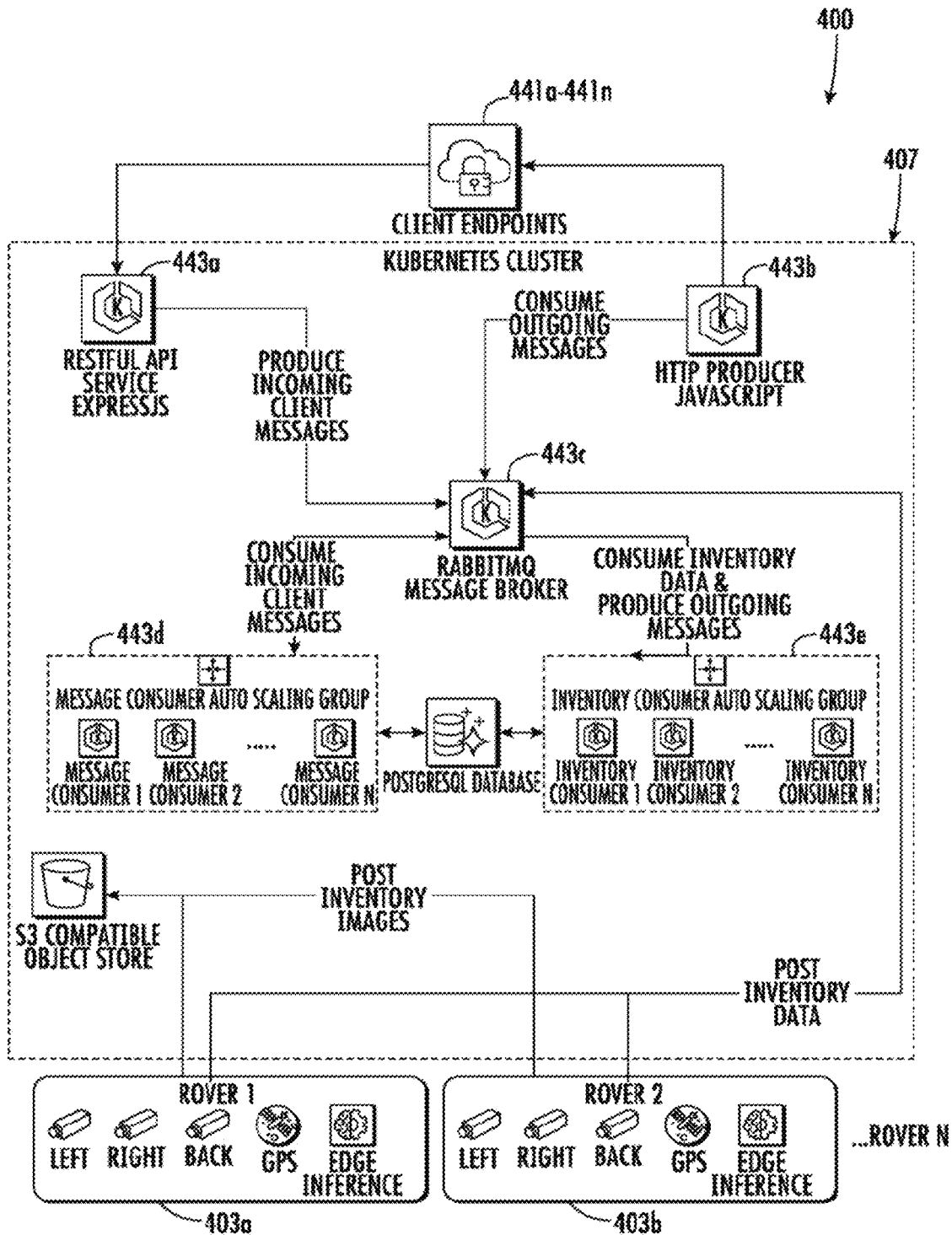
FIG. 16 is a schematic diagram of a control system, according to a fourth example embodiment of the present disclosure.
Figure 17:
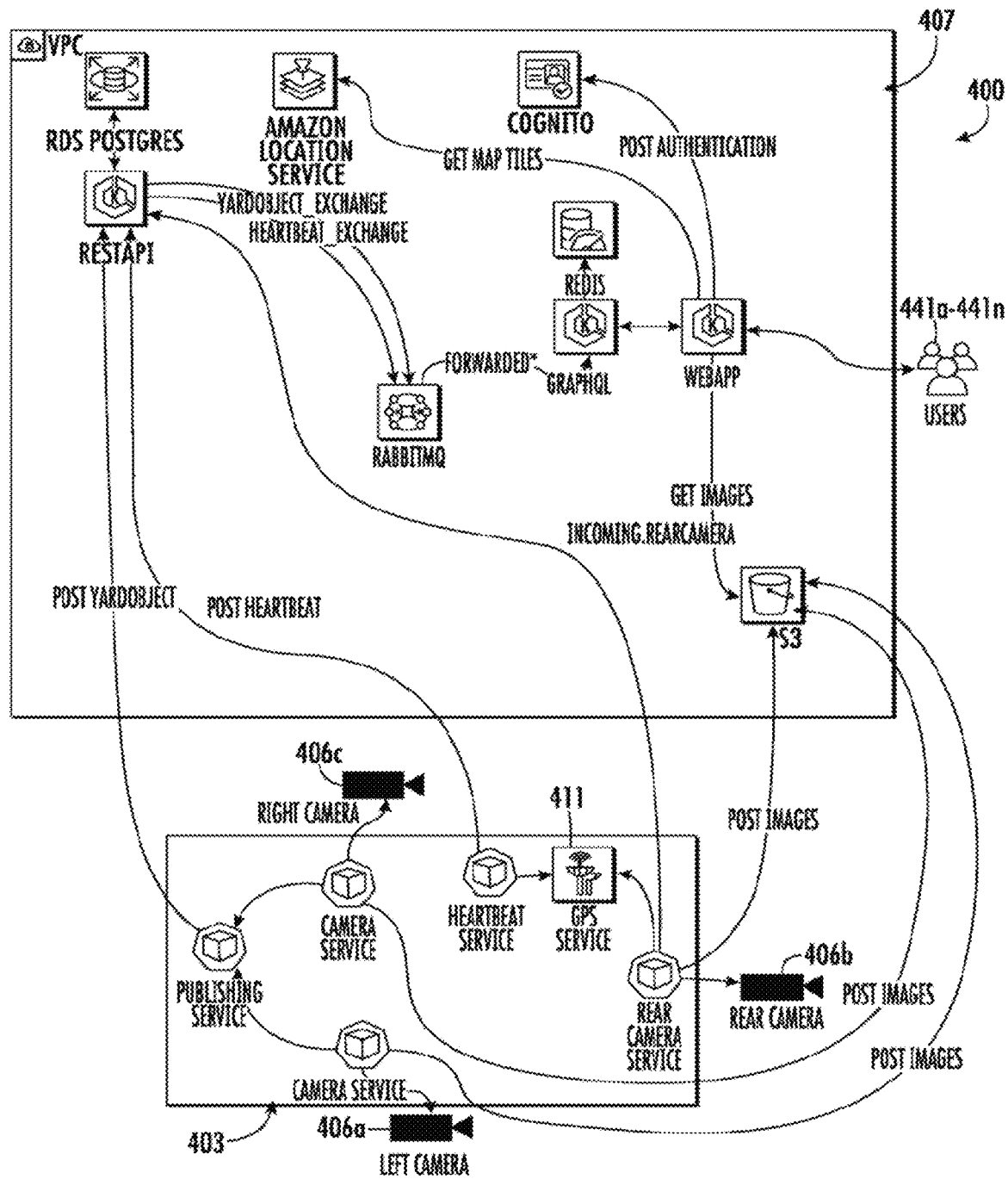
FIG. 17 is another schematic diagram of the control system of FIG. 16.

Referring now additionally to FIGS. 16-17, another embodiment of the control system 400 is now described. In this embodiment of the control system 400, those elements already discussed above with respect to FIGS. 14-15 are incremented by 100 and most require no further discussion herein. This embodiment differs from the previous embodiment in that this control system 400 illustratively includes a server 407 provided within a cloud platform. The server 407 illustratively comprises messaging modules 443a-443c for controlling notification messages to the plurality of mobile wireless communications devices 441a-441n.

The server 407 illustratively comprises a Relational Database Service (RDS) Postgres module to manage complex and time-consuming administrative tasks, such as PostgreSQL software installation and upgrades; storage management; replication for high availability and read throughput; and backups for disaster recovery. The server 407 comprises an Amazon Location Services module as a location-based service that developers can use to add geospatial data and location functionality to applications. Customers can visualize data on a map, recommend routes, use geocoding to convert plain text addresses into geographic coordinates, use reverse geocoding to convert latitude and longitude coordinates into addresses, and monitor and track assets such as fleets of vehicles.

The server 407 illustratively comprises a Cognito module to provide an identity store that scales to millions of users, supports social and enterprise identity federation, and offers advanced security features to protect your consumers and business. Built on open identity standards, the Cognito module supports various compliance regulations and integrates with frontend and backend development resources.

The server 407 illustratively comprises a Restful API module as an interface that two computer systems use to exchange information securely over the Internet. Most business applications have to communicate with other internal and third-party applications to perform various tasks. The RESTful API module supports this information exchange because they follow secure, reliable, and efficient software communication standards.

The server 407 illustratively comprises a RabbitMQ module, which is an open source message broker software (sometimes called message-oriented middleware) that implements the Advanced Message Queuing Protocol (AMQP). The RabbitMQ module is written in the Erlang programming language and is built on the Open Telecom Platform framework for clustering and failover. Client libraries to interface with the broker are available for all major programming languages.

The server 407 illustratively comprises a GraphQL module designed to make APIs fast, flexible, and developer-friendly. It can even be deployed within an integrated development environment (IDE) known as GraphiQL. As an alternative to REST, the GraphQL module lets developers construct requests that pull data from multiple data sources in a single API call.

The server 407 illustratively comprises a Redis module used with streaming solutions, such as Apache Kafka and Amazon Kinesis as an in-memory data store to ingest, process, and analyze real-time data with sub-millisecond latency. The Redis module may be an ideal choice for real-time analytics use cases such as social media analytics, ad targeting, personalization, and IoT.

Figure 18:
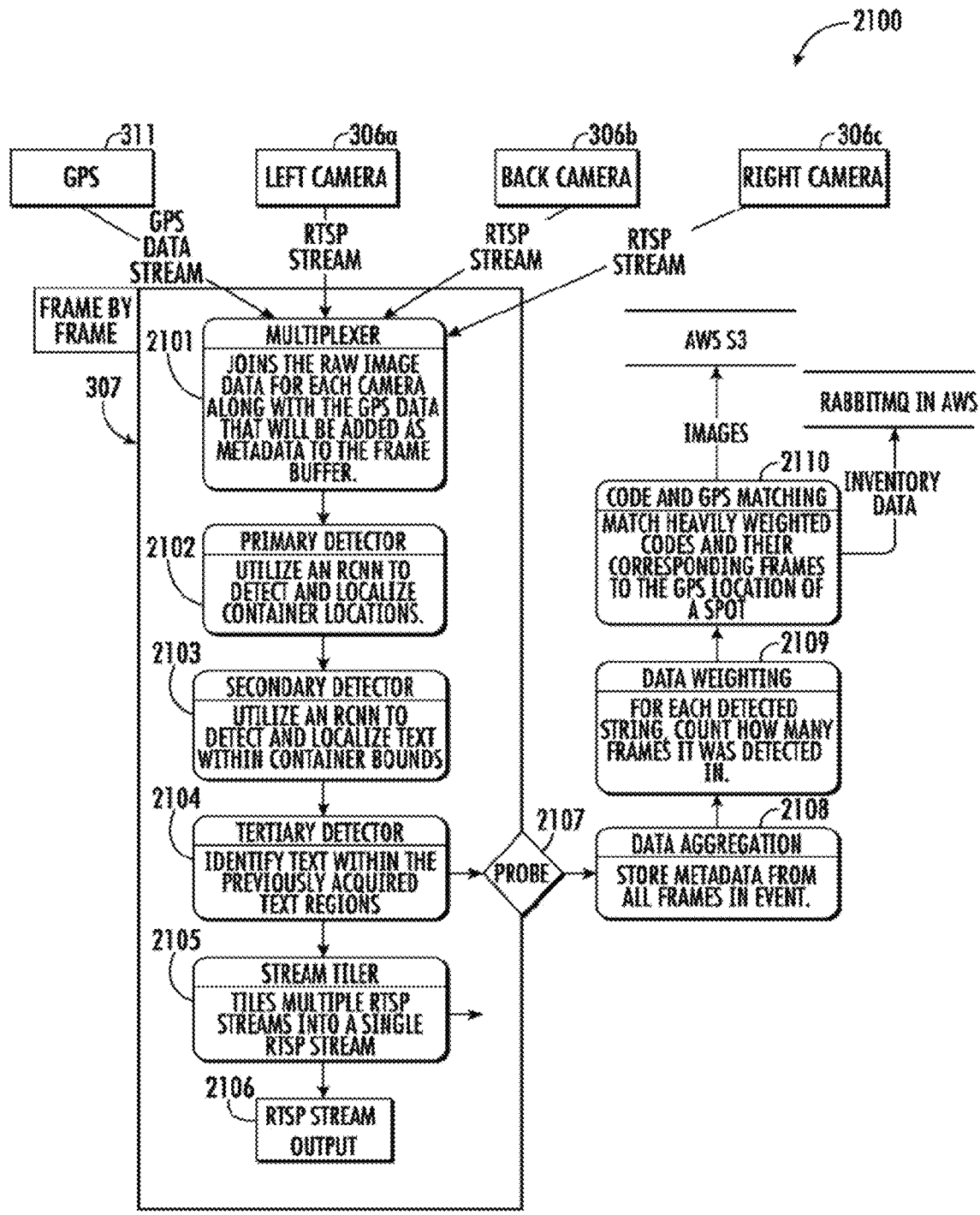
FIG. 18 is a flowchart showing operation within a server of the control system of FIG. 14.

Referring now additionally to FIG. 18, a method for operating the control system 300 is now described with reference to a flowchart 2100. The method illustratively includes ingesting respective Real-Time Streaming Protocol (RTSP) streams from the plurality of onboard tractor sensors 306a-306c and the geolocation device 311. On a frame-by-frame basis, the server 307 includes a multiplexer module 2101 to join raw image data from each sensor along with the geolocation data, and a primary detector module 2102 using R-CNN to detect and localize text container locations.

The server 307 illustratively includes a secondary detector module 2103 using an R-CNN to detect and localize text within the container bounds, and a tertiary detector module 2104 to identify text within the previously acquired text regions. The server 307 illustratively comprises a stream tiler module 2105 to tile multiple RTSP streams into a single RTSP stream, and an output module 2106 to output the single RTSP stream. The server 307 also includes a probe module 2107 to receive an output from the tertiary detector module 2104, a data aggregation module 2108 to store metadata from all frames in the event, and a data weighting module 2109 to count, for each detected string, how many frames contained the detected string. The server 307 comprises a code and matching module 2110 to match heavily weighted codes and their corresponding frames to the geolocation associated therewith.

Figure 19:
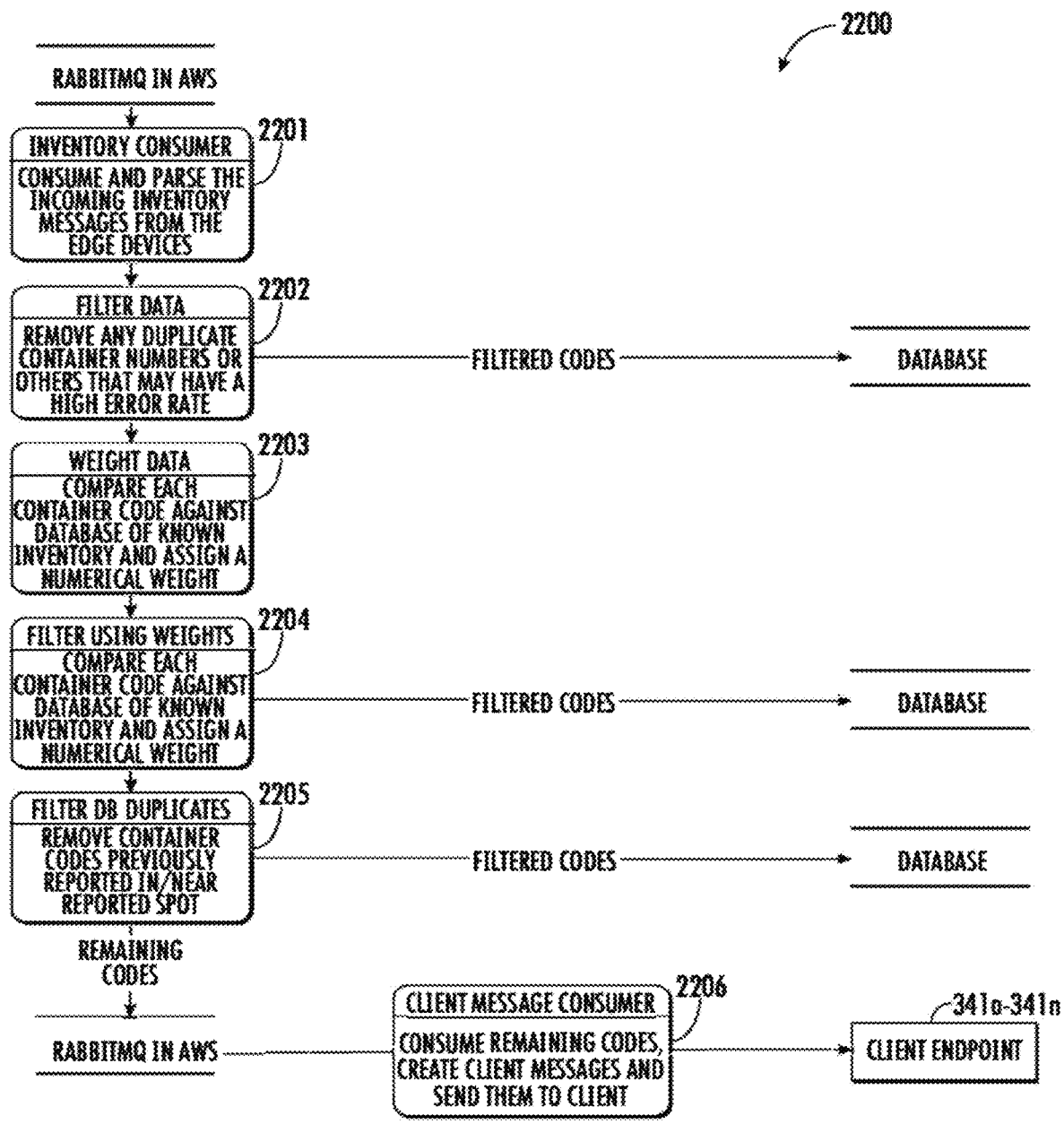
FIG. 19 is another flowchart showing operation within the server of the control system of FIG. 14.

Referring now additionally to FIG. 19, the method for operating the control system 300 is now described with reference to a flowchart 2200. Broadly, this flowchart 2200 provides an overview of the data processing of the container image data. The method includes an inventory consumer step 2201 to consume and parse the incoming inventory messages from the terminal tractors 303a-303c, and a data filtering step 2202 to remove and duplicate container numbers or others that may have a high error rate. The method also includes a weighting step 2203 to compare each container code against a database of known inventory and assign a numerical weight thereto, and a weight filtering step 2204 to filter based upon the assigned weight. The method also includes a duplicate removal step 2205 to remove container codes previously reported in or near the reported geolocation, and a client message consumer step 2206 to consume remaining codes and create client messages and send them to the plurality of mobile wireless communications devices 341a-341n.

Figure 20A:
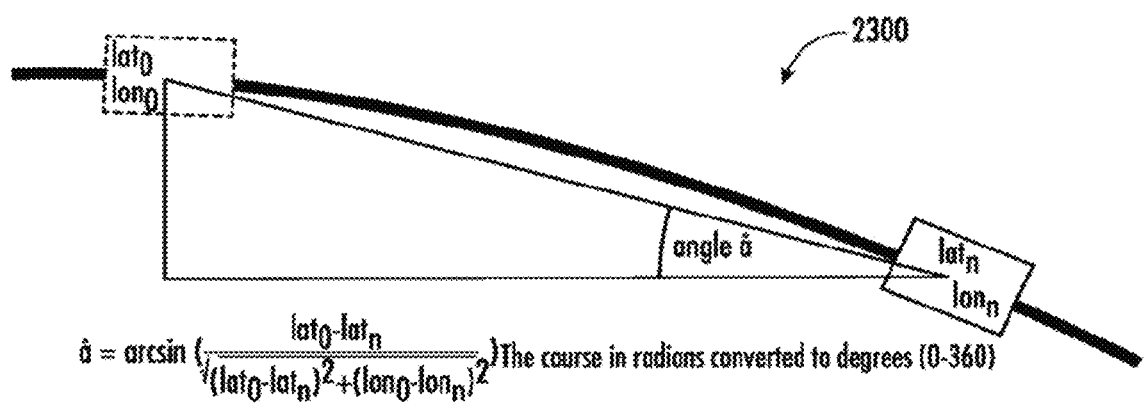
FIGS. 20A-20B are diagrams showing geolocation calculations in the control system of FIG. 14.
Figure 20B:
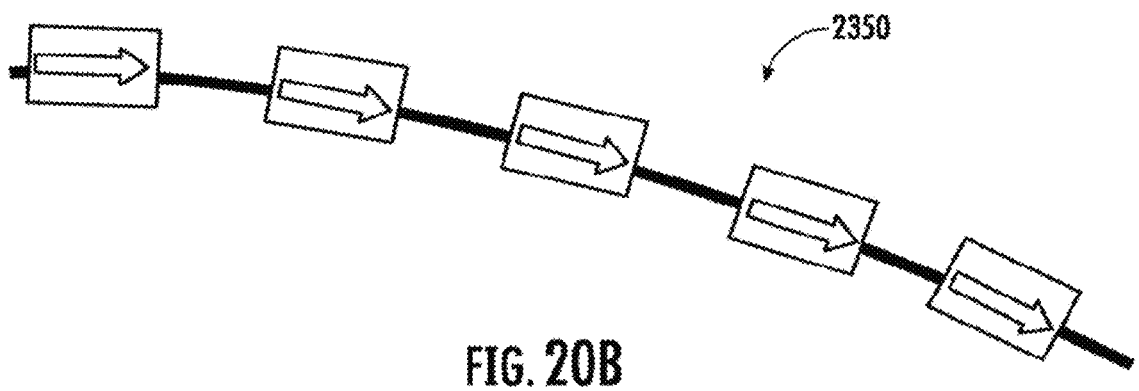

Referring now additionally to FIGS. 20A-20B, the method for operating the control system 300 is now described with reference to a flowchart 2300, 2350. Broadly, these flowcharts 2300, 2350 provide an overview of geolocation data processing for the terminal tractors 303a-303c. Here, the main purpose is to assign a detected label coordinates to a closest spot's coordinate. Based on a few previous gcolocation points of terminal tractors 303a-303c position, the system can calculate the vehicle's course relatively to the North. Each detected label contains a coordinate and a direction (e.g., latitude, longitude, angle).

Although the control system 300 is illustrated in the application of the container terminal 301, this control system 300 may be applied in other container applications, such as the railway yard 201. Also, the control system 300 may be deployed in container warehouses and other distribution points downstream. Indeed, the control system 300 can be deployed in any application where fast and accurate inventory and location of containers is needed.

As explained, the present invention recognizes that in container terminals, an accurate inventory, including the location and ID of the inventory, is an important requirement for building efficiencies, increasing productivity and velocity within a Yard or Distribution facility. The traditional approach to update and track inventory movement is to deploy "Yard Checkers" to drive through the facility and record the location and ID of the inventory. This approach increases exposure to the risk of accidents as the Yard Checker is recording data while in a moving vehicle. This manual process is slow, costly and inventory becomes stale minutes after the data is input. Accurate inventory may be required to develop an effective load plan, improve the driver experience, and provide meaningful data for a Transport Management System (TMS) and a Terminal Operating System (TOS). The present invention recognizes that, the problems with conventional approaches of updating and tracking inventory become exacerbated when the inventory includes containers, and more particularly, one or more stacks of containers.

Figure 21:
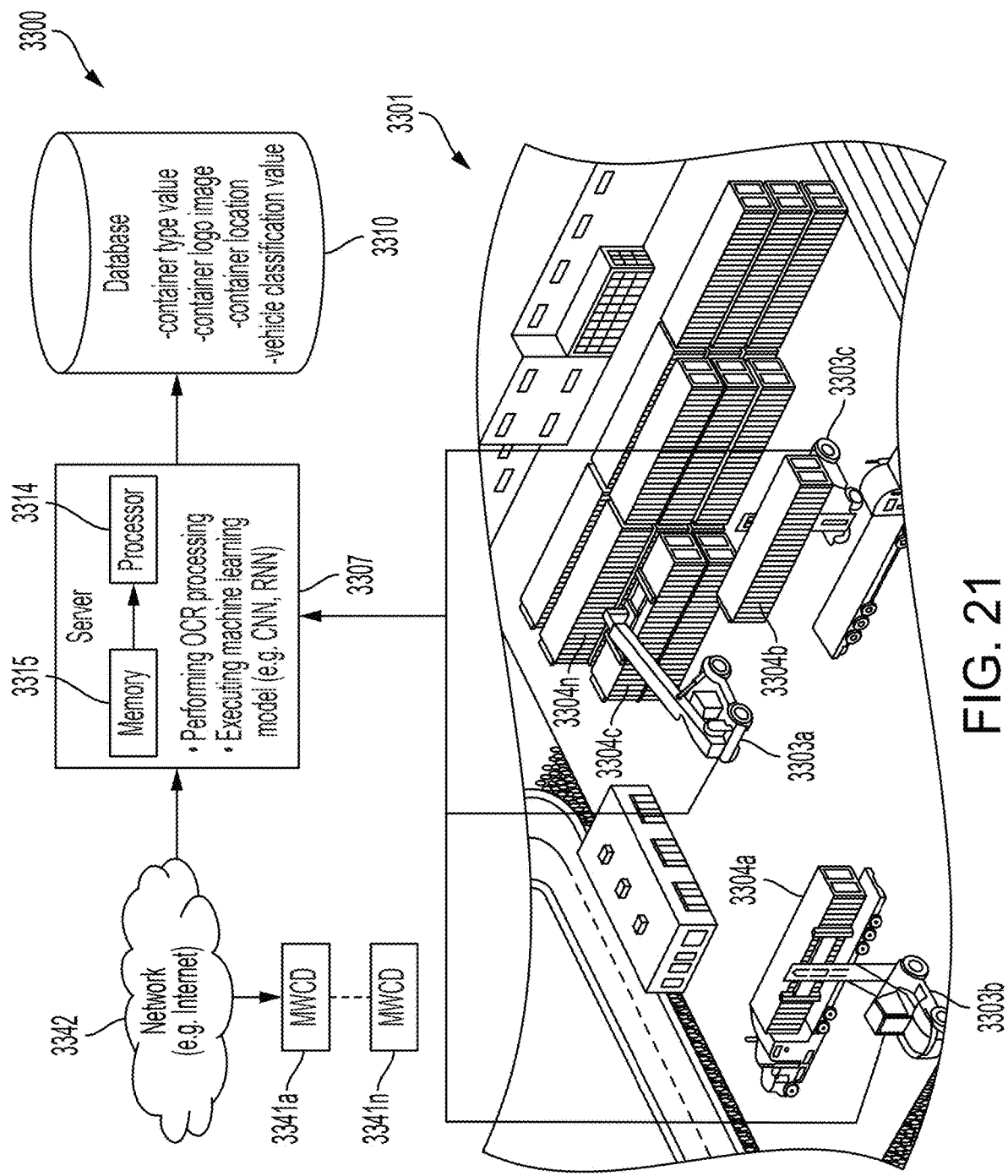
FIG. 21 is a schematic illustration of a control system, according to another example embodiment of the present disclosure.
Figure 22:
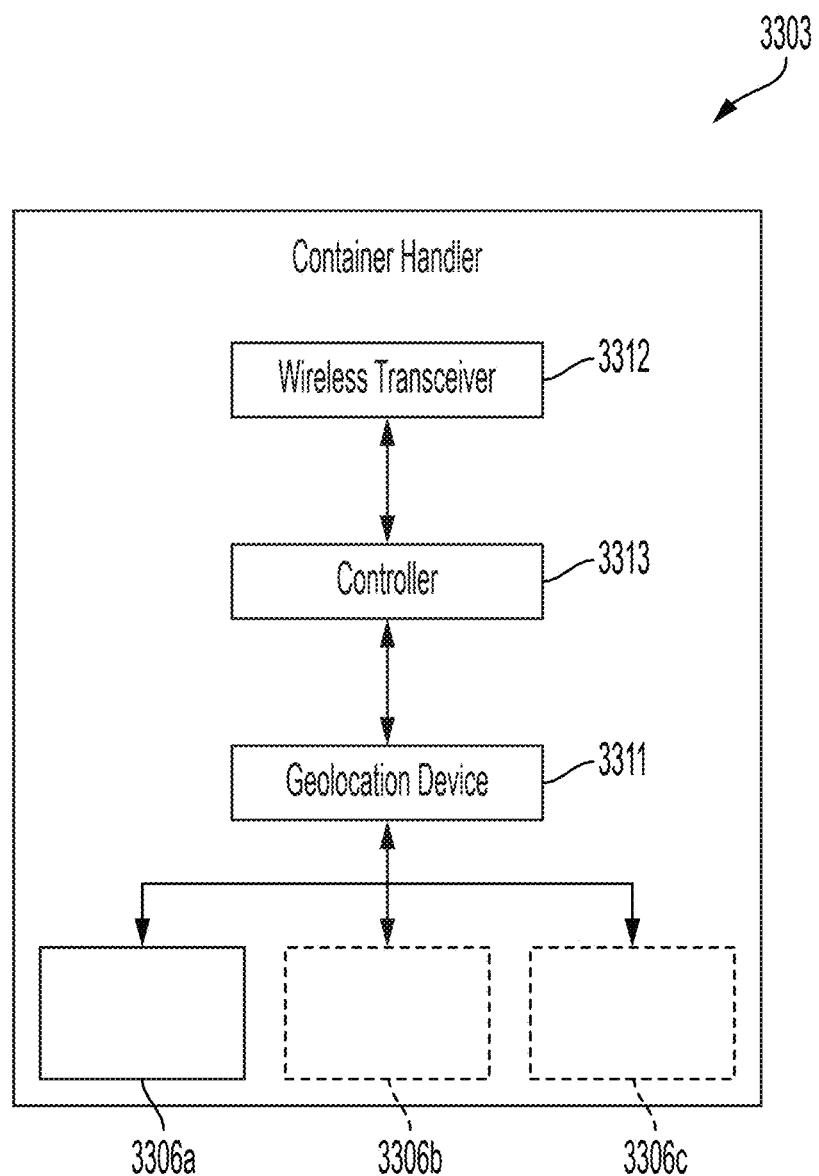
FIG. 22 is a schematic illustration of a container handler, according to an example embodiment of the present disclosure.

Referring now to FIGS. 21 and 22, another embodiment of the control system 3000 is now described. It should be appreciated that one or more features of the above described control system 200 for the railway yard 201 or container terminal 301 may be incorporated into the control system 3000. In this embodiment of the control system 3000, those elements already discussed above with respect to FIGS. 13-15 are incremented by 1000.

This control system 3000 is for an inventory management facility, such as a container terminal 3301, with a plurality of containers 3304a-3304n therein. The control system 3000 comprises a server 3307 having a processor 3314, and a memory 3315 coupled thereto. In some embodiments, the server 3307 comprises a stand-alone computing device or a cluster thereof located remote to the container terminal 3301 or on-site to reduce latency and bandwidth consumption. In some embodiments, the server 3307 may comprise assigned resources in a cloud computing platform, such as Microsoft Azure, Amazon Web Services, or Google Cloud Platform, for example.

The control system 3000 illustratively comprises one or more container handlers 3303a-3303c operable within the container terminal 3301. For purposes of this disclosure, the term "container handler" means terminal or yard equipment commonly known as container handlers, including all wheeled yard equipment, vehicles, machines, wheel loaders, side loaders, reach loaders, reach stackers, and/or Rubber Tired Gantry Cranes (RTG) that are designed and used for the primary purpose of moving containers (i.e., non-wheeled shipping containers) or freight between points within a terminal or yard (including, but not limited to, intermodal yards, distribution center yards, ports, etc.) of a single facility or between the terminals or yards of more than one facility. The present invention is not limited to any particular type of container handler 3303a-3303n. In some examples, one or more container handlers 3303a-3303n can include, for example, an empty container handler and/or a loaded container handler. Each container handler 3303a-3303n may be operated by an onboard driver, may be remote controlled by the driver, or may be fully/partially autonomous. It should be appreciated that the control system 3000 may comprise a single container handler in some applications, or a plurality of container handlers in other applications.

As will be appreciated, each of the container handlers 3303a-3303n can be configured to securely engage and move, place, stack, and/or unstack containers within the container terminal 3301. Each container handler 3303a-

3303*n* can be configured to carry at least one container 3304*a*-3304*n* to move the container 3304*a*-3304*n* within the container terminal 3301 and to raise or lower (i.e., change an elevation of) the container 3304*a*-3304*n* to position the container 3304*a*-3304*n* within the container terminal 3301. The container handlers 3303*a*-3303*n* can be configured to lift the container from a position on another vehicle, from a position on the ground, or from a position on top of another container in a stack. The container handlers 3303*a*-3303*n* can be configured to transport the container from one location to another in the container terminal 3301. The container handlers 3303*a*-3303*n* can be configured to lift the container to set the container on another vehicle, on the ground, or on top of another container in a stack. The container handlers 3303*a*-3303*n* can be capable of lifting empty or loaded containers on a stack ranging from one container in height to, for example, five, six, or seven containers in height, or other heights, for example, depending on the size, weight, type of container.

As shown in the example illustrated in FIG. 22, the container handler 3303*a*-3303*n* can include one or more onboard sensors 3306*a*-3306*c* configured to generate sensor data of at least some of the plurality of containers 3304*a*-3304*n* in the container terminal 3301. For example, the plurality of onboard sensors 3306*a*-3306*c* may comprise one or more image sensors configured to generate container image data, as will be described in more detail below.

The container handler 3303*a*-3303*n* can include a geolocation device 3311 (e.g., GPS receiver), including one or more GPS receivers, configured to generate a geolocation value for the container handler 3303*a*-3303*n*, and in an example, for a geolocation value for a part of the container handler 3303*a*-3303*n* adjacent to the container 3304*a*-3304*n* when the container handler 3303*a*-3303*n* is in close proximity to the container 3304*a*-3304*n*, engaged with the container 3304*a*-3304*n*, in the process of being engaged with, or releasing from engagement with, the container 3304*a*-3304*n*, and/or transporting the container 3304*a*-3304*n*. The geolocation device 3311 can be configured to generate a geolocation value for the container handler 3303*a*-3303*n* and/or an associated container 3304. The gcolocation device 3311 (e.g., GPS receiver) can include, for example, a first GPS receiver on the cab 5002 and a second GPS receiver on an arm 5004. In another example, the geolocation device 3311 (e.g., GPS receiver) can include, for example, a first GPS receiver on the cab 5002, a second GPS receiver on one side of the arm 5004, and a third GPS receiver on the other side of the arm 5004, in order to triangulate an orientation and/or direction of travel/approach of the container handler 3303, to thereby determine an orientation of a container 3304 at the time such container 3304 is picked-up or dropped-off by the container handler 3303. In an example, the geolocation device 3311 can be configured to generate a latitude value (x), and longitude value (y), and an altitude value (2) for the container handler 3303*a*-3303*n* and/or an associated container 3304. In this way, the geolocation device 3311 can not only be configured to generate a geolocation value for the container handler 3303*a*-3303*n* and/or an associated container 3304 within the container terminal 3301, but also to generate a geolocation value for the container handler 3303*a*-3303*n* and/or an associated container 3304 in a stack of other containers 3304 in the container terminal 3301 (e.g., a stack height of the particular container 3304 in a stack of other containers).

The container handler 3303*a*-3303*n* can include a wireless transceiver 3312, and a controller 3313 coupled to the plurality of onboard sensors, the geolocation device, and the wireless transceiver. For example, the wireless transceiver 3312 may comprise a cellular transceiver, or a WLAN transceiver (e.g., WiFi, WiMAX). The controller 3313 can be coupled to the plurality of onboard sensors and/or the geolocation device, for example, by an Ethernet radio line or the like, or a wireless connection, for example, utilizing a wireless network, which can be, for example, on-board or local to the container handler 3303*a*-3303*n*.

During operation, the container handler 3303*a*-3303*n* can move within areas of the container terminal 3301 (i.e., moving, placing, stacking, and/or unstacking containers) and within line of sight of some or potentially all of the containers 3304*a*-3304*n* (i.e., drives by and is visually exposed thereto). When the containers 3304*a*-3304*n* are scanned by the onboard sensors 3306*a*-3306*c*, such as a high resolution video sensor, camera, etc., the controller 3313 is configured to generate image sensor data for the containers 3304*a*-3304*n* along with associated geolocation data tagged therewith. In an example, the controller 3313 is configured to generate (e.g., automatically generate) geolocation data corresponding to a location of the container handler 3303*a*-3303*n* and/or a particular container 3304*a*-3304*n* at one or more predetermined times and/or events (e.g., one or more trigger events), such as at a time when the container handler 3303*a*-3303*n* is adjacent to or in close proximity to the container 3304*a*-3304*n* such as when the container handler 3303*a*-3303*n* is approaching, or withdrawing from the container 3304*a*-3304*n*, when the container handler 3303*a*-3303*n* is engaged with the container 3304*a*-3304*n* such as when the relevant mechanisms of the container handler are locked onto the container 3304*a*-3304*n*, when the container handler 3303*a*-3303*n* is in the process of engaging with, or releasing from engagement with, the container 3304*a*-3304*n* such as when the relevant mechanisms of the container handler are being actuated between a locked and unlocked state with respect to the container 3304*a*-3304*n*, and/or when the container handler 3303*a*-3303*n* is transporting the container 3304*a*-3304*n*.

The controller 3313 is configured to transmit (e.g., automatically transmit) the sensor data and the geolocation value (while generating the sensor data) to the server 3307 (e.g., at a predetermined time, such as at a time of a trigger event, within a predetermined period of time of a trigger event, etc.). The server 3307 is in communication with the container handler 3303*a*-3303*n* and is configured to generate a database 3310 associated with the sensor data.

The database 3310 may comprise, for each container 3304*a*-3304*n*, container image data (e.g., a container marking image, such as a container code/stencil image) and associated geolocation data. In some examples, the database 3310 also may comprise, for each container 3304*a*-3304*n*, one or more of a container identification image, type value, a container logo image, and a vehicle classification value.

In short, the database 3310 comprises an inventory and location of the plurality of containers 3304*a*-3304*n* in the container terminal 3301. Preferably, this inventory is updated in real time based upon the data feed from the plurality of container handler 3303*a*-3303*n*.

As set forth above, in some embodiments, the plurality of onboard sensors 3306*a*-3306*c* may comprise an image sensor configured to generate container image data. In the illustrated example embodiment, the plurality of onboard sensors 3306*a*-3306*c* is directed frontward from the container handler. For example, one or more of the onboard sensors 3306*a*-3306*c* may comprise a high resolution video sensor (e.g., 4*k* video sensor). In an advantageous embodiment, one or more of the plurality of onboard sensors

3306a-3306c may comprise a FLEXIDOME IP starlight 8000i (as available from Robert Bosch LLC). This 2 megapixel, 4 megapixel, 6 megapixel performance line of cameras offers high performance and high dynamic range with 1080p or 4K UHD resolution to provide crisp and highly detailed images even in extreme low-light situations. The capture frequency may comprise 60 frames per second, for example, which provides for optimum performance in fast action scenes that makes sure no critical data is lost and video is captured with excellent detail. In another exemplary application, one or more of the plurality of onboard sensors 3306a-3306c may comprise a FLEXIDOME IP panoramic 7000 megapixel (as available from Robert Bosch LLC), which is a discreet, aesthetic, low-profile camera for indoor/outdoor use. The 12 megapixel sensor operating at 30 frames per second provides full panoramic surveillance with complete area coverage, fine details and high speeds. The camera offers full situational awareness and simultaneous PTZ views in high resolution.

In some embodiments, the plurality of onboard sensors 3306a-3306c may comprise a proximity sensor configured to detect a presence of one or more containers 3304a-3304n. The proximity sensor may comprise, for example, a range finder sensor, lidar sensor, time of flight sensor, etc. providing a linear distance to the detected object. In some examples, the controller 3313 can be configured to bundle this range data along with the container image data and the geolocation data. The server 3307 may use this data to extrapolate an estimated geolocation for each detected container. In other examples, the system can be configured to detect a presence of one or more containers 3304a-3304n, and/or a linear distance to the detected object, etc. by analyzing the image data using one or more algorithms or machine learning models, such as using one or more neural networks.

Also, the plurality of onboard sensors 3306a-3306c may comprise a plurality of image sensors configured to generate a plurality of container image data streams. The server 3307 may be configured to merge the plurality of container image data streams.

The container image data may comprise container video data, and the server 3307 may be configured to weight detected objects in the container terminal 3301 based upon a number of frames including the detected objects. The server 3307 may be configured to identify each container 3304a-3304n based upon the container image data, for example, including container markings such as a container code/stencil. The server 3307 may be configured to perform OCR on the container image data. The server 3307 may be configured to perform machine learning on the container image data. The server 3307 may be configured to execute a first machine learning model comprising a neural network trained to predict a location of text sequences in the container image data. The server 3307 may be configured to execute a second machine learning model comprising a neural network for scanning the text sequences and predicting a sequence of missing characters. In some embodiments, the server 3307 may use DeepStream technology or other technology to provide the maximum speed of processing high frame rate images.

In the illustrated embodiment, the control system 3000 comprises a plurality of mobile wireless communications devices 341a-341n (e.g., cell phones, tablet computing devices, etc.) in communication with the server 3307 via a network 342 (e.g., the Internet, a local secure network, 5G network). The server 3307 is configured to provide the plurality of mobile wireless communications devices 341a-341n with access to the inventory stored within the database 3310.

Yet another aspect is directed to a method of operating a server 3307 in a control system 3000 for an inventory management facility such as a container terminal 3301 with a plurality of containers 3304a-3304n therein. The control system 3000 comprises a container handler 3303a-3303n operable within the container terminal 3301 and comprising a plurality of onboard sensors 3306a-3306c configured to generate sensor data of at least some of the plurality of containers 3304a-3304n, a geolocation device 3311 configured to generate (e.g., automatically generate) geolocation data corresponding to a location of the container handler 3303a-3303n and/or a particular container 3304a-3304n at one or more predetermined times and/or events (e.g., one or more trigger events), such as at a time when the container handler 3303a-3303n is adjacent to or in close proximity to the container 3304a-3304n such as when the container handler 3303a-3303n is approaching, or withdrawing from the container 3304a-3304n, when the container handler 3303a-3303n is engaged with the container 3304a-3304n such as when the relevant mechanisms of the container handler are locked onto the container 3304a-3304n, when the container handler 3303a-3303n is in the process of engaging with, or releasing from engagement with, the container 3304a-3304n such as when the relevant mechanisms of the container handler are being actuated between a locked and unlocked state with respect to the container 3304a-3304n, and/or when the container handler 3303a-3303n is transporting the container 3304a-3304n. The control system 3000 comprises a wireless transceiver 3312 and a controller 3313 coupled to the plurality of onboard sensors, the geolocation device, and the wireless transceiver. The method comprises operating the server 3307 in communication with the container handler 3303a-3303n to receive the sensor data and the geolocation value and generate a database 3310 associated with the sensor data, the database comprising, for each container 3304a-3304n, container image data (e.g., a container marking image, such as a container code/stencil image) and associated geolocation data. In some examples, the database 3310 also may comprise, for each container 3304a-3304n, one or more of a container identification image, type value, a container logo image, and a vehicle classification value.

Advantageously, the control system 3000 may provide a more accurate approach to inventory and location of containers 3304a-3304n at the container terminal 3301. The control system 3000 may discover, identify, and locate inventory located in the container terminal 3301, such as a rail yard or distribution center.

With the control system 3000, inventory is updated (e.g., automatically updated) by each container handler 3303a-3303n as it executes work orders.

In some examples, inventory is sent via the control system 3000 to the clients TOS or TMS. Units that are not officially integrated or ramped are discovered naturally. In some examples, Lot/Row/Spot designations are supplemented with geolocation, which also eliminates blind spots and inaccurate inventory in locations designated for overflow parking. In short, the server 3307 builds a map of the container terminal 3301 supplemented with geolocation data.

The control system 3000 may help users make smarter, faster decisions that can boost the entire operation's efficiency and profitability. In typical approaches, operations teams are often buried in operational details and processes.

The control system 3000 removes the uncertainty obscured by the lack of visibility, allowing operations teams to view their facility, for example, zoomed in or out. Predictive analytics, real-time data, internet-connected machinery, and automation may help companies become proactive to focus on growth strategies.

Furthermore, the control system 3000 may be readily retrofitted onto existing systems with minor modifications to the container handler 3303a-3303n.

Referring now additionally to FIGS. 23-32, an example of a container handler 3303 will now be described. In the example, the container handlers 3303 is a side loader. However, in other examples, the container handler be another wheeled yard equipment, vehicle, machine, wheel loader, reach loader, reach stacker, and/or Rubber Tired Gantry Crane (RTG) designed and used for the primary purpose of moving containers (i.e., non-wheeled shipping containers) or freight between points within a terminal or yard. The container handler 3303 can include, for example, an empty container handler or a loaded container handler. The container handler 3303 may be operated by an onboard driver, may be remote controlled by the driver, or may be fully/partially autonomous.

As will be appreciated, the container handler 3303 can be configured to securely engage and move, place, stack, and/or unstack containers 3304a-3304n within the container terminal 3301. The container handler 3303 can be configured to carry at least one container 3304a-3304n to move the container 3304a-3304n within the container terminal 3301 and to raise or lower (i.e., change an elevation of) the container 3304a-3304n to position the container 3304a-3304n within the container terminal 3301. The container handler 3303can be configured to lift the container from a position on another vehicle, from a position on the ground, or from a position on top of another container in a stack. The container handler 3303can be configured to transport the container from one location to another in the container terminal 3301. The container handler 3303can be configured to lift the container to set the container on another vehicle, on the ground, or on top of another container in a stack. The container handler 3303can be capable of lifting empty or loaded containers on a stack ranging from one container in height to, for example, five, six, or seven containers in height, or other heights, for example, depending on the size, weight, type of container.

Figure 23:
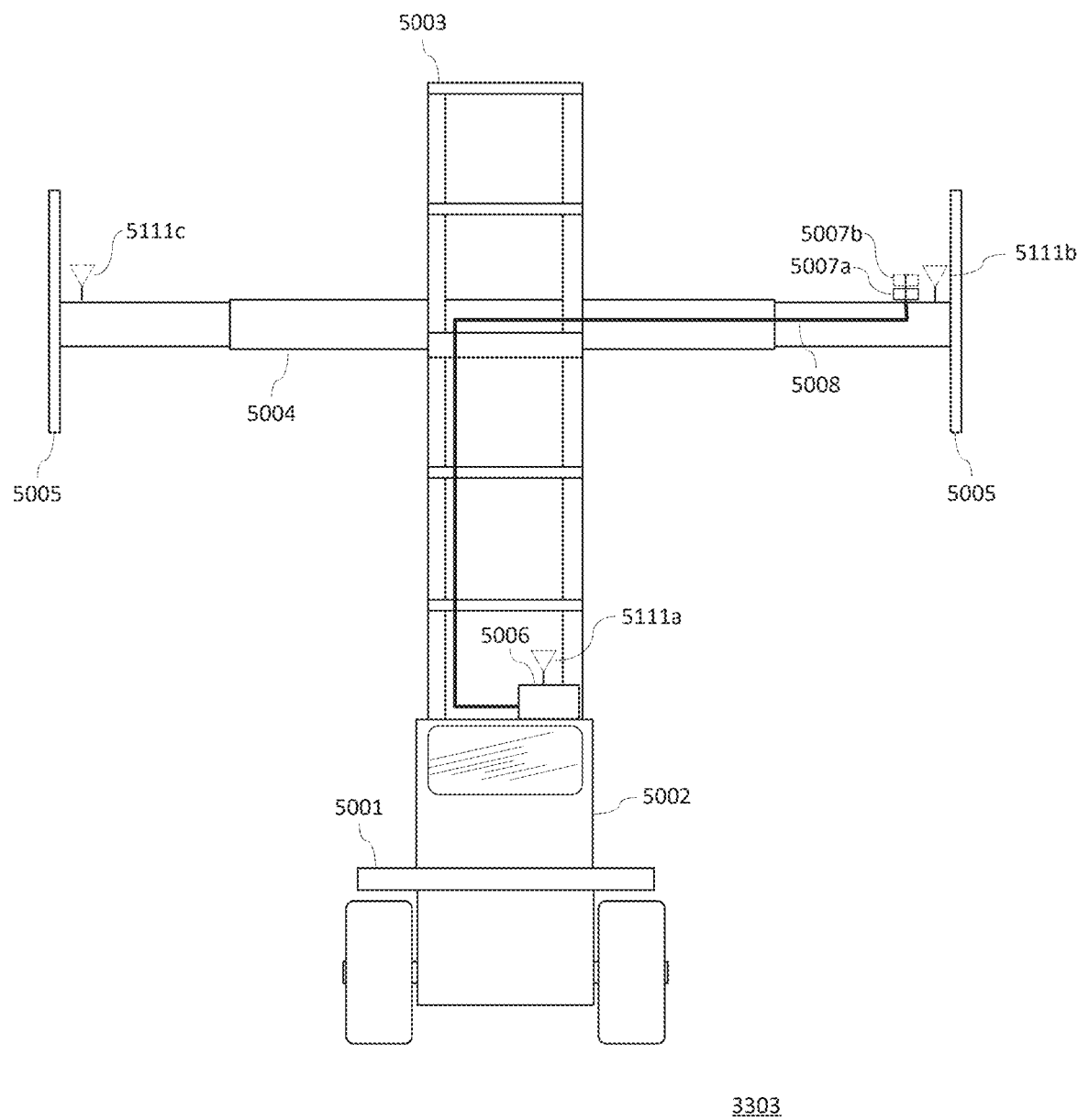
FIG. 23 is a schematic illustration of a container handler, according to another example embodiment of the present disclosure.

As shown in the example illustrated in FIG. 23, the exemplary container handler 3303 can include a chassis 5001, a cab 5002, a telescopic mast 5003, arms 5004, and container handling attachments 5005. For example, the container handler can include a 45' telescopic mast for stacking 5-high 9'6" empty containers or 6-high 8'6" empty containers, 51' telescopic mast for stacking 6-high 9'6" loaded containers, 54' telescopic mast for stacking 6-high 9'6" empty containers or 7-high 8'6" empty containers, or the like. The container handler can include a side pick 20-40 ISO container handler side post attachment, guide arms, side shift, mechanical pile slope, and/or twist lock safety interlock systems.

As shown in the example illustrated in FIG. 23, the exemplary container handler 3303 can include a module 5006, for example, on the roof of the cab 5002 of the container handler 3303. The module 5006 can include the controller 3313, wireless transceiver 3312, and geolocation device 3311 (e.g., GPS receiver) described with reference to FIGS. 21 and 22.

The exemplary container handler 3303 can include one or more onboard sensors configured to generate sensor data of at least some of the plurality of containers 3304a-3304n in the container terminal 3301, such as one or more image sensors 5007a, 5007b configured to generate container image data. The controller 3313 can be coupled to the image sensors 5007a, 5007b and the geolocation device, for example, by an Ethernet radio line 5008 or the like, or a wireless connection, for example, utilizing a wireless network, which can be, for example, on-board or local to the container handler 3303.

As set forth above, in some embodiments, the one or more image sensors 5007a, 5007b may comprise an image sensor configured to generate container image data. In the illustrated example embodiment, the plurality of onboard sensors 3306a-3306c is directed frontward from the container handler. For example, the one or more image sensors 5007a, 5007b may comprise a high resolution video sensor (e.g., 4k video sensor). In an advantageous embodiment, one or more of the image sensors 5007a, 5007b may comprise a FLEX-IDOME IP starlight 8000i (as available from Robert Bosch LLC). This 2 megapixel, 4 megapixel, 6 megapixel performance line of cameras offers high performance and high dynamic range with 1080p or 4K UHD resolution to provide crisp and highly detailed images even in extreme low-light situations. The capture frequency may comprise 60 frames per second, for example, which provides for optimum performance in fast action scenes that makes sure no critical data is lost and video is captured with excellent detail. In another exemplary application, one or more of the plurality of onboard sensors 3306a-3306c may comprise a FLEX-IDOME IP panoramic 7000 megapixel (as available from Robert Bosch LLC), which is a discreet, aesthetic, low-profile camera for indoor/outdoor use. The 12 megapixel sensor operating at 30 frames per second provides full panoramic surveillance with complete area coverage, fine details and high speeds. The camera offers full situational awareness and simultaneous PTZ views in high resolution.

The one or more image sensors 5007a, 5007b can include at least one camera configured with a horizontal, vertical, or angled field of view for capturing markings on a surface of a container 3304. In some examples, the one or more image sensors 5007a, 5007b can include more than one camera, such as two cameras or more.

In FIG. 23, the image sensors 5007a, 5007b are schematically illustrated on an arm 5004 of the container handler 3303. The image sensors 5007a, 5007b can be arranged on the arm 5004 in other locations, such as on a forward facing area of the arm 5004, on top of or above the arm 5004, under or below the arm 5004, on a part of the mast 5003, on a part of a guide arm 5005, on another component of the container handler 3303, or adapted to or couple to a part of the container handler 3303 by another component, such as a mount.

A position of the one or more image sensors 5007a, 5007b on a part of the container handler 3303 can be selected and/or optimized such that a field of view of the image sensor 5007a, 5007b captures the container markings 5009, and more particularly, such that only a single set of container markings 5009 are captured within the field of view, when the container handler 3303 is adjacent to or in close proximity to the container 3304a-3304n such as when the container handler 3303 is in the process of engaging with, or releasing from engagement with, the container 3304a-3304n, such as when the relevant mechanisms of the container handler are being actuated between a locked and unlocked state with respect to the container 3304a-3304n, and/or when the container handler 3303 is engaged (e.g., locked) with the container 3304a-3304n such as when the relevant mechanisms of the container handler 3303 are locked onto the container 3304a-3304n.

A field of view of the one or more image sensors 5007a, 5007b can be configured, pointed, focused, and/or optimized such that only a single set of container markings 5009 are visible when the container handler 3303 is adjacent to or in close proximity to the container 3304a-3304n such as when the container handler 3303 when the container handler 3303 is in the process of engaging with, or releasing from engagement with, the container 3304a-3304n, such as when the relevant mechanisms of the container handler 3303 are being actuated between a locked and unlocked state with respect to the container 3304a-3304n, and/or when the container handler 3303 is engaged (e.g., locked) with the container 3304a-3304n such as when the relevant mechanisms of the container handler 3303 are locked onto the container 3304a-3304n.

In an example, the one or more image sensors 5007a, 5007b can include a first camera with a field of view configured for capturing markings 5009 on a surface of the containers 3304, such as one or more of container codes/stencils, logos, marks, numbers, letters, etc., and/or combinations thereof, oriented in a vertical direction, and a second camera with a field of view configured for capturing such markings oriented in a horizontal direction.

In other examples, the one or more image sensors 5007a, 5007b can include two or more cameras similarly configured with a field of view (e.g., vertically, horizontally, at an angle, etc.) for capturing markings 5009 oriented in a horizontal or vertical direction, such as by combining the fields of view of more than one camera. In other examples, the one or more image sensors 5007a, 5007b can include a camera having a 360° lens.

In an example, a predetermined distance between the one or more image sensors 5007a, 5007b and a surface of the container 3304 having the container markings 5009 can be twenty-four inches (24") or less, and more particularly, approximately fourteen inches (14"), as well as other suitable distances. In this case, a field of view of the one or more image sensors 5007a, 5007b can be configured such that only a single set of container markings 5009 are visible at the predetermined distance. The container handler 3303 can include one or more components configured to assist with aligning the one or more image sensors 5007a, 5007b or other components of the container handler 3303 with a container 3304.

The one or more image sensors 5007a, 5007b can be coupled to a part of the container handler 3303 in a fixed position. In other examples, the one or more image sensors 5007a, 5007b can be coupled to a part of the container handler 3303 with a movable configuration or arrangement, such that the field of view, angle, zoom, etc. of the one or more image sensors 5007a, 5007b is movable or adjustable by remote manual operation or autonomous control by the control system 3000.

The present invention recognizes that the one or more image sensors 5007a, 5007b may be subjected to various forces during operation of the container handler 3303, such as impact forces, vibration, etc. In some examples, the one or more image sensors 5007a, 5007b can be mounted on the container vehicle 3303 using isolation mounts, such as vibration-isolating mounts, vibration-damping mounts, harmonic mounts, etc.

The image sensors 5007a, 5007b are not limited to any type of camera and can include off-the-shelf or conventional cameras.

In this example, the geolocation device 3311 can include, for example, a first GPS receiver 5111a on the cab 5002 and a second GPS receiver 5111b on an arm 5004. In another example, the geolocation device 3311 can include, for example, a first GPS receiver 5111a on the cab 5002, a second GPS receiver 5111b on one side of the arm 5004, and a third GPS receiver 5111c on the other side of the arm 5004, in order to triangulate an orientation and/or direction of travel/approach of the container handler 3303, to thereby determine an orientation of a container 3304 at the time such container 3304 is picked-up or dropped-off by the container handler 3303. This is particularly important for determining an orientation of the container handler 3303 since the arms 5004 are configured to be telescopic to adjust for container of different size. In an example having two GPS receivers, the movement of the GPS receiver 5111b when the arm 5004 is telescoping in relation to the fixed GPS receiver 5111a on the cab 5002 can provide the appearance that the container handler 3303 is oriented in a different direction from its previous orientation. Accordingly, to solve this problem, an example embodiment provides a geolocation device 3311 having, for example, a first GPS receiver 5111a on the cab 5002, a second GPS receiver 5111b on one side of the arm 5004, and a third GPS receiver 5111c on the other side of the arm 5004, in order to triangulate an orientation and/or direction of travel/approach of the container handler 3303, to thereby determine an orientation of a container 3304 at the time such container 3304 is picked-up or dropped-off by the container handler 3303. In this example having three GPS receivers, when both sides of the arm 5004 are telescoping (e.g., widening or narrowing a width of the overall arm 5004), the GPS receivers 5111b and 5111c move symmetrically in relation to the fixed GPS receiver 5111a on the cab 5002, thereby enabling the orientation and/or direction of travel/approach of the container handler 3303 to be easily and reliably triangulated to thereby determine an orientation of a container 3304 at the time such container 3304 is picked-up or dropped-off by the container handler 3303. The GPS receivers 5111a-c are not limited to any type of GPS receiver and can include off-the-shelf or conventional GPS receivers.

Figure 24:
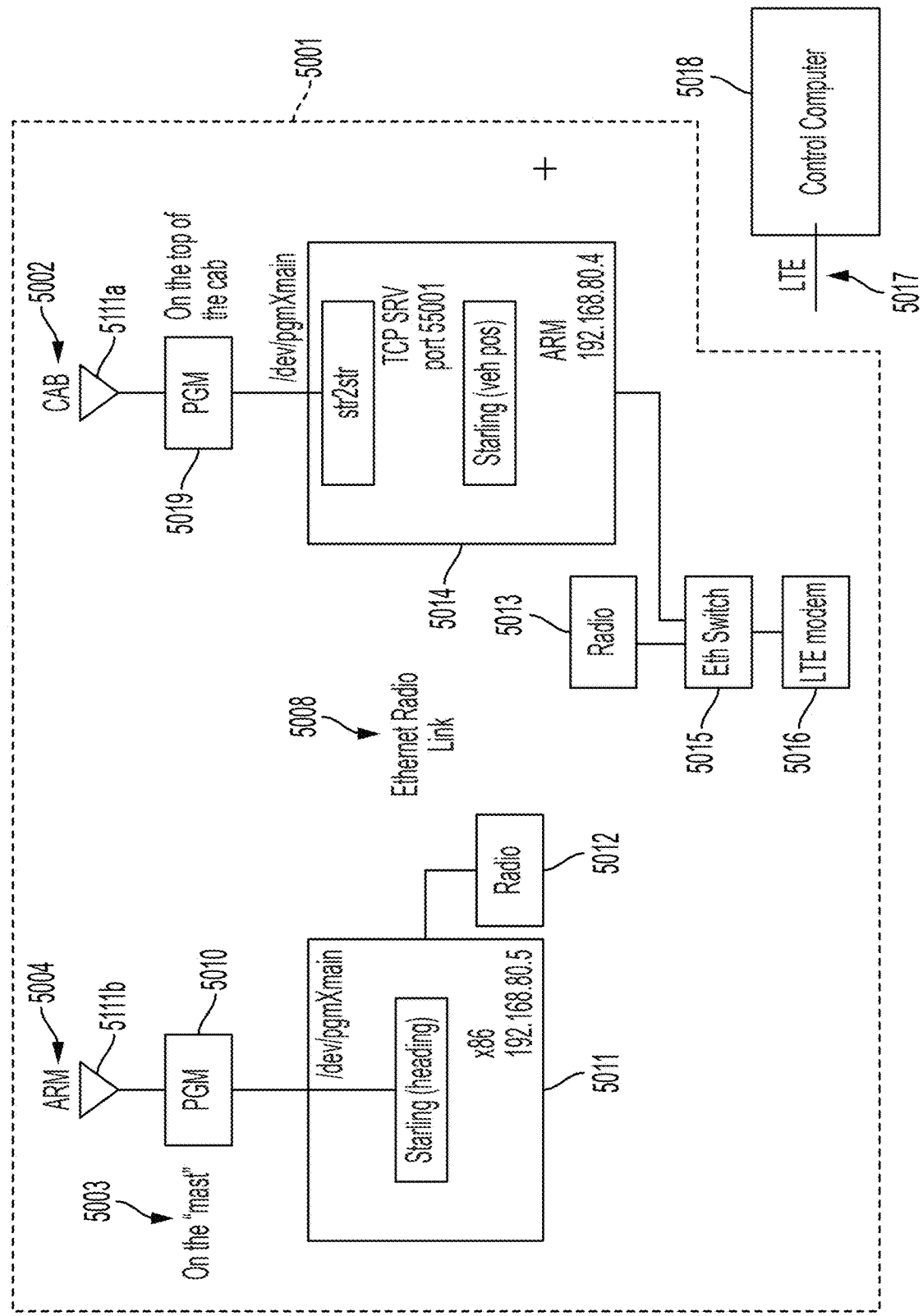
FIGS. 24-27 are schematic illustrations showing operation of a container handler, according to an embodiment of the present disclosure.
Figure 25:
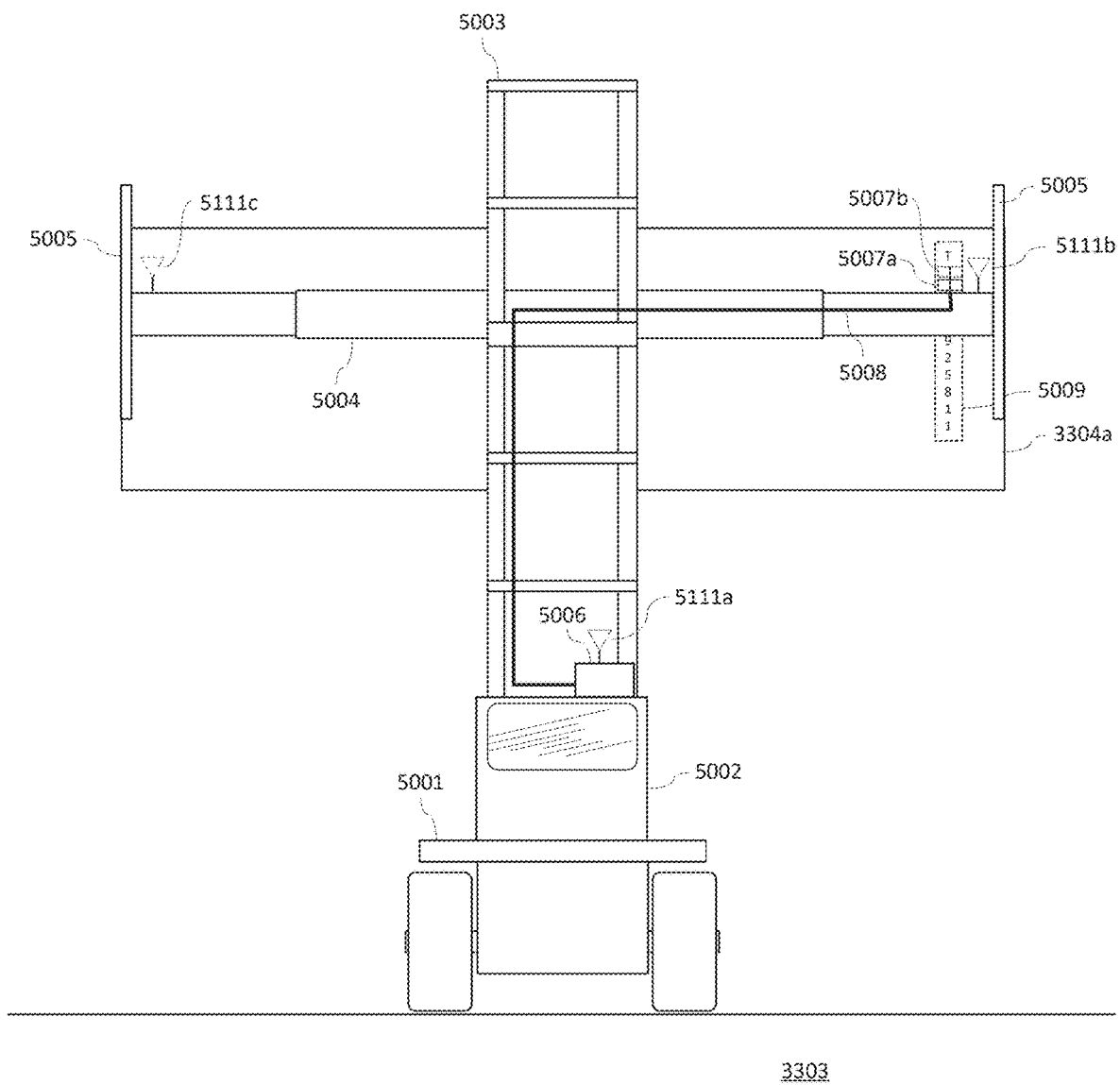
Figure 26:
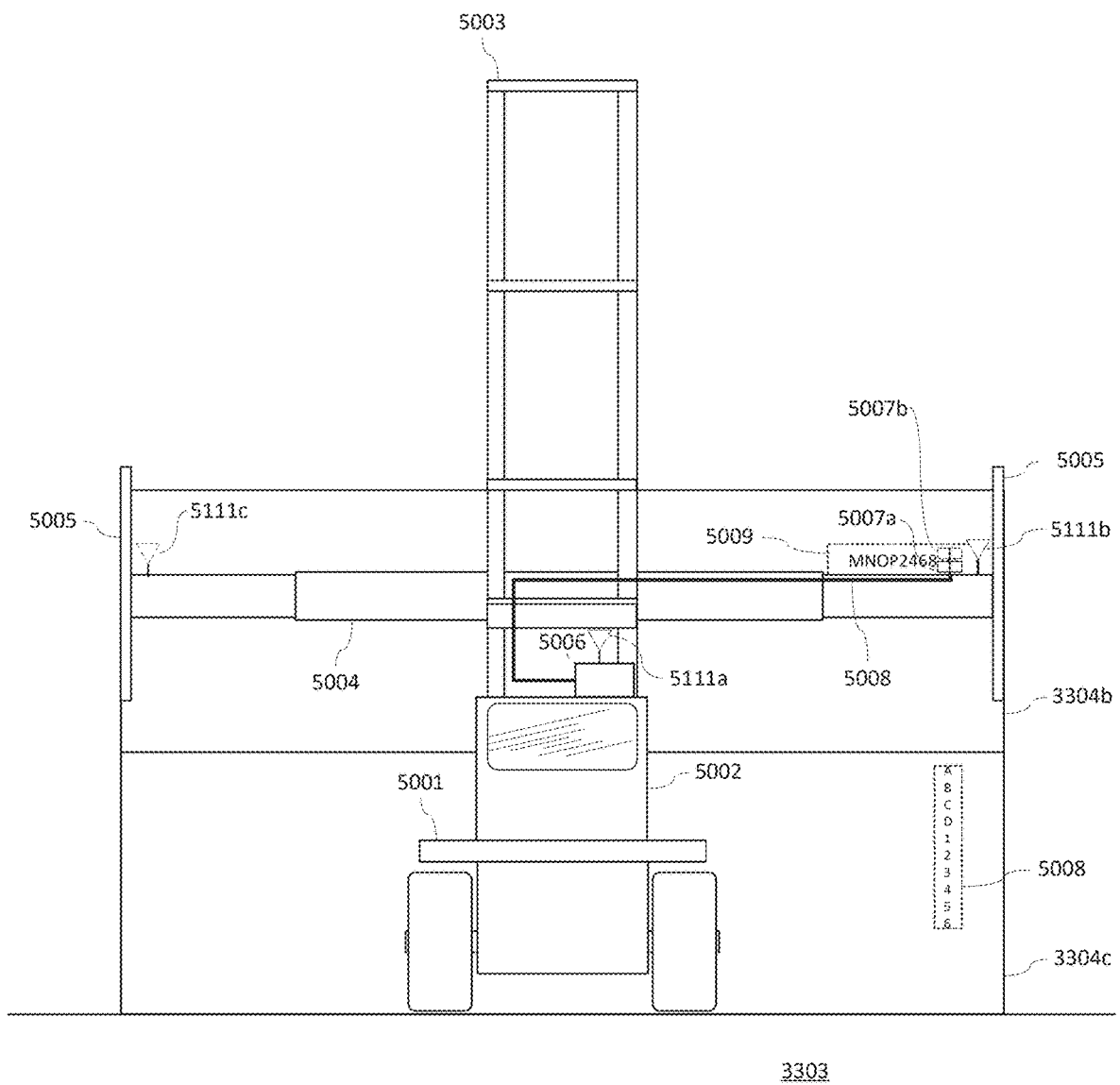
Figure 27:
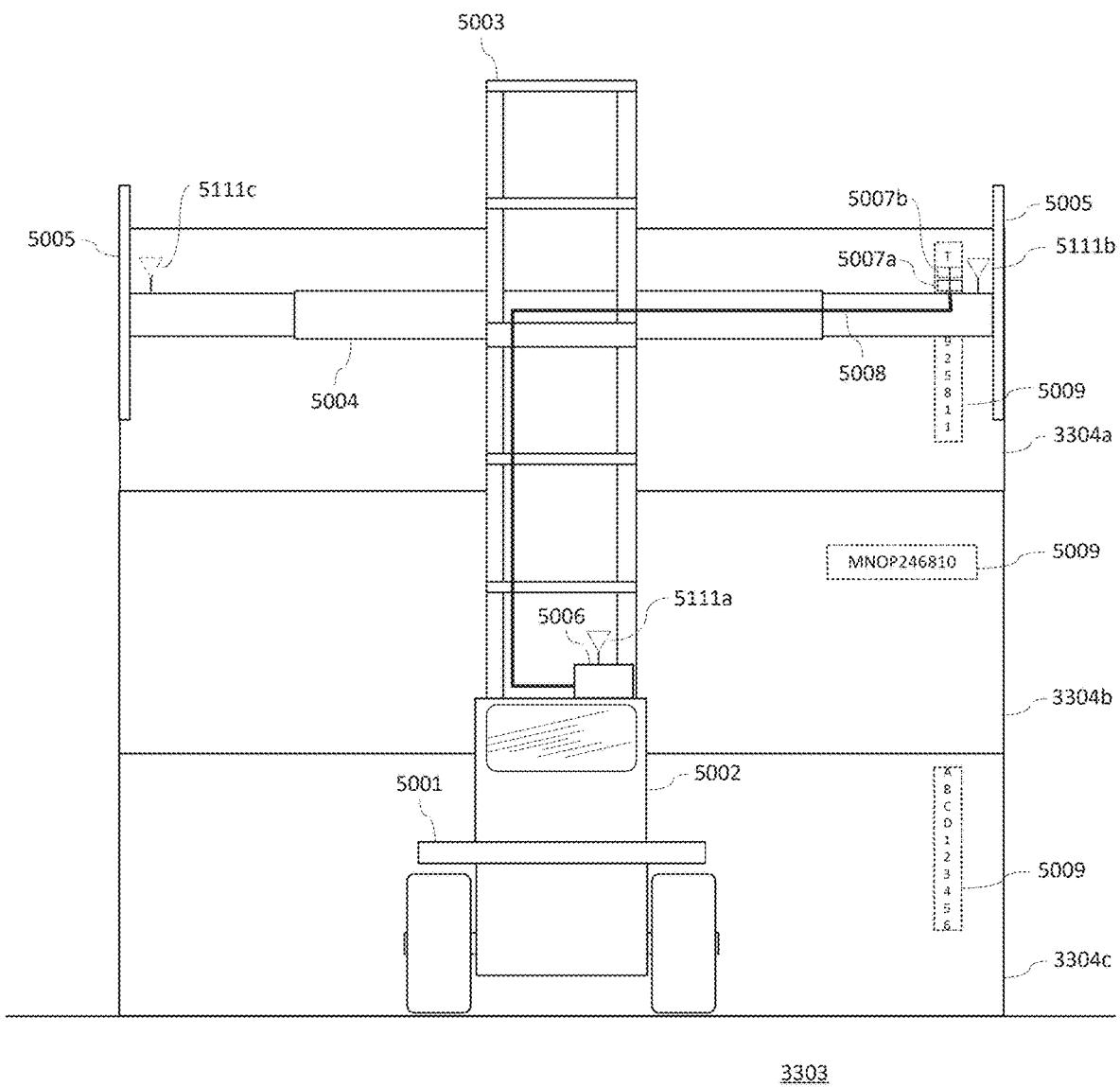

Referring to FIG. 24, in an example of a container handler 3303, the chassis 5001 can include an on-board storage medium 5010 (e.g., PGM file store), a processor or controller 5011 on the arm 5004, mast 5003, or another component, and a radio 5012. The radio 5012 can be arranged in communication with a radio 5013 of the on-board module 5006, for example, located on the roof of the cab 5002, and connected by an ethernet radio link 5008. The module 5006 can include a processor or controller 5014, a storage medium 5019 (e.g., PGM file store), ethernet switch 5015 connecting the processor 5014 and the radio 5013, and an LTE modem 5016. The modem 50160 is not limited to the illustrated example and can any suitable type of modems, wireless communication device, etc.

Figure 28:
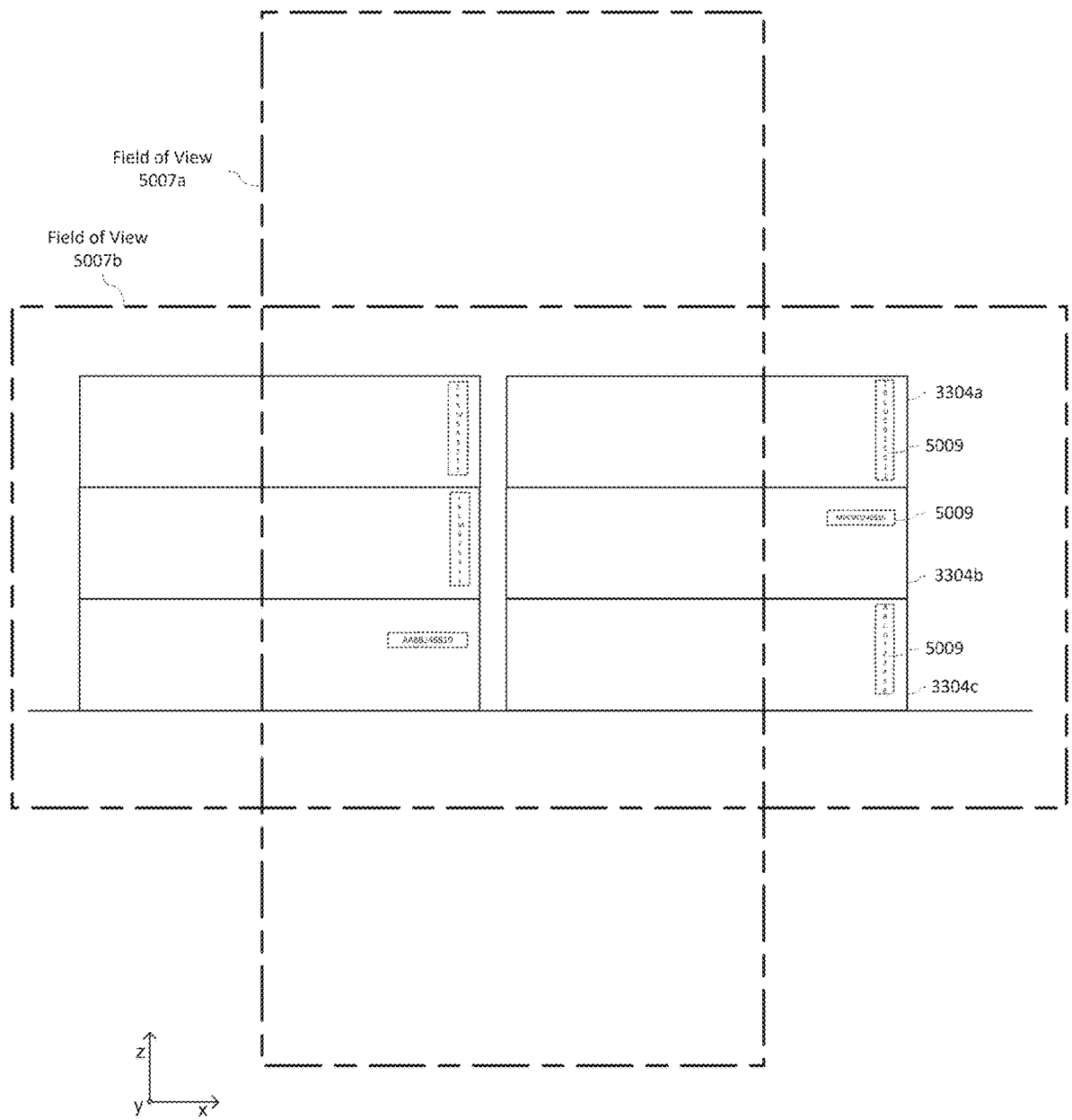
FIGS. 28-32 are schematic illustrations showing operation of a container handler, according to an embodiment of the present disclosure.
Figure 29:
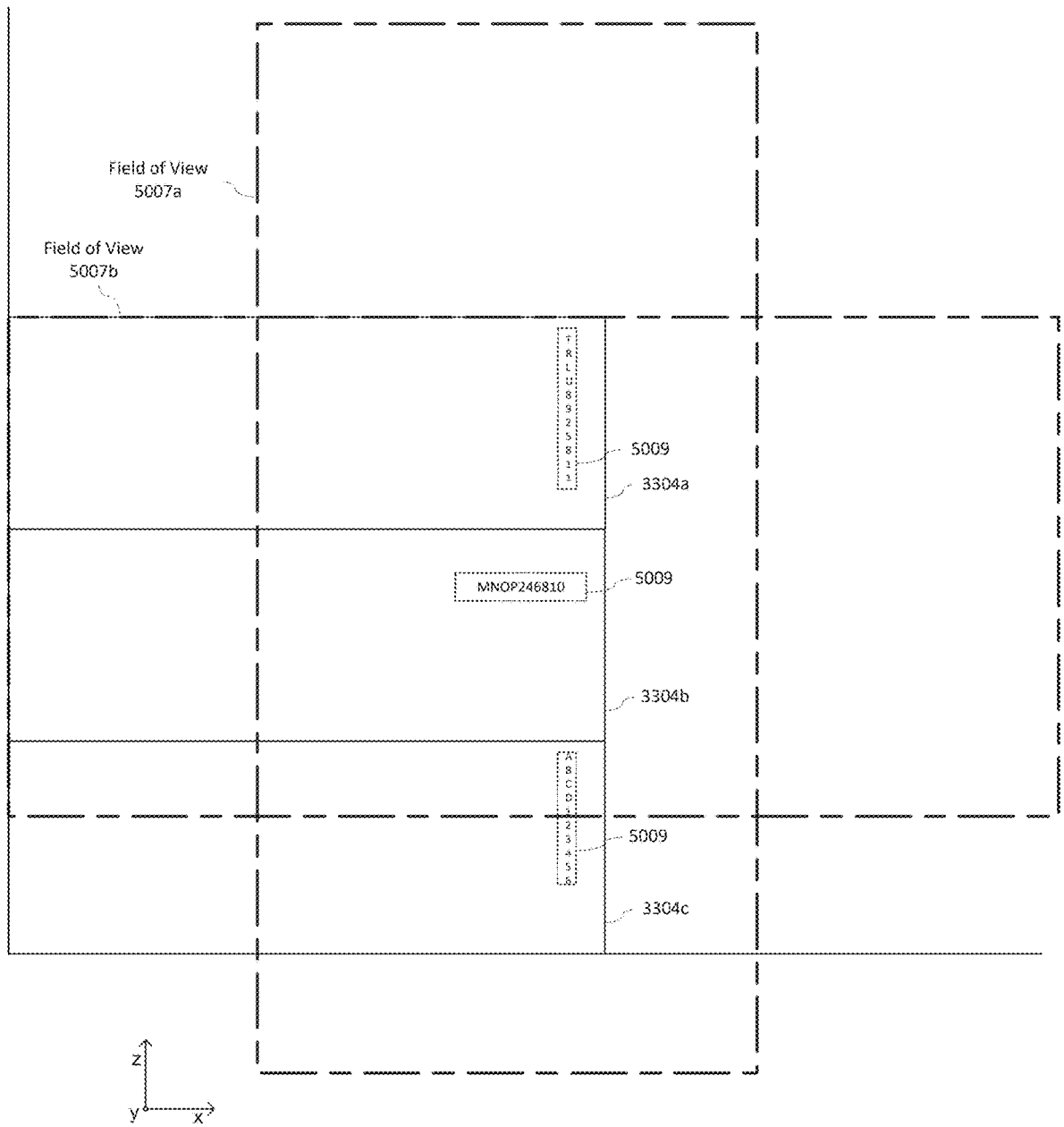
Figure 30:
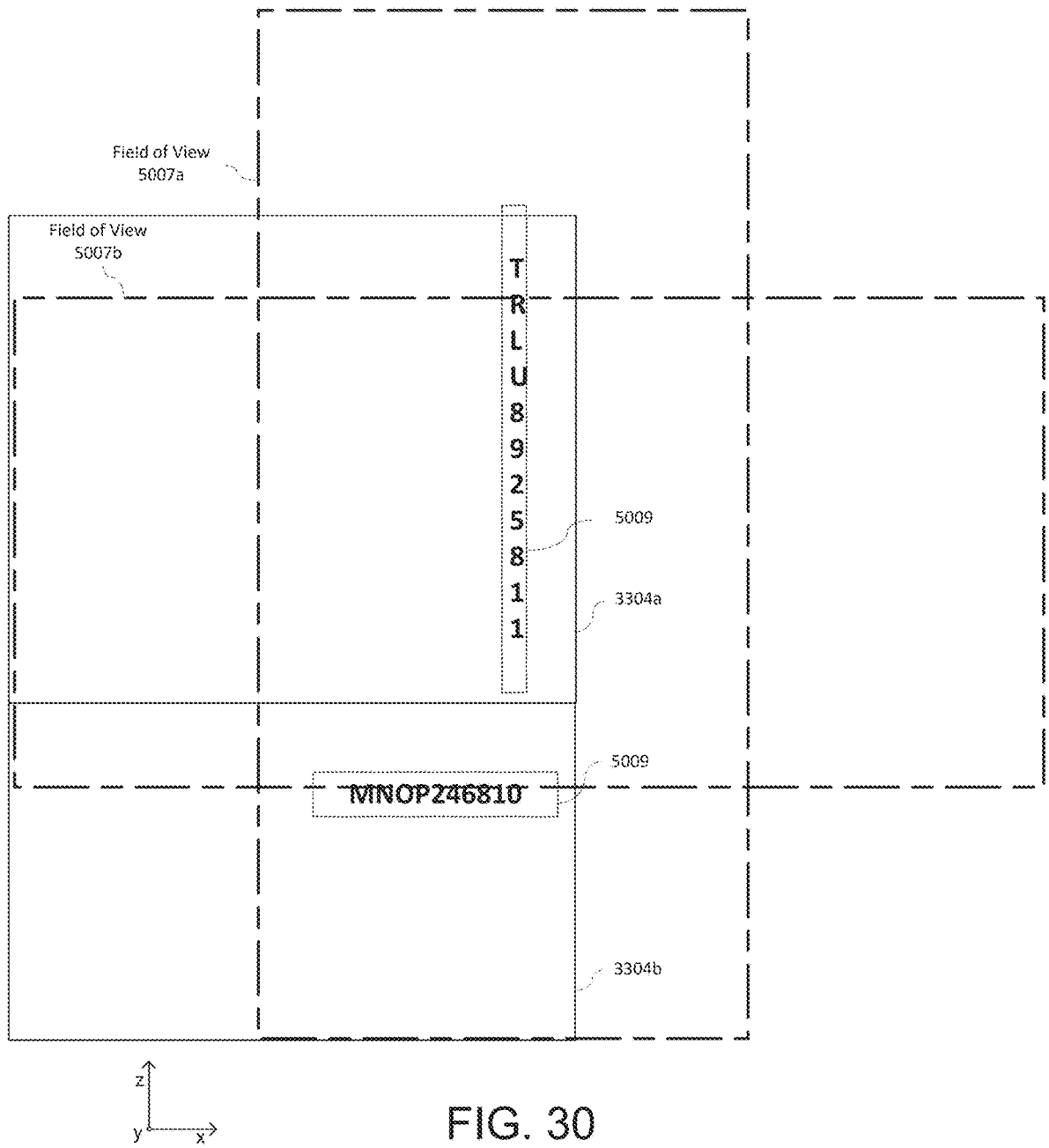

Referring again to FIGS. 25-32, an example operation of a container handler 3303 will now be described. In this example, the container handler 3303 can include two image sensors 5007a, 5007b directed frontward from the arm 5004 of the container handler 3303 and configured to generate container image data with respect to the container 3304. The first image sensor 5007a can include a camera with a field of view configured for capturing markings 5009 on a surface of the containers 3304, such as one or more of container codes/stencils, oriented in a vertical direction. The second image sensor 5007b can include a second camera with a field of view configured for capturing such markings 5009 oriented in a horizontal direction, as shown in FIG. 28.

As shown in FIGS. 28-32, when the container handler 3303 approaches a stack of containers 3304a-3304n, the field of view of the image sensors 5007a, 5007b captures the markings 5009 of a plurality of containers 3304a-3304n. As the container handler 3303 moves closer to the stack of containers 3304a-3304n, the field of view of the image sensors 5007a, 5007b captures less of the markings 5009 of a plurality of containers 3304a-3304n until only a single set of container markings 5009 are captured within the field of view, when the container handler 3303 is adjacent to or in close proximity to the container 3304a-3304n such as when the container handler 3303 is in the process of engaging with, or releasing from engagement with, the container 3304a-3304n, such as when the relevant mechanisms of the container handler are being actuated between a locked and unlocked state with respect to the container 3304a-3304n, and/or when the container handler 3303 is engaged (e.g., locked) with the container 3304a-3304n such as when the relevant mechanisms of the container handler 3303 are locked onto the container 3304a-3304n.

Figure 31:
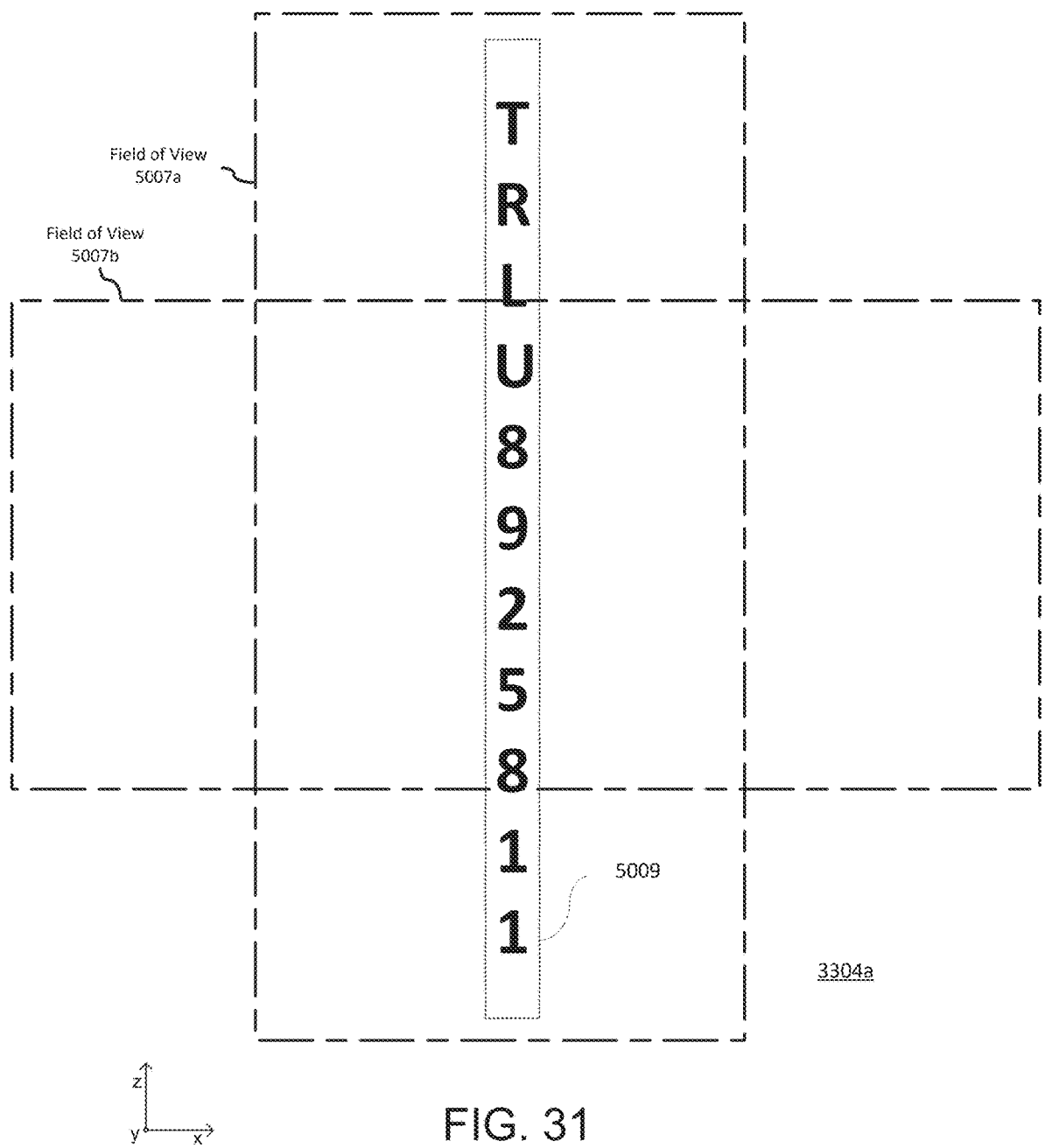
Figure 32:
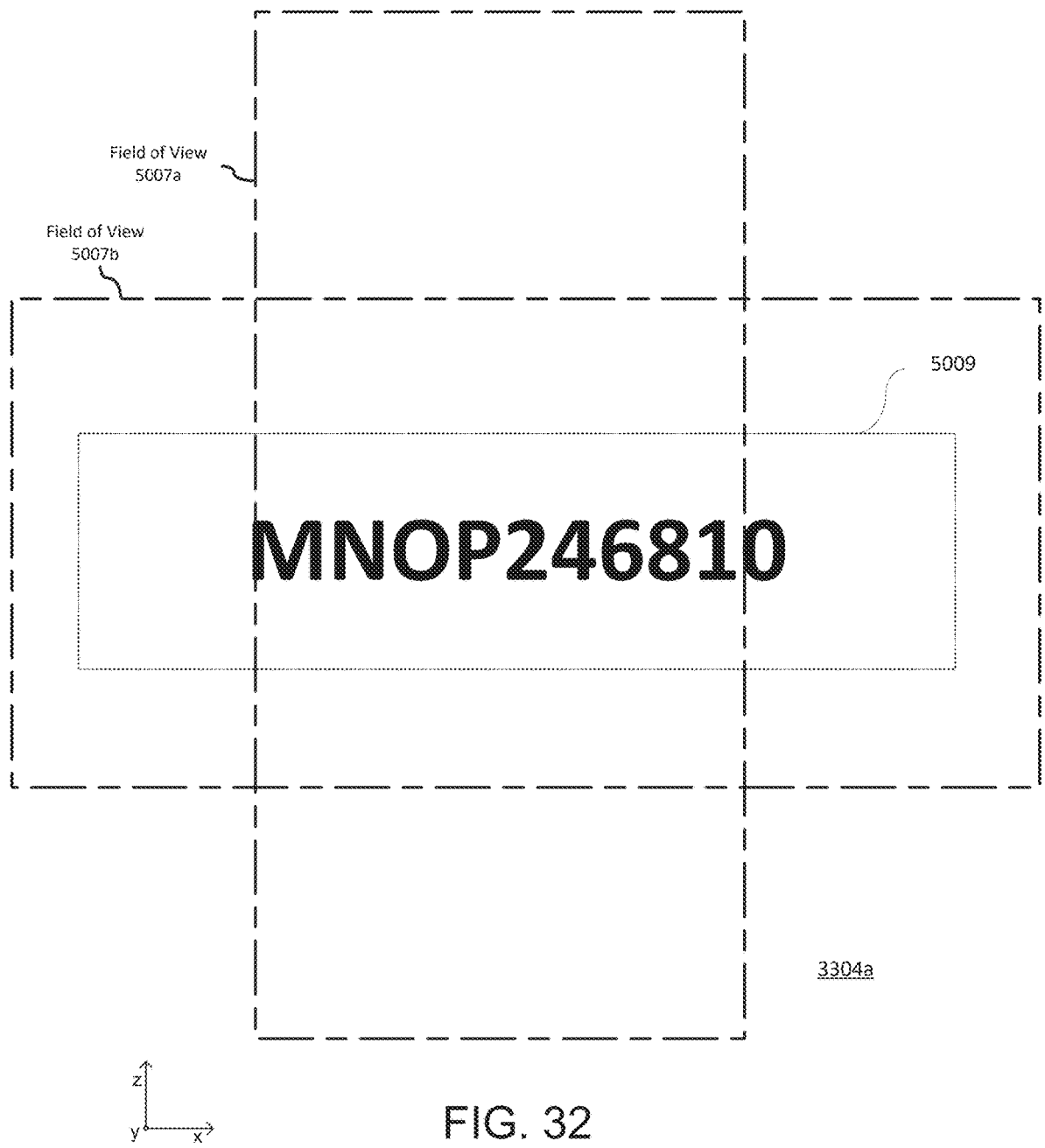

For example, in the case of vertically oriented container markings 5009 (i.e., extending in the z-direction), only a single set of container markings 5009 are captured within the field of view of the first camera 5007a, as shown in FIG. 31. In another example, in the case of horizontally oriented container markings 5009 (i.e., extending in the x-direction), only a single set of container markings 5009 are captured within the field of view of the second camera 5007b, as shown in FIG. 32.

The image sensor 5007a and/or 5007b can be configured to generate container image data, perform OCR on the container image data according to the exemplary embodiments herein, and identify the container 3304a-3304n based upon the container image data, for example, including container markings 5009 such as a container code/stencil.

In some examples, the steps of performing OCR and performing machine learning on the container image data according to the exemplary embodiments herein, and identify the container 3304a-3304n based upon the container image data, for example, including container markings 5009 such as a container code/stencil, can be performed on-board the container handler 3303 by the components of the module 5006 (e.g., processor/controller 5014), and then transmitted, either simultaneously or at a later time (e.g., periodically in whole or in part), to the server (e.g., 3307, 5018).

In another example, the components of the module 5006 (e.g., processor/controller 5014) can transmit the container image data, either simultaneously or at a later time (e.g., periodically in whole or in part), to the server (e.g., 3307, 5018). The server 3307 may be configured to perform OCR on the container image data and to perform machine learning on the container image data according to the exemplary embodiments herein, and identify the container 3304a-3304n based upon the container image data, for example, including container markings 5009 such as a container code/stencil.

In an example, if the step of performing OCR on the container image data according to the exemplary embodiments herein identifies a valid container based on the container code/stencil image for the container 3304a-3304n, then the control system 3000 can transmit, either simultaneously or at a later time (e.g., periodically in whole or in part), the image data and the geolocation data for this container to the server 3307 without manual review without regard to any certainty of the decision (i.e., a percentage of certainty). In other words, the control system 3000 can be configured to make a binary decision. This is because the control system 3000 obtains sufficient container image data according to the invention such that the step of performing OCR on the container image data identifies a valid container code/stencil at a very high percentage. As a result, the control system 3000 will accept the determination by the step of performing OCR on the container image data if it identifies a valid container based on the container code/stencil image for the container 3304a-3304n. On the other hand, in an example, if the step of performing OCR on the container image data according to the exemplary embodiments herein fails to identify a valid container based on the container code/stencil image for the container 3304a-3304n, then the control system 3000 can be configured to transmit (e.g., automatically transmit), either simultaneously or at a later time (e.g., periodically in whole or in part), a notice or exception to the server (e.g., 3307, 5018), along with a copy of the image data, for manual review by an operator. The system 3000 can be configured to receive an input from the operator manually identifying the subject container. This data can then be incorporated into the database along with its associated geolocation data to track the container in the container terminal 3301. By providing a binary decision based on the step of performing OCR on the container image data, the control system 3000 can quickly and efficiently identify one or more containers and their locations.

In the illustrated example, the control system 3000 comprises a container handler 3303 having an on-board geolocation device 3311 configured to generate geolocation data corresponding to a location of the container handler 3303 and a particular container 3304 at a time when the container handler 3303 is adjacent to or in close proximity to the container 3304 such as when the container handler 3303 is approaching, or withdrawing from the container 3304, when the container handler 3303 is engaged with the container 3304 such as when the relevant mechanisms of the container handler are locked onto the container 3304, when the container handler 3303 is in the process of engaging with, or releasing from engagement with, the container 3304 such as when the relevant mechanisms of the container handler are being actuated between a locked and unlocked state with respect to the container 3304, and/or when the container handler 3303 is transporting the container 3304.

In the illustrated example, the on-board geolocation device 3311 is configured to generate geolocation data corresponding to a location of the container 3304 by the actuation (e.g., locking and/or unlocking) of the relevant mechanisms of the container handler 3303 with respect to the container 3304. In this way, a precise location of the container 3304 can be determined or known at the time the container handler 3303 locks onto the container 3304, for example to lift the container form the ground or from a stack of other containers, and then transport the container. Similarly, a precise location of the container 3304 can be determined or known at the time the container handler 3303 is unlocked from the container 3304, for example to set the container 3304 on the ground or on a stack of other containers. The geolocation device 3311 can be configured to generate a latitude value (x), and longitude value (y), and an altitude value (z) for the container handler 3303a-3303n and/or an associated container 3304. In this way, the geolocation device 3311 can not only be configured to generate a geolocation value for the container handler 3303a-3303n and/or an associated container 3304 within the container terminal 3301, but also to generate a geolocation value for the container handler 3303a-3303n and/or an associated container 3304 in a stack of other containers 3304 in the container terminal 3301 (e.g., a stack height of the particular container 3304 in a stack of other containers). As a result, a starting location and an ending location of the container 3304 can be determined or known with each move of the container 3304 by a container handler 3303, including a position of the container in a stack of other containers (e.g., an elevation of the container in a stack), and a movement of the container 3304 from one location to another location can be accurately tracked within the terminal 3301.

In some examples, the geolocation device 3311 can not only be configured to generate a geolocation value for the container handler 3303a-3303n and/or an associated container 3304 during transportation/movement of the container handler 3303 and container 3304 within the container terminal 3301.

According to the examples, the control system 3000 comprises a wireless transceiver 3312 and a controller 3313 coupled to the plurality of onboard sensors (e.g., 5507a, 5507b), the geolocation device 3311, and the wireless transceiver 3312. The server 3307 can be configured to communicate with the container handler 3303 to receive the sensor data and the geolocation value and generate a database 3310 associated with the sensor data, the database comprising, for each container 3304, container image data (e.g., a container marking image, such as a container code/stencil image) and associated geolocation data.

Figure 33:
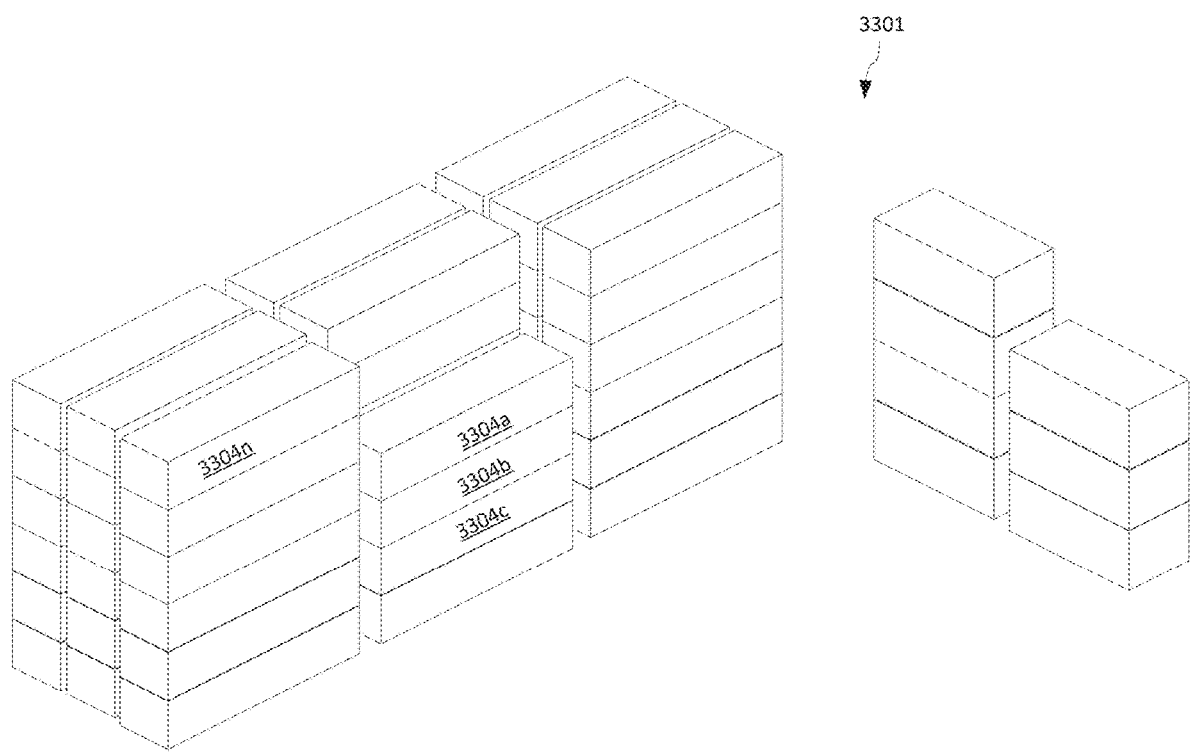
FIG. 33 is a diagram of a container terminal, according to an embodiment of the present disclosure.
Figure 34:
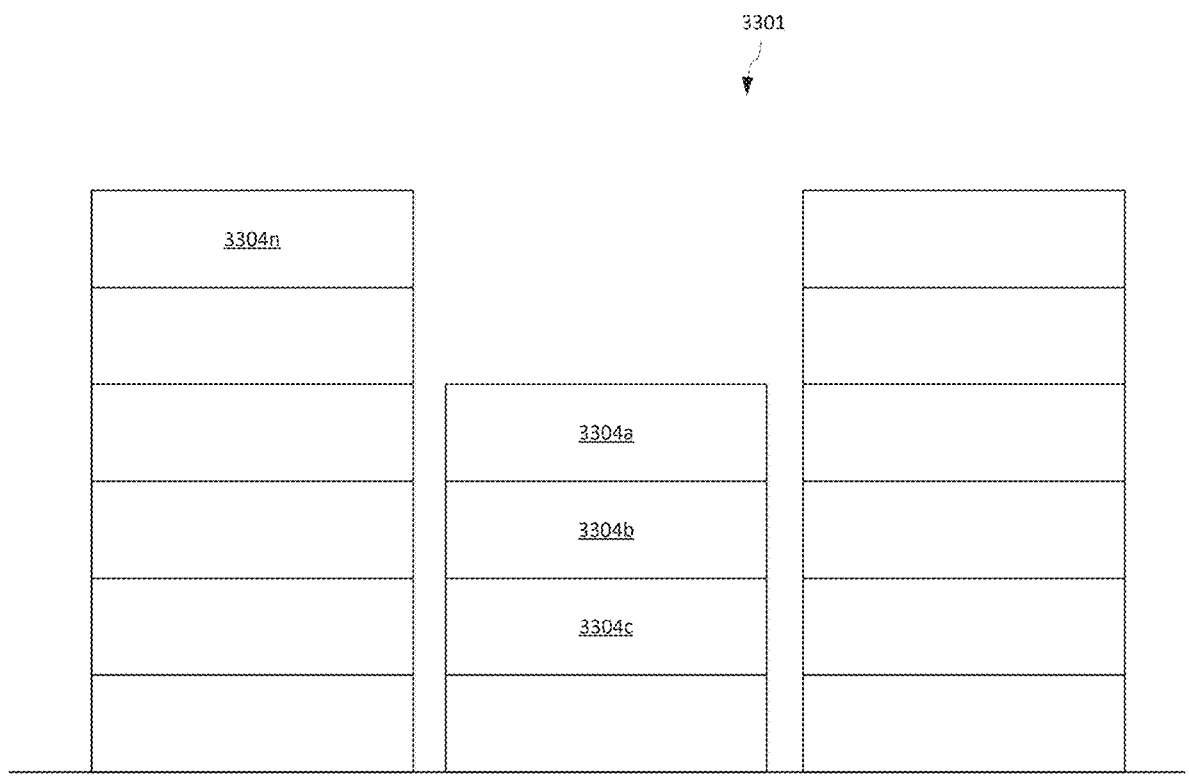
FIG. 34 is another diagram of a container terminal, according to an embodiment of the present disclosure.
Figure 35:
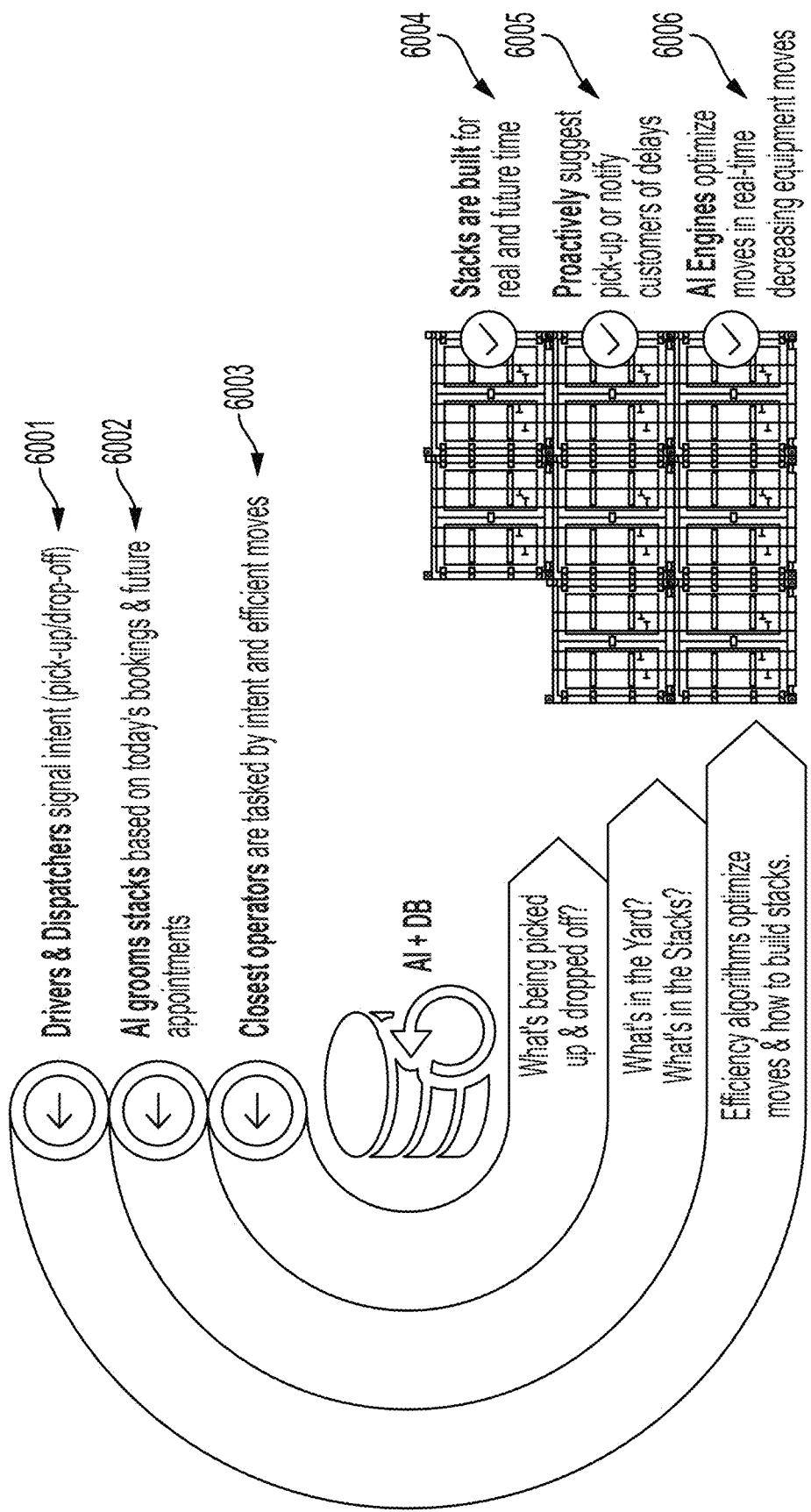
FIG. 35 is a schematic illustration of a control system and method, according to another example embodiment of the present disclosure.

Referring to FIGS. 33-35, the examples of the control system 3000 described herein, can utilize image data and location data of one or more containers 3304a-3304n to optimize operations of a container terminal 3301.

In an example, the control system 3000 described herein, can utilize image data (e.g., high-resolution imagery), data-inferencing capabilities, and one or more neural networks, such as one or more AI models, to identify, classify, and locate a precise location of one or more stacked containers 3304a-3304n in a container terminal 3301 in real-time. As a container 3304 enters, leaves, or shifts/moves within the container terminal 3301, the control system 3000 can send updates to the cloud and any receiving system (TMS/YMS) with a precise location of one or more containers 3304a-3304n in the container terminal 3301 as well as a precise location (i.e., altitude) of the container 3304 in a stack.

In this way, the control system 3000 can provide operators a real-time snapshot of a container terminal 3301. A precise location of one or more containers 3304a-3304n in one or more stacks can be known and tracked. Moreover, in exemplary systems and methods, the control system 3000 can be configured to utilize such real-time image data, location data, and other metrics and/or other factors to groom stacks of containers, including for example optimizing and/or adjust (e.g., automatically optimizing and/or adjusting) a location of one or more containers in one or more stacks of containers, for example, to streamline workflow, among other things.

According to the exemplary embodiments, the control system 3000 can be configured to process this real-time data to optimize movements of containers 3304a-3304n in the container terminal 3301. In an example, the control system 3000 can utilize one or more AI Engines to process this real-time data to optimize movements of containers 3304a-3304n in the container terminal 3301 using efficiency algorithms.

For example, the control system 3000 can be provided on one or more container handlers 3303a-3303n of a container terminal 3301 and configured to track one or more containers 3304a-3304n as they are moved and intelligently place the one or more containers 3304a-3304n in stacks in the container terminal 3301 to minimize or avoid reshuffling of containers and/or minimize or avoid unproductive moves of containers, as shown in FIGS. 33-34.

In an example, the control system 3000 can be configured to groom (e.g., change or rearrange) stacks of containers handlers 3304a-3304n, using for example AI Engines based on a variety of factors. For example, the control system 3000 can be configured to groom stacks based on current bookings and future appointments to place containers handlers 3304a-3304n in an optimal position for extracting and loading onto a vehicle. For example, with reference to FIGS. 33 and 34, if container 3304a is scheduled to be extracted from the stacks prior to containers 3304b and 3304c, then the system can determine that no grooming of this stack is needed at this time. On the other hand, if container 3304c is scheduled to be extracted from the stacks prior to containers 3304a and 3304b, then the system can determine that this stack may be groomed (e.g., rearranged) to move container 3304c into an optimal position for extraction with no or minimal moves of other containers at the scheduled date/time for extraction of this container 3304c and loading onto a vehicle (e.g., yard truck). In this way, the control system 3000 can be configured to utilize real-time image data and location data of one or more terminals 3304a-3304n in the container terminal 3301, and in some examples, in combination with other metrics and/or other factors, to optimize stacks that otherwise may go untracked by operating teams of a container terminal 3301. For example, additional metrics such as dwell time, average throughput of stacks, historical or current timeliness of drivers, reservations for pickup, etc. can be processed and utilized to provide vital insights about operations of a container terminal 3301.

For example, in some instances, the control system 3000 can be configured to recommend optimizations to one or more stacks, or to automatically instruct container handlers to optimize stacks, on a periodic basis such as daily, weekly, etc.

In an example, the control system 3000 can be configured to provide alerts (e.g., customizable alerts) to notify teams when the most efficient method of building stacks requires a facility layout change (e.g., high winds, peak, customer-preferred stacks, among other things). For example, in the case of forecasted high winds, the control system 3000 can be configured to recommend optimizations to one or more stacks, or to automatically instruct container handlers to optimize stacks, to reduce a height of one or more stacks (e.g., reduce a container height from 7-high to 3-high, or the like). The control system 3000 can be configured to track a location of each container as the container is relocated and then to optimize, or re-optimize, the stacks in view of the new locations and/or other metrics/factors to continually groom the stacks. In an example, the system and method can include a Weather Analysis Engine to forecast and/or detect weather events such as high winds or other weather related events or forecasts.

Referring again to FIGS. 33-36, the examples of the control system 3000 described herein, can utilize image data and location data of one or more containers 3304a-3304n to optimize operations of a container terminal 3301.

For example, in some instances, the control system 3000 can be configured to task a closest lift operator or container handler for each move of a container 3304.

In another example, if a vehicle driver misses or cancels an appointment, the control system 3000 can be configured to utilize AI Engines to optimize, or re-optimize, the stack and updates one or more work orders for one or more lift operator.

In yet another example, if a dispatcher and/or driver signals intent (drop off/pick up) in a customer's Terms of Service (TOS), Yard Management System (YMS), or natively in the system 3000, then the control system 3000 can be configured to utilize one or more AI Engines to update one or more work orders, for example, on in-cab/on-board tablets or other mobile devices to fulfill current bookings and/or optimize stacks for future appointments.

In an example, if a customer and/or driver signals intent to pick up a container, the control system 3000 can identify the precise location of the container, as well as determine a cost to access the container based on its location in a stack. The cost can include, for example, one or more of time, labor, equipment resources, number of movements of other containers to access the container, charged dollar cost to customer, among other defined costs. For example, as shown in FIG. 33, one or more other containers in one or more stacks and/or other stacks of containers may need to be moved/relocated/shifted to access a given container based on, for example, the date and time of pick-up. In this way, one or more of a manager/operator of the inventory management facility, customer, and/or driver (e.g., driver of one or more container handlers) can be informed of a cost to extract the container on that given day and/or time, and/or a cost to extract the container on a different day and/or time, for example, if the container will be more easily accessible (and thus, less expensive to access) in the coming days after other work orders are completed on adjacent containers, thereby enabling the manager/operator of the inventory management facility, customer, and/or driver (e.g., driver of one or more container handlers) to make a business decision on whether to proceed and/or when to proceed with the work order for that container.

In an example, the control system 3000 can be integrated into Terms of Service (TOS) or Yard Management Systems (YMS) to provide one or more customers with access to view assets/inventory (e.g., containers) within a container terminal 3301. In an example, the control system 3000 can include a graphic user interface (GUI) to grant individual customers access to view their inventory within a container terminal 3301.

Referring again to FIGS. 35 and 36, an example method of operations optimization of a container terminal using the control system 3000 described herein, will now be described. In this example, the control system 3000 can utilize image data and location data of one or more containers 3304a-3304n, along with data entered from one or more dispatchers and/or drivers, to optimize the stack within the container terminal 3301 to establish a least cost to stack, mine, deliver and/or receive assets/inventory.

For example, as shown in FIG. 35, one or more drivers and/or dispatchers can signal an intent to, for example, to pick-up a container, drop-off a container, or pick-up and drop-off a container (e.g., step 6001). In an example, the control system 3000 can utilize one or more AI Engines, collected data (e.g., image data and location data), and/or historical data, etc. to groom (e.g., optimize) the stacks and/or continuously groom the stacks using present and future intents (e.g., today's bookings and/or future bookings, etc.) (e.g., step 6002). In an example, the control system 3000 can minimize movements of equipment, such as one or more vehicles (e.g., one or more container handlers 3303a-3303n) and stack rebuilds in real-time and/or future time.

For example, the control system 3000 can task the closest operators based on intent and efficiency of the moves (e.g., step 6003).

In some examples, the control system 3000 can analyze what container or containers are being picked-up and/or dropped-off, what assets are in the inventory management facility such as what containers, container handlers, etc., what containers are in one or more stacks and/or their locations (e.g., height/level of one or more containers in a stack, and/or what containers need to be moved in one or more stacks of containers to access a particular container, among other things), or combinations thereof. In some examples, the control system 3000 can utilize one or more AI Engines (e.g., efficiency algorithms), collected data (e.g., image data and location data), and/or historical data, etc. to groom (e.g., optimize) movements of one or more containers and/or how to build one or more stacks of one or more containers. In some examples, the control system 3000 can build one or more stacks for real-time and/or future times (e.g., 6004). In some examples, the control system 3000 can suggest and/or notify (e.g., proactively suggest and/or notify) one or more of a manager/operator of the inventory management facility, customer, and/or driver (e.g., driver of one or more container handlers) of actual or potential delays, changes in schedule, etc., among other things. In an example, the control system 3000 can optimize movements of equipment, such as one or more vehicles (e.g., one or more container handlers 3303a-3303n) to reduce or minimize equipment moves, thereby improving efficiency (e.g., 6006).

Figure 36:
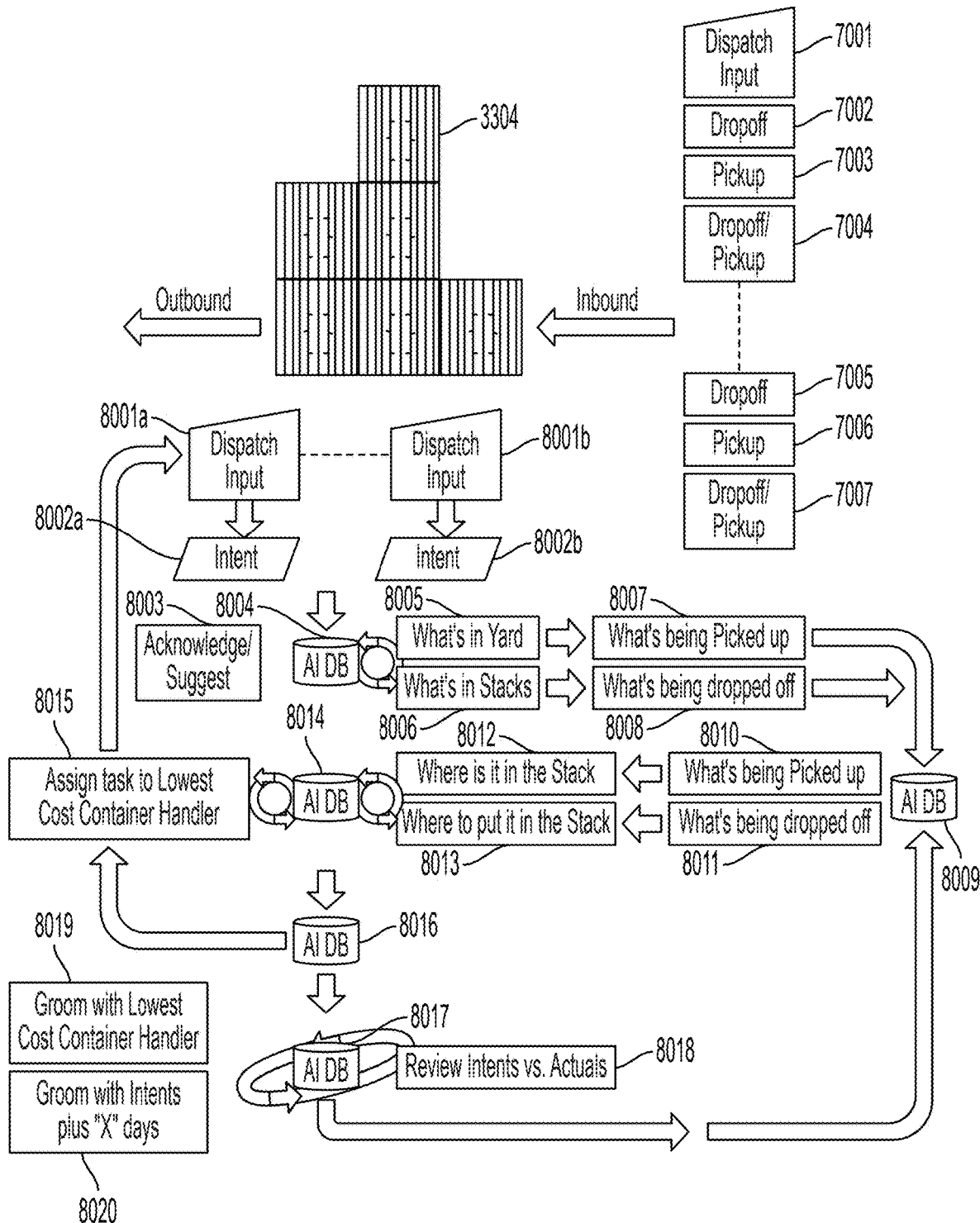
FIG. 36 is a schematic illustration of a control system and method, according to another example embodiment of the present disclosure.

With reference to FIG. 36, an exemplary system and method can receive one or more inputs from one or more drivers and/or dispatchers (e.g., 7001, 8001a, and/or 8001b). The input can signal an intent, for example, to pick-up a container, drop-off a container, or pick-up and drop-off a container (e.g., 7002, 7003, 7004, 7005, 7006, 7007, 8002a, and/or 8002b).

The control system 3000 can utilize one or more AI Engines, collected data (e.g., image data and location data), and/or historical data, etc. (e.g., 8004, 8009, 8014, 8016, and/or 8017).

The control system 3000 can analyze what assets are in the inventory management facility such as what containers, container handlers, etc. (8005, 8012), what containers are in one or more stacks (8006) and/or their locations (e.g., including height/level in a stack) (8012), what container or containers are being picked-up (8007, 8010) and/or dropped-off (8008, 8011).

The control system 3000 can utilize one or more AI Engines (e.g., efficiency algorithms), collected data (e.g., image data and location data), and/or historical data, etc. to groom (e.g., optimize) movements of one or more containers and/or how to build one or more stacks of one or more containers or where to put the one or more containers in the one or more stacks (8013).

The control system 3000 can assign the task to the lowest cost operator (e.g., closest operator) based on intent and efficiency of the moves (8015).

The control system 3000 can minimize movements of equipment, such as one or more vehicles (e.g., one or more container handlers 3303a-3303n) and stack rebuilds in real-time and/or future time (8020). For example, the control system 3000 can utilize one or more AI Engines, collected data (e.g., image data and location data), and/or historical data, etc. (e.g., 8004, 8009, 8014, 8016, and/or 8017) to groom (e.g., optimize) the stacks and/or continuously groom the stacks using present and future intents (e.g., today's bookings and/or future bookings, etc.). The control system 3000 can utilize one or more AI Engines to analyze the intents with actual data, such as real-time container locations. In an example, the control system 3000 can utilize one or more AI Engines, collected data (e.g., image data and location data), and/or historical data, etc. (e.g., 8004, 8009, 8014, 8016, and/or 8017) to groom (e.g., optimize) the stacks based on intents for a predetermined number of days (e.g., intents plus "X" days).

In some examples, the control system 3000 can build one or more stacks for real-time and/or future times (e.g., 6004). In some examples, the control system 3000 can acknowledge, suggest, and/or notify (e.g., proactively suggest and/or notify) (8003) one or more of a manager/operator of the inventory management facility, customer, and/or driver (e.g., driver of one or more container handlers) of actual or potential delays, changes in schedule, etc., among other things. In an example, the control system 3000 can optimize movements of equipment, such as one or more vehicles (e.g., one or more container handlers 3303a-3303n) to reduce or minimize equipment moves, thereby improving efficiency (e.g., 6006).

According to the exemplary embodiments, the control system 3000 may provide a more accurate approach to inventory and location of containers at a container terminal. The control system may identify, locate, and track inventory located in the container terminal. With the control system, inventory and a location of the inventory can be updated (e.g., automatically updated) in real time by each container handler as it executes work orders. The control system may help users make smarter, faster decisions that can boost the entire operation's efficiency and profitability. The control system removes the uncertainty obscured by the lack of visibility, allowing operations teams to view their facility zoomed in or out. Predictive analytics, real-time data, internet-connected machinery, and automation may help companies become proactive to focus on growth strategies. Furthermore, the control system may be readily retrofitted onto existing systems with minor modifications to container handlers.

The exemplary embodiments can provide a stack management system and method that solves the longstanding challenges of tracking and intelligently placing containers in a container terminal to minimize reshuffling and/or unproductive moves.

The exemplary systems and methods can minimize or avoid time-consuming manual processes, poor yard visibility, searching for containers, duplicating work or unproductive moves, digging out containers while drivers are waiting (e.g., moving one or more other containers in one or more stacks of containers to access a particular container), and/or excess emissions, among other things.

The exemplary systems can be simply and easily mounted on an existing container handler, lift, crane equipment, or the like. The exemplary systems and methods enabling tracking and inventorying (e.g., automatic tracking and/or automatic inventorying) and determining precise location data of stacked containers within a yard or terminal (e.g., container terminal), thereby providing unmatched visibility for stacked containers and providing site staff with an accurate, efficient way to locate, intelligently reshuffle, and/or rebuild stacks.

The exemplary systems and methods can utilize high-resolution imagery, data-inferencing capabilities, and AI (e.g., AI models and/or other neural networks) to identify, classify, and/or locate stacked containers in real time. As equipment enters, leaves, and/or shifts within a facility, the exemplary systems and methods can send updates to the cloud and any receiving system (such as TMS/YMS), thereby providing accurate location information for each container in one or more stacks.

The exemplary systems and methods ensure that one or more containers, and more particularly, every container in a stack is visible, thereby streamlining operations and enhancing overall efficiency of the operation of a container terminal and mitigating disruptions before they happen. That is, the image data and location data of each container is known and tracked, and in some examples, accessible to operators, drivers, and/or customers.

The exemplary systems and methods can provide real-time positioning. For example, exemplary systems and methods can enable the use of, and cooperate with, existing equipment, such as one or more vehicles (e.g., one or more container handlers 3303a-3303c) operable within an inventory management facility (e.g., a container terminal 3301), to provide real-time, low-cost, and precisely accurate positioning data even within stacks. This capability revolutionizes inventory management by eliminating guesswork and minimizing the risk of errors.

The exemplary systems and methods can capture, generate, and/or provide current, up to date data (e.g., never-stale data).

The exemplary systems and methods can be configured to continuously update data by sending location data to the cloud in real time, minimizing unproductive equipment moves and ensuring operators and/or customers have the most up-to-date information.

The exemplary systems and methods can provide AI-powered optimization of stacks. The exemplary systems and methods can utilize artificial intelligence engines to groom stacks based on, for example, current bookings and future appointments. In this way, the present invention enables operators to place containers in a preferred or optimal position, thereby improving or maximizing efficiency and minimizing or avoiding costly delays. For example, if a driver misses or cancels an appointment, the exemplary systems and methods can utilize one or more AI engines to re-optimize the stack and update a lift operator's work orders.

The exemplary systems and methods can provide smart scheduling. For example, a dispatcher and/or driver can signal intent (e.g., drop off/pick up) from their Terms of Service (TOS), Yard Management Systems (YMS), or natively in the exemplary control system. AI engines can be utilized to update work orders on in-cab tablets (e.g., in one or more vehicles such as one or more container handlers 3303a-3303c operable within an inventory management facility such as a container terminal 3301, to fulfill current bookings and optimize stacks, for example, for future appointments, such as a predetermined numbers of days out.

The exemplary systems and methods can provide alerts (e.g., customizable alerts) to notify teams when a more efficient method (e.g., most efficient method) of building stacks requires a facility layout change (i.e., high winds, peak, customer-preferred stacks). In an example, the system and method can include a Weather Analysis Engine to forecast and/or detect weather events such as high winds or other weather related events or forecasts.

The exemplary systems and methods can provide one or more customers with access (e.g., real-time access) to view assets/inventory (e.g., containers, and more particularly container image data and container geolocation data) within a container terminal utilizing the customer's Terms of Service (TOS), Yard Management Systems (YMS), or natively in the exemplary control system.

The exemplary systems and methods can be coupled with other control systems for a container terminal, as described herein, such that customers can access data and be provided a unified view and real-time snapshot of containers in a facility, for example, from entry to exit and every move in between. The exemplary systems and methods can work together to give operators a real-time snapshot of a yard and, in some examples, utilize AI Engines to crunch the data to optimize yard moves using efficiency algorithms. In an example, the system can task a closest lift operator for each move, thereby improving efficiency, reducing costs, etc.

The exemplary systems and methods can use simple, high-impact metrics and/or other factors to optimize stacks that often go untracked by operating teams and can provide or reveal vital insights about operations of a container terminal, such as dwell time, average throughput of stacks, and timeliness of drivers. The exemplary systems and methods can optimize and adjust (e.g., automatically optimize and adjust) to streamline work.

Customers can use an interface of the exemplary system or integrate the data into their TOS or YMS. In some examples, individual clients can be granted access (e.g., selectively granted access) to view their inventory within an inventory management facility.

With reference again to FIG. 36, in some examples, the control system 3000 can be configured to perform one or more of the following steps, or one or more combinations of one or more thereof:

1. grant individual clients/customers access to their inventory within a container terminal 3301;
2. suggest pickup times/days;
3. minimize wait times for drivers;
4. alert clients/customers of delays and/or potential delays, at scheduling and/or during transit to the container terminal 3301 (e.g., customizable alerts);
5. enable rewards for arrivals within the specified pickup/drop off window;
6. minimize productive and unproductive movements of one or more container handlers, using Least Cost Routing Calculations based on current position, present required moves, and/or future moves;
7. encourage drivers to use preregistration services, provided for example, using a graphic user interface providing access to the system 3000;
8. increase inventory management facility productivity (e.g., Depot/Distribution and Warehousing facility productivity);
9. provide a positive Environmental Impact (e.g., reduced Hydrocarbons), by decreasing movements of one or more container handlers and/or other equipment within the facility and idling trucks waiting for loads/containers;
10. decrease total cost of ownership of container handlers by reducing maintenance (e.g., less unproductive use);
11. establish an AI-based method of stacking/re-stacking based on machine knowledge that is configured to be transferable from site to site and may be configured to improve performance over time;
12. measure and report on metrics and/or other factors within the container terminal 3301, including for example, one or more of the following metrics, or one or more combinations of one or more thereof:
    a. Dwell;
    b. Empty vs. Full;
    c. Rating/Ranking of customer compliance; and/or
    d. Average throughput of stacks (in an example, the system 3000 can be integrated with other systems to provide throughput of a container terminal 3301 from entry to exit);
13. suggest one or more optimal/optimized layouts of efficient (e.g., most efficient) method of building stacks based on one or more metrics and/or other factors of the container terminal 3301 by performing one or more of the following steps, or one or more combinations of one or more thereof:
    a. Suggest/Implement a high wind plan;
    b. Suggest/Implement a "peak" plan;
    c. Suggest/Implement locations of stacks;
    d. Suggest/Implement a green field layout; and/or
    e. Suggest/Implement a proffered customer stacking plan; and/or
14. communicate work order visually to a driver, etc.

With reference again to FIGS. 21-36, an exemplary embodiment of a control system for a container terminal with a plurality of containers therein, can comprise a server, and a container handler operable within the container terminal and configured to engage at least one of the plurality of containers, at least one onboard sensor on the container handler and configured to generate sensor data of at least one of the plurality of containers, a geolocation device on the container handler and configured to generate a geolocation value for at least one of the container handler and a container of the plurality of containers, a wireless transceiver on the container handler, and a controller on the container handler, the controller coupled to the plurality of onboard sensors, the geolocation device, and the wireless transceiver, the controller configured to transmit the sensor data and the geolocation value for the at least one of the container handler and the container of the plurality of containers to the server, wherein the server in communication with the container handler and configured to generate a database associated with the sensor data, the database comprising, for each container, image data and geolocation data, and wherein the geolocation value includes a latitude value, a longitude value, and an altitude value. The plurality of onboard sensors can comprise an image sensor configured to generate container image data. The container image data can comprise container video data, and wherein the server is configured to weight detected objects in the container terminal based upon a number of frames including the detected objects. The server is configured to identify each container based upon the container image data. The server is configured to perform optical character recognition (OCR) on the container image data. The server is configured to perform machine learning on the container image data. The server is configured to execute a first machine learning model comprising a neural network trained to predict a location of text sequences in the container image data. The server is configured to execute a second machine learning model comprising a neural network for scanning the text sequences and predicting a sequence of missing characters.

Another example is directed to a server in a control system for a container terminal with a plurality of containers therein, the control system comprising a container handler operable within the container terminal and comprising a plurality of onboard sensors configured to generate sensor data of at least some of the plurality of containers, a geolocation device configured to generate a geolocation value for the container handler, a wireless transceiver, and a controller coupled to the plurality of onboard sensors, the geolocation device, and the wireless transceiver, the server comprising a processor and memory cooperating therewith and in communication with the container handler, the processor configured to receive the sensor data and the geolocation value for the container handler from the container handler, and generate a database associated with the sensor data, the database comprising, for each container, image data and geolocation data, wherein the geolocation value includes a latitude value, a longitude value, and an altitude value. The plurality of onboard sensors can comprise an image sensor configured to generate container image data. The server is configured to identify each container based upon the container image data. The server is configured to perform optical character recognition (OCR) on the container image data. The server is configured to perform machine learning on the container image data. The server is configured to execute a first machine learning model comprising a neural network trained to predict a location of text sequences in the container image data, and wherein the server is configured to execute a second machine learning model comprising a neural network for scanning the text sequences and predicting a sequence of missing characters.

Another example is directed to a method of operating a server in a control system for a container terminal with a plurality of containers therein, the control system comprising a container handler operable within the container terminal and comprising a plurality of onboard sensors configured to generate sensor data of at least some of the plurality of containers, a geolocation device configured to generate a geolocation value for the container handler, a wireless transceiver, and a controller coupled to the plurality of onboard sensors, the geolocation device, and the wireless transceiver, the method comprising operating the server in communication with the container handler to receive the sensor data and the geolocation value for the container handler from the container handler, and generate a database associated with the sensor data, the database comprising, for each container, image data and geolocation data, wherein the geolocation value includes a latitude value, a longitude value, and an altitude value. The plurality of onboard sensors can comprise an image sensor configured to generate container image data, wherein the server is configured to identify each container based upon the container image data. The server is configured to perform optical character recognition (OCR) on the container image data. The server is configured to perform machine learning on the container image data. The server is configured to execute a first machine learning model comprising a neural network trained to predict a location of text sequences in the container image data, and wherein the server is configured to execute a second machine learning model comprising a neural network for scanning the text sequences and predicting a sequence of missing characters.

Another example is directed to a control system for optimizing a location of a plurality of containers in a stack of a container terminal, the control system comprising a server, and a container handler operable within the container terminal and configured to engage at least one of the plurality of containers, at least one onboard sensor on the container handler and configured to generate sensor data of at least one of the plurality of containers, a geolocation device on the container handler and configured to generate a geolocation value for at least one of the container handler and a container of the plurality of containers, a wireless transceiver on the container handler, and a controller on the container handler, the controller coupled to the plurality of onboard sensors, the geolocation device, and the wireless transceiver, the controller configured to transmit the sensor data and the geolocation value for the at least one of the container handler and the container of the plurality of containers to the server, wherein the server in communication with the container handler and configured to generate a database associated with the sensor data, the database comprising, for each container, image data and geolocation data, wherein the geolocation value includes a latitude value, a longitude value, and an altitude value, and wherein the server is configured to optimize the location of one or more containers of the plurality of containers in the stack of the container terminal based on the database. The server is configured to perform machine learning on the database.

Another example is directed to a method of optimizing a location of a plurality of containers in a stack of a container terminal, the method comprising operating a server in a control system for a container terminal with a plurality of containers therein, the control system comprising a container handler operable within the container terminal and comprising a plurality of onboard sensors configured to generate sensor data of at least some of the plurality of containers, a geolocation device configured to generate a geolocation value for the container handler, a wireless transceiver, and a controller coupled to the plurality of onboard sensors, the geolocation device, and the wireless transceiver, the method comprising operating the server in communication with the container handler to receive the sensor data and the geolocation value for the container handler from the container handler, generate a database associated with the sensor data, the database comprising, for each container, image data and geolocation data, wherein the geolocation value includes a latitude value, a longitude value, and an altitude value, and optimizing the location of one or more containers of the plurality of containers in the stack of the container terminal based on the database. The server is configured to perform machine learning on the database.

Those of skill in the art would appreciate that various suitable machine learning models may be utilized in the exemplary embodiments and the one or more neural networks described herein are not limited to any particular type of neural network and can include one or more neural networks, such as transformer neural networks, artificial neural networks (ANNs), simulated neural networks (SNNs), feedforward neural networks, and/or other deep learning models, technology, and/or toolkits for analyzing and/or processing one or more of collected image data (e.g., video image data, frames of video image data, etc.), audio data (e.g., captured audio recordings of spoken words), textual data (e.g., sequential text), etc. and/or one or more datasets including such data. For example, the exemplary embodiments may utilize DeepStream technology to improve or maximize a speed of processing high frame rate images, video, etc.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules described herein and illustrated in the examples shown in the figures may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description herein should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosure can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

The invention claimed is:

1. A control system for an inventory management facility, the control system comprising:
   one or more containers in the inventory management facility;
   one or more servers; and
   one or more container handlers operable within the inventory management facility and configured to engage at least one of the one or more containers, wherein the one or more container handlers includes:
      one or more sensors on the one or more container handlers and configured to generate sensor data of at least one of one or more containers, wherein the one or more sensors comprises an image sensor configured to generate container image data;
      one or more geolocation devices on the one or more container handlers and configured to generate one or more geolocation values for one or more of the one or more container handlers or the one or more containers or a combination thereof,
      one or more wireless transceivers on the one or more container handlers; and
      one or more controllers on the one or more container handlers, the one or more controllers coupled to the one or more sensors, the one or more geolocation devices, and the one or more wireless transceivers, the one or more controllers configured to transmit the sensor data and the geolocation value for the one or more of the one or more container handlers and the one or more containers to the one or more servers,
   wherein the one or more servers includes one or more processors and one or more non-transitory computer-readable storage mediums storing instructions comprising one or more algorithms that when executed by the one or more processors cause the one or more processors to perform steps to:
      generate a database associated with the sensor data, the database comprising, for the one or more containers, image data and geolocation data;
      perform machine learning on the image data including executing at least one of:
         a first machine learning model comprising a neural network trained to predict a location of text sequences in the image data; or
         a second machine learning model comprising a neural network for scanning the text sequences and predicting a sequence of missing characters; or
         a combination thereof; and
      perform optical character recognition (OCR) on the image data.

2. The control system of claim 1, wherein the geolocation value includes a latitude value, a longitude value, and an altitude value.

3. The control system of claim 2, wherein the container image data comprises container video data; and wherein the one or more servers is configured to weight detected objects in the inventory management facility based upon a number of frames including the detected objects.

4. The control system of claim 1, wherein the server is configured to identify the one or more containers based upon the container image data.

5. The control system of claim 4, wherein the server is configured to track one or more of a location or a movement, or a combination thereof, of the one or more containers within the inventory management facility.

6. The control system of claim 1, wherein a container handler of the one or more container handlers comprises one of a side loader, a reach loader, or a crane loader.

7. The control system of claim 1, wherein the one or more servers are in communication with the one or more container handlers and are configured to transmit one or more operational values to a container handler of the one or more container handlers to position a container of the one or more containers at a predetermined location within the inventory management facility.

8. A server in a control system for an inventory management facility, the control system comprising one or more containers in the inventory management facility, and one or more container handlers operable within the inventory management facility and configured to engage at least one of the one or more containers, wherein the one or more container handlers includes one or more sensors on the one or more container handlers and configured to generate sensor data of at least one of one or more containers, wherein the one or more sensors comprises an image sensor configured to generate container image data, one or more geolocation devices on the one or more container handlers and configured to generate one or more geolocation values for one or more of the one or more container handlers or the one or more containers or a combination thereof, one or more wireless transceivers on the one or more container handlers, and one or more controllers on the one or more container handlers, the one or more controllers coupled to the one or more sensors, the one or more geolocation devices, and the one or more wireless transceivers, the one or more controllers configured to transmit the sensor data and the geolocation value for the one or more of the one or more container handlers and the one or more containers to the server,
   the server comprising:
      one or more processors and one or more non-transitory computer-readable storage mediums storing instructions comprising one or more algorithms that when executed by the one or more processors cause the one or more processors to perform steps to:
         generate a database associated with the sensor data, the database comprising, for the one or more containers, image data and geolocation data;
         perform machine learning on the image data including executing at least one of:
            a first machine learning model comprising a neural network trained to predict a location of text sequences in the image data; or
            a second machine learning model comprising a neural network for scanning the text sequences and predicting a sequence of missing characters; or
            a combination thereof; and
         perform optical character recognition (OCR) on the image data.

9. The server of claim 8, wherein the geolocation value includes a latitude value, a longitude value, and an altitude value.

10. The server of claim 9, wherein the container image data comprises container video data; and wherein the one or more servers is configured to weight detected objects in the inventory management facility based upon a number of frames including the detected objects.

11. The server of claim 8, wherein the server is configured to identify the one or more containers based upon the container image data.

12. The server of claim 11, wherein the server is configured to track one or more of a location or a movement, or a combination thereof, of the one or more containers within the inventory management facility.

13. The server of claim 8, wherein a container handler of the one or more container handlers comprises one of a side loader, a reach loader, a reach stacker, a Rubber Tired Gantry Cranes (RTG), or a crane loader.

14. The server of claim 8, wherein the one or more servers are in communication with the one or more container handlers and are configured to transmit one or more operational values to a container handler of the one or more container handlers to position a container of the one or more containers at a predetermined location within the inventory management facility.

15. A method of operating a server in a control system for an inventory management facility, the control system comprising one or more containers in the inventory management facility, and one or more container handlers operable within the inventory management facility and configured to engage at least one of the one or more containers, wherein the one or more container handlers includes one or more sensors on the one or more container handlers and configured to generate sensor data of at least one of one or more containers, wherein the one or more sensors comprises an image sensor configured to generate container image data, one or more geolocation devices on the one or more container handlers and configured to generate one or more geolocation values for one or more of the one or more container handlers or the one or more containers or a combination thereof, one or more wireless transceivers on the one or more container handlers, and one or more controllers on the one or more container handlers, the one or more controllers coupled to the one or more sensors, the one or more geolocation devices, and the one or more wireless transceivers, the one or more controllers configured to transmit the sensor data and the geolocation value for the one or more of the one or more container handlers and the one or more containers to the server,
the method comprising:
operating the server in communication with the one or more container handlers to receive the sensor data and the geolocation value for the one or more container handlers from the one or more container handlers,
generating a database associated with the sensor data, the database comprising, for the one or more containers, image data and geolocation data,
performing machine learning on the image data including executing at least one of:
a first machine learning model comprising a neural network trained to predict a location of text sequences in the image data; or
a second machine learning model comprising a neural network for scanning the text sequences and predicting a sequence of missing characters; or
a combination thereof; and
performing optical character recognition (OCR) on the image data.

16. The method of claim 15, wherein the geolocation value includes a latitude value, a longitude value, and an altitude value.

17. The method of claim 16, wherein the container image data comprises container video data; and wherein the one or more servers is configured to weight detected objects in the inventory management facility based upon a number of frames including the detected objects.

18. The method of claim 15, wherein the server is configured to identify the one or more containers based upon the container image data.

19. The method of claim 18, wherein the server is configured to track one or more of a location or a movement, or a combination thereof, of the one or more containers within the inventory management facility.

20. The method of claim 15, wherein a container handler of the one or more container handlers comprises one of a side loader, a reach loader, a reach stacker, a Rubber Tired Gantry Cranes (RTG), or a crane loader.

21. The method of claim 15, wherein the one or more servers are in communication with the one or more container handlers and are configured to transmit one or more operational values to a container handler of the one or more container handlers to position a container of the one or more containers at a predetermined location within the inventory management facility.

22. A control system for optimizing a location of one or more containers in one or more stacks of an inventory management facility, the control system comprising:
one or more containers in the inventory management facility;
one or more servers; and
one or more container handlers operable within the inventory management facility and configured to engage at least one of the one or more containers, wherein the one or more container handlers includes:
one or more sensors on the one or more container handlers and configured to generate sensor data of at least one of one or more containers, wherein the one or more sensors comprises an image sensor configured to generate container image data;
one or more geolocation devices on the one or more container handlers and configured to generate one or more geolocation values for one or more of the one or more container handlers or the one or more containers or a combination thereof,
one or more wireless transceivers on the one or more container handlers; and
one or more controllers on the one or more container handlers, the one or more controllers coupled to the one or more sensors, the one or more geolocation devices, and the one or more wireless transceivers, the one or more controllers configured to transmit the sensor data and the geolocation value for the one or more of the one or more container handlers and the one or more containers to the one or more servers,
wherein the one or more servers includes one or more processors and one or more non-transitory computer-readable storage mediums storing instructions comprising one or more algorithms that when executed by the one or more processors cause the one or more processors to perform steps to:
generate a database associated with the sensor data, the database comprising, for the one or more containers, image data and geolocation data;
perform machine learning on the image data including executing at least one of:
a first machine learning model comprising a neural network trained to predict a location of text sequences in the image data; or a second machine learning model comprising a neural network for scanning the text sequences and predicting a sequence of missing characters; or a combination thereof;

perform optical character recognition (OCR) on the image data; and optimize a location of a container of the one or more containers in the one or more stacks of the inventory management facility based on the database.

23. The control system of claim 22, wherein the geolocation value includes a latitude value, a longitude value, and an altitude value.

24. The control system of claim 23, wherein the container image data comprises container video data; and wherein the one or more servers is configured to weight detected objects in the inventory management facility based upon a number of frames including the detected objects.

25. The control system of claim 22, wherein the server is configured to identify the one or more containers based upon the container image data.

26. The control system of claim 25, wherein the server is configured to track one or more of a location or a movement, or a combination thereof, of the one or more containers within the inventory management facility.

27. The control system of claim 22, wherein a container handler of the one or more container handlers comprises one of a side loader, a reach loader, a reach stacker, a Rubber Tired Gantry Cranes (RTG), or a crane loader.

28. The control system of claim 22, wherein the step of optimizing the location of the container of the one or more containers in the one or more stacks of the inventory management facility includes:

performing machine learning on the database including executing one or more machine learning models comprising one or more neural networks trained to predict an optimal location of the container of the one or more containers in the one or more stacks of the inventory management facility based on one or more predetermined metrics and/or factors.

29. The control system of claim 22, wherein the one or more servers are in communication with the one or more container handlers and are configured to transmit one or more operational values to a container handler of the one or more container handlers to position a container of the one or more containers at the optimal location in the one or more stacks of the inventory management facility.

30. The control system of claim 29, wherein the one or more servers are configured to transmit one or more operational values to the one or more container handlers to re-position the one or more containers at one or more second optimal locations in the one or more stacks of the inventory management facility based on one or more other predetermined metrics and/or factors.

* * * * *